US008393951B2

(12) United States Patent
Yoshizawa

(10) Patent No.: US 8,393,951 B2
(45) Date of Patent: Mar. 12, 2013

(54) GAMING SYSTEM HAVING A PLURALITY OF GAMING MACHINES LINKED BY NETWORK AND CONTROL METHOD THEREOF

(75) Inventor: Kazumasa Yoshizawa, Tokyo (JP)

(73) Assignee: Aruze Gaming America, Inc., Las Vegas, NV (US)

(*) Notice: Subject to any disclaimer, the term of this patent is extended or adjusted under 35 U.S.C. 154(b) by 1010 days.

(21) Appl. No.: 12/806,188

(22) Filed: Nov. 14, 2008

(65) Prior Publication Data

US 2010/0331074 A1 Dec. 30, 2010

(51) Int. Cl.

*A63F 9/24* (2006.01)
*A63F 13/00* (2006.01)
*G06F 17/00* (2006.01)
*G06F 19/00* (2006.01)

(52) U.S. Cl. ................ 463/20; 463/13; 463/21; 463/22; 463/23; 463/24; 463/25

(58) Field of Classification Search .............. 463/20–25, 463/13

See application file for complete search history.

(56) References Cited

U.S. PATENT DOCUMENTS 4,837,728 A 6/1989 Barrie et al.
4,842,278 A 6/1989 Markowicz
4,964,638 A 10/1990 Ishida
5,116,055 A 5/1992 Tracy
5,564,700 A * 10/1996 Celona ............................ 463/27
6,068,553 A 5/2000 Parker
6,210,275 B1 4/2001 Olsen
6,224,484 B1 5/2001 Okuda et al.
7,033,272 B1 * 4/2006 Mason ............................ 463/25
7,056,215 B1 6/2006 Olive
2003/0236110 A1 12/2003 Beaulieu et al.
2004/0053669 A1 * 3/2004 Gerrard et al. .................. 463/20
2004/0087368 A1 * 5/2004 Gauselmann ................... 463/42
2005/0049046 A1 * 3/2005 Kobayashi ...................... 463/31
2005/0079911 A1 4/2005 Nakatsu
2005/0119044 A1 6/2005 Lim et al.
2005/0187014 A1 8/2005 Saffari et al.
2006/0073897 A1 4/2006 Englman et al.
2006/0178183 A1 * 8/2006 Van Asdale ..................... 463/13
2006/0205468 A1 9/2006 Saffari et al.
2006/0287043 A1 12/2006 Englman et al.
2007/0087824 A1 4/2007 Ogiwara
2007/0167217 A1 7/2007 Kaminkow et al.

FOREIGN PATENT DOCUMENTS

WO WO 99/03078 1/1999

* cited by examiner

*Primary Examiner* — Omkar Deodhar
*Assistant Examiner* — Adetokunbo Torimiro
(74) *Attorney, Agent, or Firm* — Edwards Wildman Palmer LLP

(57) ABSTRACT

According to a gaming system 300, when BET information has been received from a gaming machine 1, it is determined either no offer of a special payout to the gaming machine 1 of a transmission source of the BET information, or a size of the special payout to be offered to the gaming machine of the transmission source of the BET information is determined, in the external control device 200. When the size of the special payout has been determined, a numeric symbol is displayed to each of display regions from a first display region **500*a* to a fifth display region 500*e* in a lower image display panel 141**. A sum of numeric values corresponding to a predetermined number of these numeric symbols is a total point value corresponding to the size of the determined special payout.

14 Claims, 32 Drawing Sheets

| Jackpot determination table | | | | | |
|---|---|---|---|---|---|
| Number of BETs | Rank | | | | No rank |
| | GRAND | MAJOR | MINOR | MINI | |
| 1 | 1 | 2~3 | 4~6 | 7~20 | 21~2000 |
| 2 | 1~2 | 3~6 | 7~12 | 13~40 | 41~2000 |
| · | · | · | · | · | · |
| · | · | · | · | · | · |
| B | 1~B | B+1~3B | 3B+1~6B | 6B+1~20B | 20B+1~2000 |
| · | · | · | · | · | · |
| · | · | · | · | · | · |
| 100 (MAXBET) | 1~100 | 101~300 | 301~600 | 601~2000 | - |

FIG. 1A

| Jackpot determination table | | | | | |
|---|---|---|---|---|---|
| Number of BETs | Rank | | | | No rank |
| | GRAND | MAJOR | MINOR | MINI | |
| 1 | 1 | 2~3 | 4~6 | 7~20 | 21~2000 |
| 2 | 1~2 | 3~6 | 7~12 | 13~40 | 41~2000 |
| · | · | · | · | · | · |
| · | · | · | · | · | · |
| B | 1~B | B+1~3B | 3B+1~6B | 6B+1~20B | 20B+1~2000 |
| · | · | · | · | · | · |
| · | · | · | · | · | · |
| 100 (MAXBET) | 1~100 | 101~300 | 301~600 | 601~2000 | - |

FIG. 1B

| Rank | Total point value |
|---|---|
| GRAND | 50~ |
| MAJOR | 46~49 |
| MINOR | 37~39 |
| MINI | ~36 |

FIG. 1F

Point-value combination table for GRAND

| No. | Total point value | 1st to 4th display regions | | | | 5th display region | Random value |
|---|---|---|---|---|---|---|---|
| 1 | 50 | 9 | 10 | 10 | 10 | 11 | 0~2999 |
| 2 | 50 | 9 | 9 | 10 | 11 | 11 | 3000~5999 |
| 3 | 50 | 8 | 9 | 11 | 11 | 11 | 6000~8999 |
| 4 | 50 | 8 | 10 | 10 | 11 | 11 | 9000~11999 |
| 5 | 50 | 7 | 10 | 11 | 11 | 11 | 12000~14999 |
| 6 | 50 | 6 | 11 | 11 | 11 | 11 | 15000~17999 |
| 7 | 50 | 9 | 9 | 11 | 11 | 10 | 18000~20999 |
| 8 | 50 | 9 | 10 | 10 | 11 | 10 | 21000~23999 |
| 9 | 50 | 8 | 10 | 11 | 11 | 10 | 24000~26999 |
| 10 | 50 | 8 | 11 | 11 | 11 | 9 | 27000~29999 |
| 11 | 50 | 9 | 10 | 11 | 11 | 9 | 30000~32999 |
| 12 | 50 | 10 | 10 | 11 | 11 | 8 | 33000~35999 |
| 13 | 50 | 9 | 11 | 11 | 11 | 8 | 36000~38999 |
| 14 | 50 | 10 | 11 | 11 | 11 | 7 | 39000~41999 |
| 15 | 50 | 11 | 11 | 11 | 11 | 6 | 42000~44999 |
| 16 | 51 | 8 | 10 | 11 | 11 | 11 | 45000~47999 |
| 17 | 52 | 9 | 10 | 11 | 11 | 11 | 48000~50999 |
| 18 | 53 | 10 | 10 | 11 | 11 | 11 | 51000~53999 |
| 19 | 54 | 10 | 11 | 11 | 11 | 11 | 54000~56999 |
| 20 | 55 | 11 | 11 | 11 | 11 | 11 | 57000~65535 |

FIG. 1G

Point-value combination table for MAJOR

| No. | Total point value | 1st to 4th display regions | | | | 5th display region | Random value |
|---|---|---|---|---|---|---|---|
| 1 | 46 | 5 | 8 | 11 | 11 | 11 | 0~1999 |
| 2 | 46 | 4 | 9 | 11 | 11 | 11 | 2000~3999 |
| 3 | 46 | 3 | 10 | 11 | 11 | 11 | 4000~5999 |
| 4 | 46 | 6 | 7 | 11 | 11 | 11 | 6000~7999 |
| 5 | 46 | 7 | 7 | 10 | 11 | 11 | 8000~9999 |
| 6 | 46 | 8 | 8 | 8 | 11 | 11 | 10000~11999 |
| 7 | 46 | 3 | 11 | 11 | 11 | 10 | 12000~13999 |
| 8 | 46 | 5 | 9 | 11 | 11 | 10 | 14000~15999 |
| 9 | 46 | 7 | 9 | 10 | 11 | 9 | 16000~17999 |
| 10 | 46 | 7 | 9 | 11 | 11 | 8 | 18000~19999 |
| 11 | 46 | 7 | 10 | 11 | 11 | 7 | 20000~21999 |
| 12 | 46 | 8 | 10 | 11 | 11 | 6 | 22000~23999 |
| 13 | 47 | 7 | 7 | 11 | 11 | 11 | 24000~25999 |
| 14 | 47 | 8 | 10 | 10 | 11 | 8 | 26000~27999 |
| 15 | 47 | 6 | 11 | 11 | 11 | 8 | 28000~29999 |
| 16 | 47 | 7 | 10 | 11 | 11 | 8 | 30000~31999 |
| 17 | 47 | 9 | 9 | 11 | 11 | 7 | 32000~33999 |
| 18 | 48 | 7 | 10 | 11 | 11 | 9 | 34000~35999 |
| 19 | 48 | 8 | 9 | 11 | 11 | 9 | 36000~37999 |
| 20 | 48 | 7 | 11 | 11 | 11 | 8 | 38000~39999 |
| 21 | 48 | 9 | 10 | 10 | 11 | 8 | 40000~41999 |
| 22 | 48 | 8 | 10 | 11 | 11 | 8 | 42000~43999 |
| 23 | 49 | 8 | 10 | 10 | 11 | 10 | 44000~45999 |
| 24 | 49 | 7 | 10 | 11 | 11 | 10 | 46000~47999 |
| 25 | 49 | 6 | 11 | 11 | 11 | 10 | 48000~49999 |
| 26 | 49 | 7 | 11 | 11 | 11 | 9 | 50000~51999 |
| 27 | 49 | 8 | 10 | 11 | 11 | 9 | 52000~53999 |
| 28 | 49 | 10 | 10 | 10 | 11 | 8 | 54000~55999 |
| 29 | 49 | 9 | 11 | 11 | 11 | 7 | 56000~57999 |
| 30 | 49 | 10 | 11 | 11 | 11 | 6 | 58000~65535 |

FIG. 1H

Point-value combination table for MINOR

| No. | Total point value | 1st to 4th display regions | | | | 5th display region | Random value |
|---|---|---|---|---|---|---|---|
| 1 | 37 | 3 | 3 | 9 | 11 | 11 | 0~1199 |
| 2 | 37 | 3 | 4 | 9 | 10 | 11 | 1200~2399 |
| 3 | 37 | 4 | 4 | 9 | 9 | 11 | 2400~3599 |
| 4 | 37 | 3 | 5 | 8 | 10 | 11 | 3600~4799 |
| 5 | 37 | 4 | 5 | 8 | 9 | 11 | 4800~5999 |
| 6 | 37 | 3 | 7 | 8 | 8 | 11 | 6000~7199 |
| 7 | 37 | 4 | 6 | 8 | 8 | 11 | 7200~8399 |
| 8 | 37 | 5 | 5 | 5 | 11 | 11 | 8400~9599 |
| 9 | 37 | 5 | 6 | 7 | 8 | 11 | 9600~10799 |
| 10 | 37 | 6 | 6 | 7 | 7 | 11 | 10800~11199 |
| 11 | 37 | 4 | 7 | 8 | 8 | 10 | 12000~13199 |
| 12 | 37 | 6 | 7 | 7 | 7 | 10 | 13200~14399 |
| 13 | 37 | 3 | 5 | 8 | 11 | 10 | 14400~15599 |
| 14 | 37 | 7 | 7 | 7 | 7 | 9 | 15600~16799 |
| 15 | 37 | 5 | 7 | 8 | 8 | 9 | 16800~17999 |
| 16 | 37 | 4 | 8 | 8 | 8 | 9 | 18000~19199 |
| 17 | 37 | 7 | 7 | 7 | 8 | 8 | 19200~20399 |
| 18 | 37 | 6 | 7 | 8 | 8 | 8 | 20400~21599 |
| 19 | 37 | 3 | 9 | 9 | 9 | 7 | 21600~22799 |
| 30 | 41 | 6 | 7 | 7 | 11 | 10 | 34800~35999 |
| 31 | 42 | 5 | 10 | 10 | 10 | 7 | 36000~37199 |
| 32 | 42 | 8 | 9 | 9 | 10 | 6 | 37200~38399 |
| 33 | 43 | 6 | 9 | 10 | 10 | 8 | 38400~39599 |
| 34 | 43 | 4 | 10 | 11 | 11 | 7 | 39600~40799 |
| 35 | 43 | 8 | 8 | 10 | 11 | 6 | 40800~41999 |
| 36 | 44 | 6 | 8 | 10 | 11 | 9 | 42000~43199 |
| 37 | 44 | 5 | 9 | 11 | 11 | 8 | 43200~43399 |
| 38 | 44 | 8 | 9 | 10 | 10 | 7 | 43400~44599 |
| 39 | 45 | 3 | 10 | 11 | 11 | 10 | 44600~45799 |
| 50 | 45 | 8 | 10 | 10 | 11 | 6 | 58800~65535 |

※Nos. 20-29, 40-49 are omitted from the table

FIG. 11

Point-value combination table for MINI

| No. | Total point value | 1st to 4th display regions | | | | 5th display region | Random value |
|---|---|---|---|---|---|---|---|
| 1 | 30 | 3 | 4 | 5 | 7 | 11 | 0~599 |
| 2 | 30 | 5 | 5 | 6 | 6 | 8 | 600~1199 |
| 3 | 31 | 3 | 4 | 6 | 7 | 11 | 1200~1799 |
| 4 | 31 | 4 | 4 | 6 | 6 | 11 | 1800~2399 |
| 5 | 32 | 3 | 7 | 8 | 8 | 6 | 2400~2999 |
| 6 | 32 | 3 | 6 | 7 | 10 | 6 | 3000~3599 |
| 7 | 32 | 5 | 5 | 6 | 10 | 6 | 3600~4199 |
| 8 | 32 | 5 | 5 | 8 | 8 | 6 | 4200~4799 |
| 9 | 33 | 5 | 5 | 8 | 8 | 7 | 4800~5399 |
| 20 | 34 | 4 | 7 | 7 | 8 | 8 | 11400~11999 |
| 21 | 34 | 6 | 6 | 7 | 7 | 8 | 12000~12599 |
| 22 | 34 | 4 | 5 | 9 | 9 | 7 | 12600~13199 |
| 23 | 34 | 4 | 6 | 8 | 9 | 7 | 13200~13799 |
| 24 | 34 | 4 | 7 | 8 | 8 | 7 | 13800~14399 |
| 25 | 34 | 3 | 8 | 8 | 9 | 6 | 14400~14999 |
| 26 | 34 | 3 | 7 | 8 | 10 | 6 | 15000~15599 |
| 27 | 35 | 3 | 4 | 8 | 9 | 11 | 15600~16199 |
| 28 | 35 | 4 | 5 | 8 | 8 | 10 | 16200~16799 |
| 29 | 35 | 3 | 3 | 10 | 10 | 9 | 16800~17399 |
| 90 | 36 | 3 | 8 | 8 | 10 | 7 | 53400~53999 |
| 91 | 36 | 4 | 8 | 8 | 9 | 7 | 54000~54599 |
| 92 | 36 | 3 | 4 | 11 | 11 | 7 | 54600~55199 |
| 93 | 36 | 4 | 5 | 10 | 10 | 7 | 55200~55799 |
| 94 | 36 | 3 | 6 | 9 | 11 | 7 | 55800~56399 |
| 95 | 36 | 3 | 5 | 11 | 11 | 6 | 56400~56999 |
| 96 | 36 | 3 | 8 | 9 | 10 | 6 | 57000~57599 |
| 97 | 36 | 4 | 8 | 9 | 9 | 6 | 57600~58199 |
| 98 | 36 | 3 | 8 | 8 | 11 | 6 | 58200~58799 |
| 99 | 36 | 5 | 8 | 8 | 9 | 6 | 58800~59399 |
| ## | 36 | 7 | 7 | 8 | 8 | 6 | 59400~65535 |

※Nos. 10-19, 30-89 are omitted from the table

FIG. 5

| | 1st video reel | 2nd video reel | 3rd video reel | 4th video reel | 5th video reel |
|---|---|---|---|---|---|
| Code number | Symbol | Symbol | Symbol | Symbol | Symbol |
| 00 | APPLE | ORANGE | PLUM | BELL | STRAWBERRY |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 8

Symbol combination table

| Combination of symbols | | | | | Number of payouts | Winning combination |
|---|---|---|---|---|---|---|
| 1st video reel | 2nd video reel | 3rd video reel | 4th video reel | 5th video reel | | |
| APPLE | APPLE | APPLE | APPLE | APPLE | Bonus game※ | Bonus game trigger |
| BLUE 7 | BLUE 7 | BLUE 7 | BLUE 7 | BLUE 7 | 10 | BLUE |
| BELL | BELL | BELL | BELL | BELL | 8 | BELL |
| CHERRY | CHERRY | CHERRY | CHERRY | CHERRY | 5 | CHERRY 3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE 3 |
| CHERRY | CHERRY | CHERRY | (ANY) | (ANY) | 2 | CHERRY 2 |
| ORANGE | ORANGE | ORANGE | (ANY) | (ANY) | 2 | ORANGE 2 |
| CHERRY | (ANY) | (ANY) | (ANY) | (ANY) | 1 | CHERRY 1 |
| ORANGE | (ANY) | (ANY) | (ANY) | (ANY) | 1 | ORANGE 1 |

※Free games of the number of times determined by lottery are conducted.

FIG. 21

Numeric-symbol table

| | 1st display region | 2nd display region | 3rd display region | 4th display region | 5th display region |
|---|---|---|---|---|---|
| Code number | Numeric symbol | Numeric symbol | Numeric symbol | Numeric symbol | Numeric symbol |
| 03 | 3 | 3 | 3 | 3 | - |
| 04 | 4 | 4 | 4 | 4 | - |
| 05 | 5 | 5 | 5 | 5 | - |
| 06 | 6 | 6 | 6 | 6 | 6 |
| 07 | 7 | 7 | 7 | 7 | 7 |
| 08 | Belt | Belt | Belt | Belt | Belt |
| 09 | Belt | Belt | Belt | Belt | Belt |
| 10 | Belt | Belt | Belt | Belt | Belt |
| 11 | Belt | Belt | Belt | Belt | Belt |

FIG. 26

| Jackpot determination table | | | |
|---|---|---|---|
| Number of BETs | Random number range | Total point value | Rank |
| B | 1～B | 55 | GRAND |
| | B+1～2B | 54 | |
| | 2B+1～3B | 53 | |
| | 3B+1～4B | 52 | |
| | 4B+1～5B | 51 | |
| | 5B+1～6B | 50 | |
| | 6B+1～12B | 49 | MAJOR |
| | 12B+1～13B | 48 | |
| | 13B+1～14B | 47 | |
| | 14B+1～18B | 46 | |
| | 18B+1～23B | 45 | MINOR |
| | 23B+1～24B | 44 | |
| | 24B+1～25B | 43 | |
| | 25B+1～26B | 42 | |
| | 26B+1～27B | 41 | |
| | 27B+1～28B | 40 | |
| | 28B+1～29B | 39 | |
| | 29B+1～30B | 38 | |
| | 30B+1～36B | 37 | |
| | 36B+1～66B | 36 | MINI |
| | 66B+1～68B | 35 | |
| | 68B+1～70B | 34 | |
| | 70B+1～72B | 33 | |
| | 72B+1～74B | 33 | |
| | 74B+1～76B | 32 | |
| | 76B+1～78B | 31 | |
| | 78B+1～120B | 30 | |
| | 120B+1～12000 | ～29 | No rank |

FIG. 27

Point-value combination table for MAJOR

| No. | Total point value | 1st to 4th display regions | | | | 5th display region | Random value |
|---|---|---|---|---|---|---|---|
| 1 | 46 | 5 | 8 | 11 | 11 | 11 | 0～4999 |
| 2 | 46 | 4 | 9 | 11 | 11 | 11 | 5000～9999 |
| 3 | 46 | 3 | 10 | 11 | 11 | 11 | 10000～14999 |
| 4 | 46 | 6 | 7 | 11 | 11 | 11 | 15000～19999 |
| 5 | 46 | 7 | 7 | 10 | 11 | 11 | 20000～24999 |
| 6 | 46 | 8 | 8 | 8 | 11 | 11 | 25000～29999 |
| 7 | 46 | 3 | 11 | 11 | 11 | 10 | 30000～34999 |
| 8 | 46 | 5 | 9 | 11 | 11 | 10 | 35000～39999 |
| 9 | 46 | 7 | 9 | 10 | 11 | 9 | 40000～44999 |
| 10 | 46 | 7 | 9 | 11 | 11 | 8 | 45000～49999 |
| 11 | 46 | 7 | 10 | 11 | 11 | 7 | 50000～54999 |
| 12 | 46 | 8 | 10 | 11 | 11 | 6 | 55000～65535 |
| 13 | 47 | 7 | 7 | 11 | 11 | 11 | 0～12999 |
| 14 | 47 | 8 | 10 | 10 | 11 | 8 | 13000～25999 |
| 15 | 47 | 6 | 11 | 11 | 11 | 8 | 26000～38999 |
| 16 | 47 | 7 | 10 | 11 | 11 | 8 | 39000～51999 |
| 17 | 47 | 9 | 9 | 11 | 11 | 7 | 52000～65535 |
| 18 | 48 | 7 | 10 | 11 | 11 | 9 | 0～12999 |
| 19 | 48 | 8 | 9 | 11 | 11 | 9 | 13000～25999 |
| 20 | 48 | 7 | 11 | 11 | 11 | 8 | 26000～38999 |
| 21 | 48 | 9 | 10 | 10 | 11 | 8 | 39000～51999 |
| 22 | 48 | 8 | 10 | 11 | 11 | 8 | 52000～65535 |
| 23 | 49 | 8 | 10 | 10 | 11 | 10 | 0～7999 |
| 24 | 49 | 7 | 10 | 11 | 11 | 10 | 8000～15999 |
| 25 | 49 | 6 | 11 | 11 | 11 | 10 | 16000～23999 |
| 26 | 49 | 7 | 11 | 11 | 11 | 9 | 24000～31999 |
| 27 | 49 | 8 | 10 | 11 | 11 | 9 | 32000～39999 |
| 28 | 49 | 10 | 10 | 10 | 11 | 8 | 40000～47999 |
| 29 | 49 | 9 | 11 | 11 | 11 | 7 | 48000～55999 |
| 30 | 49 | 10 | 11 | 11 | 11 | 6 | 56000～65535 |

GAMING SYSTEM HAVING A PLURALITY OF GAMING MACHINES LINKED BY NETWORK AND CONTROL METHOD THEREOF

BACKGROUND OF THE INVENTION

1. Field of the Invention

The present invention relates to a gaming system having a plurality of gaming machines linked by a network, and a control method thereof.

2. Discussion of the Background

Conventionally, among gaming machines such as a slot machine, there exist gaming machines conducting a payout called a jackpot. When a player has won the jackpot, the player can acquire a large amount of game media at once. Among those jackpots, there exists a jackpot called a progressive jackpot as disclosed for example in WO 99/03078-A1. With regard to the progressive jackpot, a part of game media inserted by the player is cumulatively accumulated as a cumulative value, and the accumulated game media are paid out when winning has occurred.

Further, conventionally, there exist gaming systems having a plurality of gaming machines linked by a network as disclosed in U.S. Pat. No. 4,837,728, U.S. Pat. No. 4,842,278, U.S. Pat. No. 4,964,638, U.S. Pat. No. 5,116,055, U.S. Pat. No. 6,068,553, U.S. Pat. No. 6,210,275, U.S. Pat. No. 6,224,484, U.S. Pat. No. 7,056,215, US 2003/0236110-A1, US 2005/0079911-A1, US 2005/0119044-A1, US 2006/0205468-A1, US 2005/0187014-A1, US 2006/0287043-A1, US 2006/0073897-A1, US 2007/0087824-A1, and US 2007/0167217-A1. Among such gaming systems, there exists a gaming system which accumulates a part of game media inserted in the respective gaming machines and pays out the accumulated game media to a gaming machine having won the progressive jackpot.

On the gaming machine conducting a payout relating to the jackpot, as described above, the player generally plays a game with expectation that such a payout is conducted. Also, how large the amount of game media to be paid out along with winning of the jackpot will be, is a serious matter of concern for the player.

The inventor of the present invention has therefore thought that adding new features to effects in notifying the player of the amount of game media to be paid out along with winning of the jackpot may generate new entertainment aspects.

The present invention was made in view of the aforementioned issues, and a purpose thereof is to provide a gaming system having new entertainment aspects and a control method thereof.

SUMMARY OF THE INVENTION

The present invention provides a gaming system having the following configuration.

That is, the gaming system comprises: a plurality of gaming machines each including an input device with which a BET can be inputted, a numeric-symbol display capable of displaying a numeric symbol to each of a predetermined number of display regions, and a controller; a control device including a processor; and a network enabling communication between the plurality of gaming machines and the control device, wherein the controller is programmed so as to execute the processing of: (a) accepting input indicative of a BET of game media, from the input device; and (b) transmitting BET information showing an amount of game media betted in the processing (a), to the processor, the processor is programmed so as to execute the processing of: (A) receiving the BET information transmitted in the processing (b); (B) determining either no offer of a special payout to a gaming machine of a transmission source of the BET information, or a total point value corresponding to a size of the special payout to be offered to the gaming machine of the transmission source of the BET information, upon reception of the BET information in the processing (A); and (C) determining an amount of game media which corresponds to the determined total point value, when the total point value has been determined in the processing (B), and the controller is programmed so as to execute the processing of: (c) displaying to the predetermined number of respective display regions in the numeric-symbol display a predetermined number of numeric symbols which have a sum of corresponding numeric values becoming the total point value determined in the processing (B), when the total point value has been determined in the processing (B); and (d) paying out game media in an amount determined in the processing (C).

According to the gaming system, when the BET information has been received from the gaming machine, it is determined either no offer of the special payout to the gaming machine of the transmission source of the BET information, or the total point value corresponding to the size of the special payout to be offered to the gaming machine of the transmission source of the BET information is determined, in the control device. When the total payout value has been determined, a numeric symbol is displayed to each of the predetermined number of display regions in the numeric-symbol display, in the gaming machine. The sum of numeric values corresponding to the predetermined number of these numeric symbols is the determined total point value.

That is, displaying the numeric symbols to the numeric-symbol display allows the player to recognize the total point value. Moreover, since the size of the special payout corresponds to the total point value, it is possible to notify the player of the size of the special payout.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the gaming system, presence or absence of the special payout, and the total point value are determined at the same time. It is thus possible to ease the burden on the processing thereof.

The present invention further provides a gaming system having the following configuration.

That is, the gaming system comprises: a plurality of gaming machines each including an input device with which a BET can be inputted, a numeric-symbol display capable of displaying a numeric symbol to each of a predetermined number of display regions, and a controller; a control device including a processor; and a network enabling communication between the plurality of gaming machines and the control device, wherein the gaming machine or the control device includes a memory storing a plurality of pieces of point-value combination data each showing a combination of a predetermined number of numeric symbols that can be displayed to the predetermined number of display regions, the controller is programmed so as to execute the processing of: (a) accepting input indicative of a BET of game media, from the input device; and (b) transmitting BET information showing an amount of game media betted in the processing (a), to the processor, the processor is programmed so as to execute the processing of: (A) receiving the BET information transmitted in the processing (b); and (B) determining either no offer of a special payout to a gaming machine of a transmission source of the BET information, or a size of the special payout to be offered to the gaming machine of the transmission source of the BET information, upon reception of the BET information in the processing (A), and the controller is programmed so as to execute the processing of: (c) displaying to the predetermined number of respective display regions in the numeric-symbol display the predetermined number of numeric symbols which are the predetermined number of numeric symbols shown by any piece of point-value combination data among the plurality of pieces of point-value combination data stored in the memory, and which have a sum of corresponding numeric values becoming a total point value corresponding to the size of the special payout determined in the processing (B), when the size of the special payout has been determined in the processing (B); and (d) paying out game media in an amount corresponding to the size of the special payout determined in the processing (B).

According to the gaming system, when the BET information has been received from the gaming machine, it is determined either no offer of the special payout to the gaming machine of the transmission source of the BET information, or the size of the special payout to be offered to the gaming machine of the transmission source of the BET information is determined, in the control device. When the size of the special payout has been determined, a numeric symbol is displayed to each of the predetermined number of display regions in the numeric-symbol display, in the gaming machine. The sum of numeric values corresponding to the predetermined number of these numeric symbols is the total point value corresponding to the size of the determined special payout.

That is, displaying the numeric symbols to the numeric-symbol display allows the player to recognize the total point value. Moreover, since the size of the special payout corresponds to the total point value, it is possible to notify the player of the size of the special payout.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the gaming system, presence or absence of the special payout, and the size of the special payout are determined at the same time. It is thus possible to ease the burden on the processing thereof.

The present invention further provides a gaming system having the following configuration.

That is, the gaming system comprises: a plurality of gaming machines each including an input device with which a BET can be inputted, a numeric-symbol display capable of displaying a numeric symbol to each of a predetermined number of display regions, a memory storing a plurality of pieces of point-value combination data each showing a combination of a predetermined number of numeric symbols that can be displayed to the predetermined number of respective display regions, and a controller; a control device including a processor; and a network enabling communication between the plurality of gaming machines and the control device, wherein the controller is programmed so as to execute the processing of: (a) accepting input indicative of a BET of game media, from the input device; and (b) transmitting BET information showing an amount of game media betted in the processing (a), to the processor, the processor is programmed so as to execute the processing of: (A) receiving the BET information transmitted in the processing (b); (B) determining either no offer of a special payout to a gaming machine of a transmission source of the BET information, or a size of the special payout to be offered to the gaming machine of the transmission source of the BET information, upon reception of the BET information in the processing (A); and (C) transmitting information based on the determined size of the special payout to the controller included in the gaming machine of the transmission source of the BET information, when the size of the special payout to be offered to this gaming machine has been determined in the processing (B), and the controller is programmed so as to execute the processing of: (c) identifying the predetermined number of numeric symbols which have a sum of corresponding numeric values becoming a total point value corresponding to the size of the special payout determined in the processing (B), based on the information transmitted in the processing (C) and the plurality of pieces of point-value combination data stored in the memory; (d) displaying the predetermined number of numeric symbols identified in the processing (c) to the predetermined number of respective display regions in the numeric-symbol display; and (e) paying out game media in an amount corresponding to the size of the special payout determined in the processing (B).

According to the gaming system, when the BET information has been received from the gaming machine, it is determined either no offer of the special payout to the gaming machine of the transmission source of the BET information, or the size of the special payout to be offered to the gaming machine of the transmission source of the BET information is determined, in the control device. When the size of the special payout has been determined, a numeric symbol is displayed to each of the predetermined number of display regions in the numeric-symbol display, in the gaming machine. The sum of numeric values corresponding to the predetermined number of these numeric symbols is the total point value corresponding to the size of the determined special payout.

That is, displaying the numeric symbols to the numeric-symbol display allows the player to recognize the total point value. Moreover, since the size of the special payout corresponds to the total point value, it is possible to notify the player of the size of the special payout.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the gaming system, presence or absence of the special payout, and the size of the special payout are determined at the same time. It is thus possible to ease the burden on the processing thereof.

Furthermore, according to the gaming system, the predetermined number of numeric symbols to be displayed to the numeric-symbol display are identified in the gaming machine. Accordingly, the processing of identifying the predetermined number of numeric symbols becomes unnecessary in the control device, and thus throughput in the control device can be reduced.

The present invention further provides a gaming system having the following configuration.

That is, the gaming system comprises: a plurality of gaming machines each including an input device with which a BET can be inputted, a numeric-symbol display capable of displaying a numeric symbol to each of a predetermined number of display regions, a memory storing a plurality of pieces of point-value combination data each showing a combination of a predetermined number of numeric symbols that can be displayed to the predetermined number of respective display regions, and a controller; a control device including a processor; and a network enabling communication between the plurality of gaming machines and the control device, wherein the controller is programmed so as to execute the processing of: (a) accepting input indicative of a BET of game media, from the input device; and (b) transmitting BET information showing an amount of game media betted in the processing (a), to the processor, the processor is programmed so as to execute the processing of: (A) receiving the BET information transmitted in the processing (b); (B) determining either no offer of a special payout to a gaming machine of a transmission source of the BET information, or a size of the special payout to be offered to the gaming machine of the transmission source of the BET information, upon reception of the BET information in the processing (A); and (C) transmitting information based on the determined size of the special payout to the controller included in the gaming machine of the transmission source of the BET information, when the size of the special payout to be offered to this gaming machine has been determined in the processing (B), and the controller is programmed so as to execute the processing of: (c) identifying the predetermined number of numeric symbols which have a sum of corresponding numeric values becoming a total point value corresponding to the size of the special payout determined in the processing (B), based on the information transmitted in the processing (C) and the plurality of pieces of point-value combination data stored in the memory; (d) determining an order of the predetermined number of numeric symbols identified in the processing (c); (e) displaying the predetermined number of numeric symbols identified in the processing (c) to the predetermined number of respective display regions in the numeric-symbol display, based on the order determined in the processing (d); and (f) paying out game media in an amount corresponding to the size of the special payout determined in the processing (B).

According to the gaming system, when the BET information has been received from the gaming machine, it is determined either no offer of the special payout to the gaming machine of the transmission source of the BET information, or the size of the special payout to be offered to the gaming machine of the transmission source of the BET information is determined, in the control device. When the size of the special payout has been determined, a numeric symbol is displayed to each of the predetermined number of display regions in the numeric-symbol display, in the gaming machine. The sum of numeric values corresponding to the predetermined number of these numeric symbols is the total point value corresponding to the size of the determined special payout.

That is, displaying the numeric symbols to the numeric-symbol display allows the player to recognize the total point value. Moreover, since the size of the special payout corresponds to the total point value, it is possible to notify the player of the size of the special payout.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the gaming system, presence or absence of the special payout, and the size of the special payout are determined at the same time. It is thus possible to ease the burden on the processing thereof.

According to the gaming system, when the predetermined number of numeric symbols have been identified, the order of these numeric symbols is determined. Based on the determined order, the predetermined number of numeric symbols are displayed.

Hence, pieces of data corresponding to a plurality of alignment orders with regard to a combination of the predetermined number of numeric symbols are not required to be stored in the memory as pieces of point-value combination data. For example, if a piece of the point-value combination data corresponding to "9", "10", "10", "10", and "11" is stored in the memory as a combination of the predetermined number of numeric symbols, it is possible to display the numeric symbols in the order of "10", "9", "10", "10", and "11".

Accordingly, the amount of data can be reduced in an amount corresponding to these pieces of data.

The present invention further provides a gaming system having the following configuration.

That is, the gaming system comprises: a plurality of gaming machines each including a numeric-symbol display, a memory, an input device, and a controller; a control device including a processor; and a network enabling communication between the plurality of gaming machines and the control device, wherein the numeric-symbol display is capable of displaying a numeric symbol to each of N (N is a natural number larger than M) display regions including M (M is a natural number) normal display regions and a special display region, the memory stores a plurality of pieces of point-value combination data each showing a combination of N numeric symbols consisting of M numeric symbols that can be displayed to the normal display regions and (N-M) numeric symbol that can be displayed to the special display region, the input device allows input of a BET, and input indicative of selection of the order in which the N numeric symbols are displayed, the controller is programmed so as to execute the processing of: (a) accepting input indicative of a BET of game media, from the input device; and (b) transmitting BET information showing an amount of game media betted in the processing (a), to the processor, the processor is programmed so as to execute the processing of: (A) receiving the BET information transmitted in the processing (b); (B) determining either no offer of a special payout to a gaming machine of a transmission source of the BET information, or a size of the special payout to be offered to the gaming machine of the transmission source of the BET information, upon reception of the BET information in the processing (A); and (C) transmitting information based on the determined size of the special payout to the controller included in the gaming machine of the transmission source of the BET information, when the size of the special payout to be offered to this gaming machine has been determined in the processing (B), and the controller is programmed so as to execute the processing of: (c) identifying the N numeric symbols which have a sum of corresponding numeric values becoming a total point value corresponding to the size of the special payout determined in the processing (B), based on the information transmitted in the processing (C) and the plurality of pieces of point-value combination data stored in the memory; (d) determining an order of the M numeric symbols to be displayed to the normal display regions out of the N numeric symbols identified in the processing (c); (e) accepting input indicative of selection of the order in which the N numeric symbols are displayed, from the input device; (f) displaying each of the N numeric symbols identified in the processing (c) to each of the N display regions in the numeric-symbol display, based on the order determined in the processing (d) and the order selected in the processing (e); and (g) paying out game media in an amount corresponding to the size of the special payout determined in the processing (B).

According to the gaming system, when the BET information has been received from the gaming machine, it is determined either no offer of the special payout to the gaming machine of the transmission source of the BET information, or the size of the special payout to be offered to the gaming machine of the transmission source of the BET information is determined, in the control device. When the size of the special payout has been determined, a numeric symbol is displayed to each of the predetermined number of display regions in the numeric-symbol display, in the gaming machine. The sum of numeric values corresponding to the predetermined number of these numeric symbols is the total point value corresponding to the size of the determined special payout.

That is, displaying the numeric symbols to the numeric-symbol display allows the player to recognize the total point value. Moreover, since the size of the special payout corresponds to the total point value, it is possible to notify the player of the size of the special payout.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the gaming system, presence or absence of the special payout, and the size of the special payout are determined at the same time. It is thus possible to ease the burden on the processing thereof.

Further, according to the gaming system, the N display regions consist of the M (M is a natural number) normal display regions and the special display regions. When the N numeric symbols have been identified, the order of the M numeric symbols to be displayed to the normal display regions out of the numeric symbols is determined.

Based on the determined order, the numeric symbols are displayed.

Hence, pieces of data corresponding to a plurality of alignment orders with regard to a combination of the M numeric symbols are not required to be stored in the memory as pieces of point-value combination data. For example, if a piece of the point-value combination data corresponding to "9", "10", "10", and "10" is stored in the memory as a combination of the M numeric symbols, it is possible to display the numeric symbols in the order of "10", "9", "10", and "10".

Accordingly, the amount of data can be reduced in an amount corresponding to these pieces of data.

According to the gaming system, the order of (N-M) numeric symbols to be displayed to the special display regions is not determined. That is, the (N-M) numeric symbols to be displayed to the special display regions are the numeric symbols that are previously determined in association with the respective special display regions.

Accordingly, setting the numeric symbols corresponding to relatively large numeric values in association with the special display regions causes display of those numeric symbols corresponding to the relatively large numeric values to the special display regions.

On the other hand, according to the gaming system, the player can select the order in which the N numeric symbols are displayed. Thus, it is possible to let the player enjoy the timing of when to display the numeric symbols to the special display regions. It is also possible to let the player fully enjoy the process in which the numeric symbols are sequentially displayed.

The present invention further provides a gaming system having the following configuration.

That is, the gaming system comprises: a plurality of gaming machines each including an input device with which a BET can be inputted, a numeric-symbol display capable of displaying a numeric symbol to each of a predetermined number of display regions, a memory storing a plurality of pieces of point-value combination data each showing a combination of a predetermined number of numeric symbols that can be displayed to the predetermined number of respective display regions, and a controller; a control device including a processor; and a network enabling communication between the plurality of gaming machines and the control device, wherein the combination of the predetermined number of numeric symbols is set to have a sum of a predetermined number of numeric values corresponding to the predetermined number of numeric symbols becoming equal to or more than a predetermined value, when a numeric symbol forming a predetermined combination of numeric symbols is included in the predetermined number of numeric symbols, the controller is programmed so as to execute the processing of: (a) accepting input indicative of a BET of game media, from the input device; and (b) transmitting BET information showing an amount of game media betted in the processing (a), to the processor, the processor is programmed so as to execute the processing of: (A) receiving the BET information transmitted in the processing (b); (B) determining either no offer of a special payout to a gaming machine of a transmission source of the BET information, or a size of the special payout to be offered to the gaming machine of the transmission source of the BET information, upon reception of the BET information in the processing (A); and (C) transmitting information based on the determined size of the special payout to the controller included in the gaming machine of the transmission source of the BET information, when the size of the special payout to be offered to this gaming machine has been determined in the processing (B), and the controller is programmed so as to execute the processing of: (c) identifying the predetermined number of numeric symbols which have a sum of corresponding numeric values becoming a total point value corresponding to the size of the special payout determined in the processing (B), based on the information transmitted in the processing (C) and the plurality of pieces of point-value combination data stored in the memory; (d) displaying the predetermined number of numeric symbols identified in the processing (c) to the predetermined number of respective display regions in the numeric-symbol display; and (e) paying out game media in an amount corresponding to the size of the special payout determined in the processing (B).

According to the gaming system, when the BET information has been received from the gaming machine, it is determined either no offer of the special payout to the gaming machine of the transmission source of the BET information, or the size of the special payout to be offered to the gaming machine of the transmission source of the BET information is determined, in the control device. When the size of the special payout has been determined, a numeric symbol is displayed to each of the predetermined number of display regions in the numeric-symbol display, in the gaming machine. The sum of numeric values corresponding to the predetermined number of these numeric symbols is the total point value corresponding to the size of the determined special payout.

That is, displaying the numeric symbols to the numeric-symbol display allows the player to recognize the total point value. Moreover, since the size of the special payout corresponds to the total point value, it is possible to notify the player of the size of the special payout.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the gaming system, presence or absence of the special payout, and the size of the special payout are determined at the same time. It is thus possible to ease the burden on the processing thereof.

According to the gaming system, when the numeric symbol forming the predetermined combination of numeric symbols is included in the predetermined number of numeric symbols, the combination of the predetermined number of numeric symbols is set so that the sum of the predetermined number of numeric values corresponding to the predetermined number of numeric symbols becomes equal to or more than the predetermined value.

Examples of such a case may include: a case in which, when “7”, “7”, and “7” are included in five numeric symbols as numeric symbols forming the predetermined combination of numeric symbols, the sum of the five numeric values corresponding to the five numeric symbols always becomes 37 or more; and a case in which the sum of the five numeric values being 37 or more for example indicates winning of a jackpot of “MINOR” or larger, from among four types of jackpots of “GRAND”, “MAJOR”, “MINOR”, and “MINI”.

Accordingly, display of the numeric symbols forming the predetermined combination of numeric symbols can make the player recognize that the special payout of the predetermined size or more has been determined. For example, in the example above, display of three numeric symbols of “7” can give the player the recognition that winning of the jackpot of “MINOR” or larger has become certain. It is therefore possible to make the player have interest and concern in the predetermined combination of numeric symbols. Also, it becomes possible to let the player fully enjoy the process in which the numeric symbols are sequentially displayed, and to make the player immersed in the game.

The present invention further provides a gaming system having the following configuration.

That is, the gaming system comprises: a plurality of gaming machines each including an input device with which a BET can be inputted, a numeric-symbol display capable of displaying a numeric symbol to each of a predetermined number of display regions, and a controller; a control device including a processor; and a network enabling communication between the plurality of gaming machines and the control device, wherein the gaming machine or the control device includes a memory storing a plurality of pieces of point-value combination data each showing a combination of a predetermined number of numeric symbols that can be displayed to the predetermined number of display regions, the controller is programmed so as to execute the processing of: (a) accepting input indicative of a BET of game media, from the input device; and (b) transmitting BET information showing an amount of game media betted in the processing (a), to the processor, the processor is programmed so as to execute the processing of: (A) receiving the BET information transmitted in the processing (b); and (B) determining either no offer of a special payout to a gaming machine of a transmission source of the BET information, or a size of the special payout to be offered to the gaming machine of the transmission source of the BET information, based on the received BET information, upon reception of the BET information in the processing (A), and the controller is programmed so as to execute the processing of: (c) displaying to the predetermined number of respective display regions in the numeric-symbol display the predetermined number of numeric symbols which are the predetermined number of numeric symbols shown by any piece of point-value combination data among the plurality of pieces of point-value combination data stored in the memory, and which have a sum of corresponding numeric values becoming a total point value corresponding to the size of the special payout determined in the processing (B), when the size of the special payout has been determined in the processing (B); and (d) paying out game media in an amount corresponding to the size of the special payout determined in the processing (B).

According to the gaming system, when the BET information has been received from the gaming machine, it is determined either no offer of the special payout to the gaming machine of the transmission source of the BET information, or the size of the special payout to be offered to the gaming machine of the transmission source of the BET information is determined, in the control device. When the size of the special payout has been determined, a numeric symbol is displayed to each of the predetermined number of display regions in the numeric-symbol display, in the gaming machine. The sum of numeric values corresponding to the predetermined number of these numeric symbols is the total point value corresponding to the size of the determined special payout.

That is, displaying the numeric symbols to the numeric-symbol display allows the player to recognize the total point value. Moreover, since the size of the special payout corresponds to the total point value, it is possible to notify the player of the size of the special payout.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the gaming system, presence or absence of the special payout, and the size of the special payout are determined at the same time. It is thus possible to ease the burden on the processing thereof.

According to the gaming system, based on the received BET information, it is determined either no offer of the special payout to the gaming machine of the transmission source of the BET information, or the size of the special payout to be offered to the gaming machine of the transmission source of the BET information is determined. Accordingly, a larger amount of betted game media can lead to a higher probability that the special payout is determined to be offered or a higher probability that a larger special payout is determined. Hence, it is possible to encourage the player to bet more game media and also possible to increase the profit of the game parlor.

Further, according to the gaming system, since the player having betted a larger number of game media can receive a profit of a larger special payout at a higher probability, it is possible to offer the special payout, while maintaining the fairness.

Further, the present invention provides a control method of a gaming system having the following configuration.

That is, the gaming system comprises: a plurality of gaming machines each including an input device with which a BET can be inputted, a numeric-symbol display capable of displaying a numeric symbol to each of a predetermined number of display regions, and a controller; a control device including a processor; and a network enabling communication between the plurality of gaming machines and the control device. The control method comprising the steps of: (a) the controller accepting input indicative of a BET of game media, from the input device; (b) the controller transmitting BET information showing an amount of game media betted in the step (a), to the processor; (A) the processor receiving the BET information transmitted in the step (b); (B) the processor determining either no offer of a special payout to a gaming machine of a transmission source of the BET information, or a total point value corresponding to a size of the special payout to be offered to the gaming machine of the transmission source of the BET information, upon reception of the BET information in the step (A); (C) the processor determining an amount of game media which corresponds to the determined total point value, when the total point value has been determined in the step (B); (c) the controller displaying to the predetermined number of respective display regions in the numeric-symbol display a predetermined number of numeric symbols which have a sum of corresponding numeric values becoming the total point value determined in the step (B), when the total point value has been determined in the step (B); and (d) the controller paying out game media in an amount determined in the step (C).

According to the control method of a gaming system, when the BET information has been received from the gaming machine, it is determined either no offer of the special payout to the gaming machine of the transmission source of the BET information, or the total point value corresponding to the size of the special payout to be offered to the gaming machine of the transmission source of the BET information is determined, in the control device. When the total point value has been determined, a numeric symbol is displayed to each of the predetermined number of display regions in the numeric-symbol display, in the gaming machine. The sum of numeric values corresponding to the predetermined number of these numeric symbols is the determined total point value.

That is, displaying the numeric symbols to the numeric-symbol display allows the player to recognize the total point value. Moreover, since the size of the special payout corresponds to the total point value, it is possible to notify the player of the size of the special payout.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the control method of a gaming system, presence or absence of the special payout, and the total point value are determined at the same time. It is thus possible to ease the burden on the processing thereof.

The present invention further provides a control method of a gaming system having the following configuration.

That is, the gaming system comprises: a plurality of gaming machines each including an input device with which a BET can be inputted, a numeric-symbol display capable of displaying a numeric symbol to each of a predetermined number of display regions, and a controller; a control device including a processor; and a network enabling communication between the plurality of gaming machines and the control device, wherein the gaming machine or the control device includes a memory storing a plurality of pieces of point-value combination data each showing a combination of a predetermined number of numeric symbols that can be displayed to the predetermined number of display regions. The control method comprises the steps of: (a) the controller accepting input indicative of a BET of game media, from the input device; (b) the controller transmitting BET information showing an amount of game media betted in the step (a), to the processor; (A) the processor receiving the BET information transmitted in the step (b); (B) the processor determining either no offer of a special payout to a gaming machine of a transmission source of the BET information, or a size of the special payout to be offered to the gaming machine of the transmission source of the BET information, upon reception of the BET information in the step (A); (c) the controller displaying to the predetermined number of respective display regions in the numeric-symbol display the predetermined number of numeric symbols which are the predetermined number of numeric symbols shown by any piece of point-value combination data among the plurality of pieces of point-value combination data stored in the memory, and which have a sum of corresponding numeric values becoming a total point value corresponding to the size of the special payout determined in the step (B), when the size of the special payout has been determined in the step (B); and (d) the controller paying out game media in an amount corresponding to the size of the special payout determined in the step (B).

According to the control method of a gaming system, when the BET information has been received from the gaming machine, it is determined either no offer of the special payout to the gaming machine of the transmission source of the BET information, or the size of the special payout to be offered to the gaming machine of the transmission source of the BET information is determined, in the control device. When the size of the special payout has been determined, a numeric symbol is displayed to each of the predetermined number of display regions in the numeric-symbol display, in the gaming machine. The sum of numeric values corresponding to the predetermined number of these numeric symbols is the total point value corresponding to the size of the determined special payout.

That is, displaying the numeric symbols to the numeric-symbol display allows the player to recognize the total point value. Moreover, since the size of the special payout corresponds to the total point value, it is possible to notify the player of the size of the special payout.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the control method of a gaming system, presence or absence of the special payout, and the size of the special payout are determined at the same time. It is thus possible to ease the burden on the processing thereof.

The present invention further provides a control method of a gaming system having the following configuration.

That is, the gaming system comprises: a plurality of gaming machines each including an input device with which a BET can be inputted, a numeric-symbol display capable of displaying a numeric symbol to each of a predetermined number of display regions, a memory storing a plurality of pieces of point-value combination data each showing a combination of a predetermined number of numeric symbols that can be displayed to the predetermined number of respective display regions, and a controller; a control device including a processor; and a network enabling communication between the plurality of gaming machines and the control device. The control method comprises the steps of: (a) the controller accepting input indicative of a BET of game media, from the input device; (b) the controller transmitting BET information showing an amount of game media betted in the step (a), to the processor; (A) the processor receiving the BET information transmitted in the step (b); (B) the processor determining either no offer of a special payout to a gaming machine of a transmission source of the BET information, or a size of the special payout to be offered to the gaming machine of the transmission source of the BET information, upon reception of the BET information in the step (A); (C) the processor transmitting information based on the determined size of the special payout to the controller included in the gaming machine of the transmission source of the BET information, when the size of the special payout to be offered to this gaming machine has been determined in the step (B); (c) the controller identifying the predetermined number of numeric symbols which have a sum of corresponding numeric values becoming a total point value corresponding to the size of the special payout determined in the step (B), based on the information transmitted in the step (C) and the plurality of pieces of point-value combination data stored in the memory; (d) the controller displaying the predetermined number of numeric symbols identified in the step (c) to the predetermined number of respective display regions in the numeric-symbol display; and (e) the controller paying out game media in an amount corresponding to the size of the special payout determined in the step (B).

According to the control method of a gaming system, when the BET information has been received from the gaming machine, it is determined either no offer of the special payout to the gaming machine of the transmission source of the BET information, or the size of the special payout to be offered to the gaming machine of the transmission source of the BET information is determined, in the control device. When the size of the special payout has been determined, a numeric symbol is displayed to each of the predetermined number of display regions in the numeric-symbol display, in the gaming machine. The sum of numeric values corresponding to the predetermined number of these numeric symbols is the total point value corresponding to the size of the determined special payout.

That is, displaying the numeric symbols to the numeric-symbol display allows the player to recognize the total point value. Moreover, since the size of the special payout corresponds to the total point value, it is possible to notify the player of the size of the special payout.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the gaming system, presence or absence of the special payout, and the size of the special payout are determined at the same time. It is thus possible to ease the burden on the processing thereof.

Furthermore, according to the control method of a gaming system, the predetermined number of numeric symbols to be displayed to the numeric-symbol display are identified in the gaming machine. Accordingly, the processing of identifying the predetermined number of numeric symbols becomes unnecessary in the control device, and thus throughput in the control device can be reduced.

The present invention further provides a control method of a gaming system having the following configuration.

That is, the gaming system comprising: a plurality of gaming machines each including an input device with which a BET can be inputted, a numeric-symbol display capable of displaying a numeric symbol to each of a predetermined number of display regions, a memory storing a plurality of pieces of point-value combination data each showing a combination of a predetermined number of numeric symbols that can be displayed to the predetermined number of respective display regions, and a controller; a control device including a processor; and a network enabling communication between the plurality of gaming machines and the control device. The control method comprises the steps of: (a) the controller accepting input indicative of a BET of game media, from the input device; (b) the controller transmitting BET information showing an amount of game media betted in the step (a), to the processor; (A) the processor receiving the BET information transmitted in the step (b); (B) the processor determining either no offer of a special payout to a gaming machine of a transmission source of the BET information, or a size of the special payout to be offered to the gaming machine of the transmission source of the BET information, upon reception of the BET information in the step (A); (C) the processor transmitting information based on the determined size of the special payout to the controller included in the gaming machine of the transmission source of the BET information, when the size of the special payout to be offered to this gaming machine has been determined in the step (B); (c) the controller identifying the predetermined number of numeric symbols which have a sum of corresponding numeric values becoming a total point value corresponding to the size of the special payout determined in the step (B), based on the information transmitted in the step (C) and the plurality of pieces of point-value combination data stored in the memory; (d) the controller determining an order of the predetermined number of numeric symbols identified in the step (c); (e) the controller displaying the predetermined number of numeric symbols identified in the step (c) to the predetermined number of respective display regions in the numeric-symbol display, based on the order determined in the step (d); and (f) the controller paying out game media in an amount corresponding to the size of the special payout determined in the step (B).

According to the control method of a gaming system, when the BET information has been received from the gaming machine, it is determined either no offer of the special payout to the gaming machine of the transmission source of the BET information, or the size of the special payout to be offered to the gaming machine of the transmission source of the BET information is determined, in the control device. When the size of the special payout has been determined, a numeric symbol is displayed to each of the predetermined number of display regions in the numeric-symbol display, in the gaming machine. The sum of numeric values corresponding to the predetermined number of these numeric symbols is the total point value corresponding to the size of the determined special payout.

That is, displaying the numeric symbols to the numeric-symbol display allows the player to recognize the total point value. Moreover, since the size of the special payout corresponds to the total point value, it is possible to notify the player of the size of the special payout.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the gaming system, presence or absence of the special payout, and the size of the special payout are determined at the same time. It is thus possible to ease the burden on the processing thereof.

According to the control method of a gaming system, when the predetermined number of numeric symbols have been identified, the order of these numeric symbols is determined. Based on the determined order, the predetermined number of numeric symbols are displayed.

Hence, pieces of data corresponding to a plurality of alignment orders with regard to a combination of the predetermined number of numeric symbols are not required to be stored in the memory as pieces of point-value combination data. For example, if a piece of the point-value combination data corresponding to "9", "10", "10", "10", and "11" is stored in the memory as a combination of the predetermined number of numeric symbols, it is possible to display the numeric symbols in the order of "10", "9", "10", "10", and "11".

Accordingly, the amount of data can be reduced in an amount corresponding to these pieces of data.

The present invention further provides a control method of a gaming system having the following configuration.

That is, the gaming system comprises: a plurality of gaming machines each including a numeric-symbol display, a memory, an input device, and a controller; a control device including a processor; and a network enabling communication between the plurality of gaming machines and the control device, wherein the numeric-symbol display is capable of displaying a numeric symbol to each of N (N is a natural number larger than M) display regions including M (M is a natural number) normal display regions and a special display regions; the memory stores a plurality of pieces of point-value combination data each showing a combination of N numeric symbols consisting of M numeric symbols that can be displayed to the normal display regions and (N-M) numeric symbol that can be displayed to the special display region; and the input device allows input of a BET, and input indicative of selection of the order in which the N numeric symbols are displayed. The control method comprises the steps of: (a) the controller accepting input indicative of a BET of game media, from the input device; (b) the controller transmitting BET information showing an amount of game media betted in the step (a), to the processor; (A) the processor receiving the BET information transmitted in the step (b); (B) the processor determining either no offer of a special payout to a gaming machine of a transmission source of the BET information, or a size of the special payout to be offered to the gaming machine of the transmission source of the BET information, upon reception of the BET information in the step (A); (C) the processor transmitting information based on the determined size of the special payout to the controller included in the gaming machine of the transmission source of the BET information, when the size of the special payout to be offered to this gaming machine has been determined in the step (B); (c) the controller identifying the N numeric symbols which have a sum of corresponding numeric values becoming a total point value corresponding to the size of the special payout determined in the step (B), based on the information transmitted in the step (C) and the plurality of pieces of point-value combination data stored in the memory; (d) the controller determining an order of the M numeric symbols to be displayed to the normal display regions out of the N numeric symbols identified in the step (c); (e) the controller accepting input indicative of selection of the order in which the N numeric symbols are displayed, from the input device; (f) the controller displaying each of the N numeric symbols identified in the step (c) to each of the N display regions in the numeric-symbol display, based on the order determined in the step (d) and the order selected in the step (e); and (g) the controller paying out game media in an amount corresponding to the size of the special payout determined in the step (B).

According to the control method of a gaming system, when the BET information has been received from the gaming machine, it is determined either no offer of the special payout to the gaming machine of the transmission source of the BET information, or the size of the special payout to be offered to the gaming machine of the transmission source of the BET information is determined, in the control device. When the size of the special payout has been determined, a numeric symbol is displayed to each of the predetermined number of display regions in the numeric-symbol display, in the gaming machine. The sum of numeric values corresponding to the predetermined number of these numeric symbols is the total point value corresponding to the size of the determined special payout.

That is, displaying the numeric symbols to the numeric-symbol display allows the player to recognize the total point value. Moreover, since the size of the special payout corresponds to the total point value, it is possible to notify the player of the size of the special payout.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the gaming system, presence or absence of the special payout, and the size of the special payout are determined at the same time. It is thus possible to ease the burden on the processing thereof.

Further, according to the control method of a gaming system, the N display regions consist of the M (M is a natural number) normal display regions and the special display regions. When the N numeric symbols have been identified, the order of the M numeric symbols to be displayed to the normal display regions out of the numeric symbols is determined.

Based on the determined order, the numeric symbols are displayed.

Hence, pieces of data corresponding to a plurality of alignment orders with regard to a combination of the M numeric symbols are not required to be stored in the memory as pieces of point-value combination data. For example, if a piece of the point-value combination data corresponding to "9", "10", "10", and "10" is stored in the memory as a combination of the M numeric symbols, it is possible to display the numeric symbols in the order of "10", "9", "10", and "10".

Accordingly, the amount of data can be reduced in an amount corresponding to these pieces of data.

According to the control method of a gaming system, the order of (N-M) numeric symbols to be displayed to the special display regions is not determined. That is, the (N-M) numeric symbols are the numeric symbols that are previously determined in association with the respective special display regions.

Accordingly, setting the numeric symbols corresponding to relatively large numeric values in association with the special display regions causes display of those numeric symbols corresponding to the relatively large numeric values to the special display regions.

On the other hand, according to the control method of a gaming system, the player can select the order in which the N numeric symbols are displayed. Thus, it is possible to let the player enjoy the timing of when to display the numeric symbols to the special display regions. It is also possible to let the player fully enjoy the process in which the numeric symbols are sequentially displayed.

The present invention further provides a control method of a gaming system having the following configuration.

That is, the gaming system comprises: a plurality of gaming machines each including an input device with which a BET can be inputted, a numeric-symbol display capable of displaying a numeric symbol to each of a predetermined number of display regions, a memory storing a plurality of pieces of point-value combination data each showing a combination of a predetermined number of numeric symbols that can be displayed to the predetermined number of respective display regions, and a controller; a control device including a processor; and a network enabling communication between the plurality of gaming machines and the control device, wherein the combination of the predetermined number of numeric symbols is set to have a sum of a predetermined number of numeric values corresponding to the predetermined number of numeric symbols becoming equal to or more than a predetermined value, when a numeric symbol forming a predetermined combination of numeric symbols is included in the predetermined number of numeric symbols. The control method comprises the steps of: (a) the controller accepting input indicative of a BET of game media, from the input device; (b) the controller transmitting BET information showing an amount of game media betted in the step (a), to the processor; (A) the processor receiving the BET information transmitted in the step (b); (B) the processor determining either no offer of a special payout to a gaming machine of a transmission source of the BET information, or a size of the special payout to be offered to the gaming machine of the transmission source of the BET information, upon reception of the BET information in the step (A); (C) the processor transmitting information based on the determined size of the special payout to the controller included in the gaming machine of the transmission source of the BET information, when the size of the special payout to be offered to this gaming machine has been determined in the step (B); (c) the controller identifying the predetermined number of numeric symbols which have a sum of corresponding numeric values becoming a total point value corresponding to the size of the special payout determined in the step (B), based on the information transmitted in the step (C) and the plurality of pieces of point-value combination data stored in the memory; (d) the controller displaying the predetermined number of numeric symbols identified in the step (c) to the predetermined number of respective display regions in the numeric-symbol display; and (e) the controller paying out game media in an amount corresponding to the size of the special payout determined in the step (B).

According to the control method of a gaming system, when the BET information has been received from the gaming machine, it is determined either no offer of the special payout to the gaming machine of the transmission source of the BET information, or the size of the special payout to be offered to the gaming machine of the transmission source of the BET information is determined, in the control device. When the size of the special payout has been determined, a numeric symbol is displayed to each of the predetermined number of display regions in the numeric-symbol display, in the gaming machine. The sum of numeric values corresponding to the predetermined number of these numeric symbols is the total point value corresponding to the size of the determined special payout.

That is, displaying the numeric symbols to the numeric-symbol display allows the player to recognize the total point value. Moreover, since the size of the special payout corresponds to the total point value, it is possible to notify the player of the size of the special payout.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the gaming system, presence or absence of the special payout, and the size of the special payout are determined at the same time. It is thus possible to ease the burden on the processing thereof.

According to the control method of a gaming system, when the numeric symbol forming the predetermined combination of numeric symbols is included in the predetermined number of numeric symbols, the combination of the predetermined number of numeric symbols is set so that the sum of the predetermined number of numeric values corresponding to the predetermined number of numeric symbols becomes equal to or more than the predetermined value.

Examples of such a case may include a case in which, when "7", "7", and "7" are included in five numeric symbols as numeric symbols forming the predetermined combination of numeric symbols, the sum of the five numeric values corresponding to the five numeric symbols always becomes 37 or more; also, the sum of the five numeric values being 37 or more for example may indicate winning of a jackpot of "MINOR" or higher, from among four types of jackpots of "GRAND", "MAJOR", "MINOR", and "MINI".

Accordingly, display of the numeric symbols forming the predetermined combination of numeric symbols can make the player recognize that the special payout of the predetermined size or more has been determined. For example, in the example above, display of three numeric symbols of "7" can give the player the recognition that winning of the jackpot of "MINOR" or larger has become certain. It is therefore possible to make the player have interest and concern in the predetermined combination of numeric symbols. Also, it becomes possible to let the player fully enjoy the process in which the numeric symbols are sequentially displayed, and to make the player absorbed in the game.

The present invention further provides a control method of a gaming system having the following configuration.

That is, the gaming system comprises: a plurality of gaming machines each including an input device with which a BET can be inputted, a numeric-symbol display capable of displaying a numeric symbol to each of a predetermined number of display regions, and a controller; a control device including a processor; and a network enabling communication between the plurality of gaming machines and the control device, wherein the gaming machine or the control device includes a memory storing a plurality of pieces of point-value combination data each showing a combination of a predetermined number of numeric symbols that can be displayed to the predetermined number of display regions. The control method comprises the steps of: (a) the controller accepting input indicative of a BET of game media, from the input device; (b) the controller transmitting BET information showing an amount of game media betted in the step (a), to the processor; (A) the processor receiving the BET information transmitted in the step (b); (B) the processor determining either no offer of a special payout to a gaming machine of a transmission source of the BET information, or a size of the special payout to be offered to the gaming machine of the transmission source of the BET information, based on the received BET information, upon reception of the BET information in the step (A); (c) the controller displaying to the predetermined number of respective display regions in the numeric-symbol display the predetermined number of numeric symbols which are the predetermined number of numeric symbols shown by any piece of point-value combination data among the plurality of pieces of point-value combination data stored in the memory, and which have a sum of corresponding numeric values becoming a total point value corresponding to the size of the special payout determined in the step (B), when the size of the special payout has been determined in the step (B); and (d) the controller paying out game media in an amount corresponding to the size of the special payout determined in the step (B).

According to the control method of a gaming system, when the BET information has been received from the gaming machine, it is determined either no offer of the special payout to the gaming machine of the transmission source of the BET information, or the size of the special payout to be offered to the gaming machine of the transmission source of the BET information is determined, in the control device. When the size of the special payout has been determined, a numeric symbol is displayed to each of the predetermined number of display regions in the numeric-symbol display, in the gaming machine. The sum of numeric values corresponding to the predetermined number of these numeric symbols is the total point value corresponding to the size of the determined special payout.

That is, displaying the numeric symbols to the numeric-symbol display allows the player to recognize the total point value. Moreover, since the size of the special payout corresponds to the total point value, it is possible to notify the player of the size of the special payout.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the gaming system, presence or absence of the special payout, and the size of the special payout are determined at the same time. It is thus possible to ease the burden on the processing thereof.

According to the control method of a gaming system, based on the received BET information, it is determined either no offer of the special payout to the gaming machine of the transmission source of the BET information, or the size of the special payout to be offered to the gaming machine of the transmission source of the BET information is determined. Accordingly, a larger amount of betted game media can lead to a higher probability that the special payout is determined to be offered or a higher probability that a larger special payout is determined. Hence, it is possible to encourage the player to bet more game media and also possible to increase the profit of the game parlor.

Further, according to the control method of a gaming system, since the player having betted a larger number of game media can receive a profit of a larger special payout at a higher probability, it is possible to offer the special payout, while maintaining the fairness.

The present invention further provides a gaming system having the following configuration.

That is, the gaming system comprises: a plurality of gaming machines each including a numeric-symbol display capable of displaying a numeric symbol to each of a predetermined number of display regions, and a controller; a control device including a processor; and a network enabling communication between the plurality of gaming machines and the control device, wherein the processor is programmed so as to execute the processing of: (A) determining a total point value corresponding to a size of a special payout to be offered to a predetermined gaming machine; and (B) determining an amount of game media which corresponds to the determined total point value, when the total point value has been determined in the processing (A), and the controller is programmed so as to execute the processing of: (a) displaying to the predetermined number of respective display regions in the numeric-symbol display a predetermined number of numeric symbols which have a sum of corresponding numeric values becoming the total point value determined in the processing (A), when the total point value has been determined in the processing (A); and (b) paying out game media in an amount determined in the processing (B).

According to the gaming system, the total point value corresponding to the size of the special payout to be offered to the predetermined gaming machine is determined, in the control device. When the total point value has been determined, a numeric symbol is displayed to each of the predetermined number of display regions in the numeric-symbol display, in the gaming machine. The sum of numeric values corresponding to the predetermined number of these numeric symbols is the determined total point value.

That is, displaying the numeric symbols to the numeric-symbol display allows the player to recognize the total point value. Moreover, since the size of the special payout corresponds to the total point value, it is possible to notify the player of the size of the special payout.

The present invention further provides a control method of a gaming system having the following configuration.

That is, the gaming system comprises: a plurality of gaming machines each including a numeric-symbol display capable of displaying a numeric symbol to each of a predetermined number of display regions, and a controller; a control device including a processor; and a network enabling communication between the plurality of gaming machines and the control device. The control method comprises the steps of: (A) the processor determining a total point value corresponding to a size of a special payout to be offered to a predetermined gaming machine; (B) the processor determining an amount of game media which corresponds to the determined total point value, when the total point value has been determined in the step (A); (a) the controller displaying to the predetermined number of respective display regions in the numeric-symbol display a predetermined number of numeric symbols which have a sum of corresponding numeric values becoming the total point value determined in the step (A), when the total point value has been determined in the step (A); and (b) the controller paying out game media in an amount determined in the step (B).

According to the control method of a gaming system, the total point value corresponding to the size of the special payout to be offered to the predetermined gaming machine is determined, in the control device. When the size of the special payout has been determined, a numeric symbol is displayed to each of the predetermined number of display regions in the numeric-symbol display, in the gaming machine. The sum of numeric values corresponding to the predetermined number of these numeric symbols is the determined total point value.

That is, displaying the numeric symbols to the numeric-symbol display allows the player to recognize the total point value. Moreover, since the size of the special payout corresponds to the total point value, it is possible to notify the player of the size of the special payout.

BRIEF DESCRIPTIONS OF THE DRAWINGS

FIG. 1A is a view illustrating a jackpot determination table.

FIG. 1B is a view illustrating correspondence relationships between ranks and total point values.

FIG. 1F is a view illustrating a point-value combination table for GRAND.

FIG. 1G is a view illustrating a point-value combination table for MAJOR.

FIG. 1H is a view illustrating a point-value combination table for MINOR.

FIG. 1I is a view illustrating a point-value combination table for MINI.

FIG. 5 is a view illustrating arrangement of symbols that are drawn on peripheral surfaces of reels of the gaming machine according to the embodiments of the present invention.

FIG. 8 is a view illustrating a symbol combination table of the gaming machine according to the embodiments of the present invention.

FIG. 21 is a view illustrating a numeric-symbol table.

FIG. 26 is a view illustrating a jackpot determination table according to the second embodiment.

FIG. 27 is a view illustrating an exemplary point-value combination table according to the second embodiment.

DESCRIPTION OF THE EMBODIMENTS

Hereinafter, embodiments of the present invention are described based on the drawings.

A gaming system according to one embodiment of the present invention includes a plurality of gaming machines, an external control device, and communication lines.

The plurality of gaming machines each includes BET buttons and a lower image display panel. With the BET buttons, input of BETs can be performed. The lower image display panel is capable of displaying a numeric image to each of a first display region to a fifth display region (numeric-symbol display regions).

The communication lines enable communication between the plurality of gaming machines and the external control device.

Each of the gaming machines (a) accepts input indicative of a BET of coins from the BET buttons, and (b) transmits BET information showing the number of betted coins to the external control device.

The external control device (A) receives the BET information, and (B) determines "No rank" or determines anyone of ranks out of "MINI", "MINOR", "MAJOR", and "GRAND".

Each of the gaming machines (c) displays, when any one of the ranks out of "MINI", "MINOR", "MAJOR", and "GRAND" has been determined, five numeric symbols having a sum of corresponding numeric values becoming a total point value corresponding to the determined rank to five respective display regions in the lower image display panel, and (d) pays out coins of the number corresponding to the determined rank.

First Embodiment

Figure 1C:
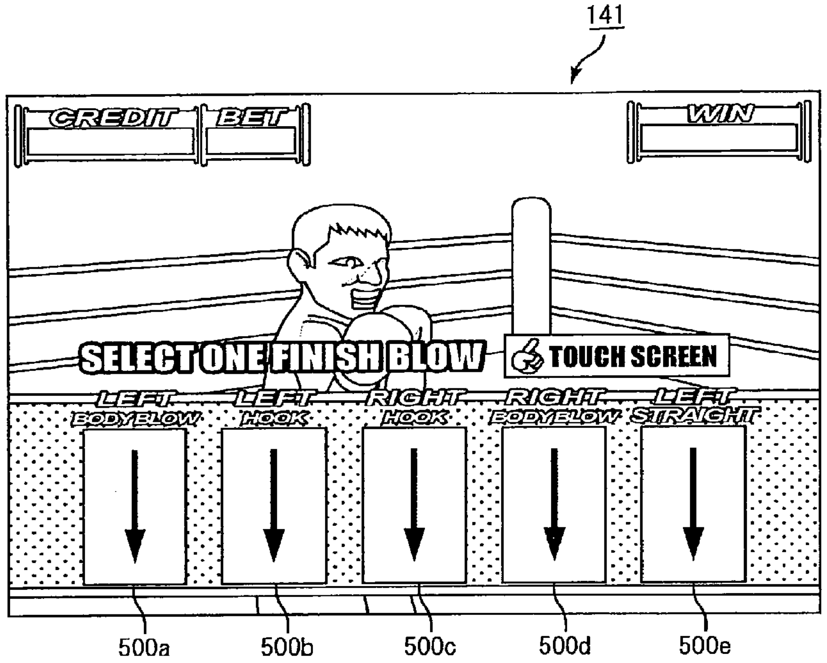
FIG. 1C is a view illustrating an exemplary image displayed to a lower image display panel that is provided in a gaming machine forming a gaming system according to embodiments of the present invention.
Figure 1D:
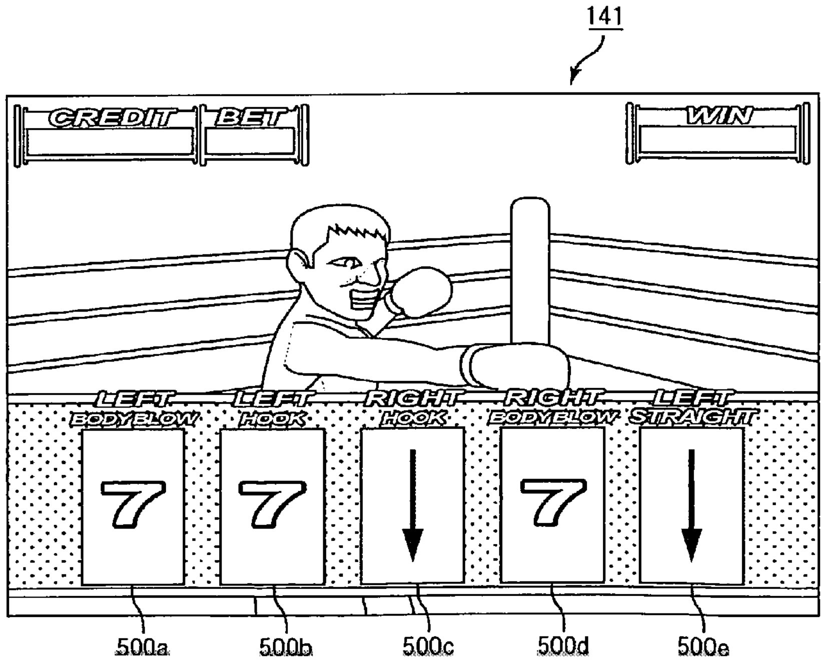
FIG. 1D is a view illustrating an exemplary image displayed to the lower image display panel that is provided in the gaming machine forming the gaming system according to the embodiments of the present invention.
Figure 1E:
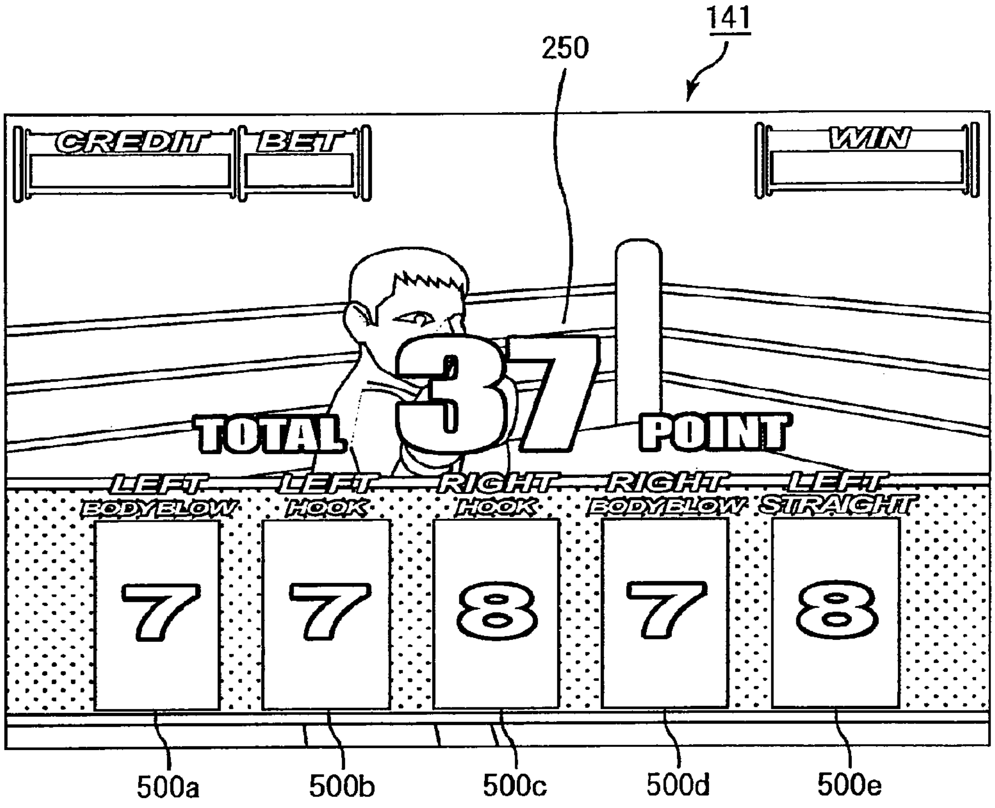
FIG. 1E is a view illustrating an exemplary image displayed to the lower image display panel that is provided in the gaming machine forming the gaming system according to the embodiments of the present invention.

First, with reference to FIG. 1 (FIGS. 1A to 1I), an overview of a first embodiment is described.

According to a gaming system 300 (see FIG. 3) relating to the first embodiment, two types of payouts, namely a normal payout and a special payout, can be offered in each gaming machine 1 (see FIG. 3) forming the gaming system 300.

With regard to the normal payout, coins of the number corresponding to a stop-displayed symbol or a combination of stop-displayed symbols in a slot machine game conducted in the gaming machine 1 are paid out. The normal payout is described in detail with reference to FIG. 2 and the subsequent drawings.

With FIG. 1, the special payout is described.

In the first embodiment, four types of the special payout, namely "MINI", "MINOR", "MAJOR", and "GRAND", are set in an ascending order of the number of coins to be paid out. These "MINI", "MINOR", "MAJOR", and "GRAND" are also called four types of "ranks", in the specification. It is to be noted that determining none of the ranks is called "No rank".

FIG. 1A is a view illustrating a jackpot determination table.

In the jackpot determination table shown in FIG. 1A, "GRAND", "MAJOR", "MINOR", "MINI" and "No rank" are in association with respective random number ranges. For the random number ranges, different ranges are set according to the number of betted coins (the number of BETs).

Figure 3:
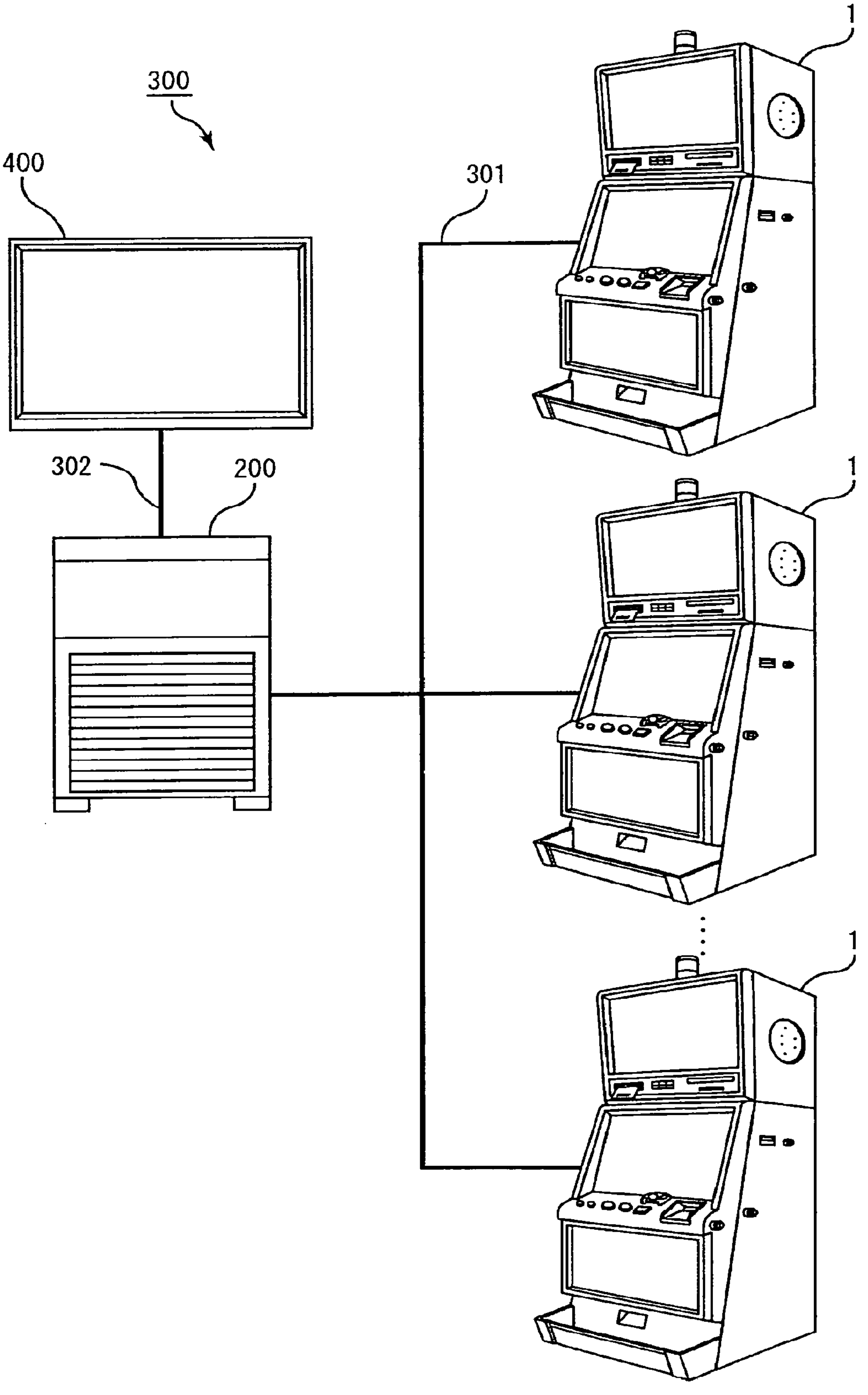
FIG. 3 is a view illustrating the gaming system including the gaming machine according to the embodiments of the present invention.

When the BET information showing the number of BETs has been received from the gaming machine 1, one random number is acquired in an external control device 200 (see FIG. 3). Then, based on the value of the acquired random number and the number of BETs, any of the ranks or "No rank" is determined.

For example, when the value of the acquired random number is "30" and the number of BETs is "1", "No rank" is determined.

Further, when the value of the acquired random number is "30" and the number of BETs is "2", "MINI" is determined.

Furthermore, when the value of the acquired random number is "30" and the number of BETs is "100", "GRAND" is determined.

As thus described, in the first embodiment, it is configured such that a larger number of BETs leads to a higher probability that any of the ranks is determined than the probability that "No rank" is determined, and to a higher probability that any of the ranks having a relatively large number of coins to be paid out is determined.

The respective "MINI", "MINOR", "MAJOR", and "GRAND" correspond to the numbers of coins to be paid out, i.e. the sizes of profits that the player can acquire, and thus which rank has been determined is a serious matter of concern for the player.

In the first embodiment, the determined rank is notified to the player, in the way described below.

FIG. 1B is a view illustrating correspondence relationships between the ranks and the total point values.

As shown in FIG. 1B, the respective "MINI", "MINOR", "MAJOR" and "GRAND" correspond to the predetermined numeric value ranges. In the specification, a numeric value belonging to the numeric value range is also called "the total point value".

In the first embodiment, the total point value is notified to the player. Thus, the player can find out the rank.

Hereinafter, with reference to FIGS. 1C to 1E, notification of the total point value is described.

FIGS. 1C to 1E are views illustrating an exemplary image displayed to the lower image display panel that is provided in the gaming machine forming the gaming system according to the embodiment of the present invention.

When "MINI", "MINOR", "MAJOR", or "GRAND" has been determined in the external control device 200, an image as shown in FIG. 1C is displayed in the gaming machine 1. It is to be noted that a similar image is displayed to a large monitor 400 (see FIG. 3).

FIG. 1C shows a state in which the numeric symbols are scroll-displayed in respective first display region 500*a*, second display region 500*b*, third display region 500*c*, fourth display region 500*d*, and fifth display region 500*e*.

The player can make the numeric symbols stop-displayed by touching places on a touch panel corresponding to the respective first display region 500*a*, second display region 500*b*, third display region 500*c*, fourth display region 500*d*, and fifth display region 500*e*.

FIG. 1D shows a state in which the numeric symbols are stop-displayed in the first display region 500*a*, the second display region 500*b*, and the fourth display region 500*d*.

FIG. 1E shows a state in which the numeric symbols are stop-displayed in all the display regions of the first display region 500*a*, second display region 500*b*, third display region 500*c*, fourth display region 500*d*, and fifth display region 500*e*.

When the numeric symbols have been stop-displayed in all the display regions of the first display region 500*a*, second display region 500*b*, third display region 500*c*, fourth display region 500*d*, and fifth display region 500*e*, a total-point-value image is displayed to a lower image display panel 141. The total-point-value image is an image corresponding to the total point value.

The example of FIG. 1E shows a state in which a total-point-value image 250, showing that the total point value is 37, is displayed. By seeing this image, the player can find out that "MINOR" has been determined as the rank.

Subsequently, with reference to FIGS. 1F to 1I, there is described identification of the numeric symbols to be displayed to the respective first display region 500*a*, second display region 500*b*, third display region 500*c*, fourth display region 500*d*, and fifth display region 500*e*.

The numeric symbols to be displayed to the respective first display region 500*a*, second display region 500*b*, third display region 500*c*, fourth display region 500*d*, and fifth display region 500*e* are identified based on a point-value combination table.

The point-value combination tables include a point-value combination table for GRAND, a point-value combination table for MAJOR, a point-value combination table for MINOR, and a point-value combination table for MINI.

FIG. 1F is a view illustrating the point-value combination table for GRAND.

FIG. 1G is a view illustrating the point-value combination table for MAJOR.

FIG. 1H is a view illustrating the point-value combination table for MINOR.

FIG. 1I is a view illustrating the point-value combination table for MINI.

In the point-value combination table, four numeric symbols that can be displayed to the display regions from the first display region 500*a* to the fourth display region 500*d*, one numeric symbol that can be displayed to the fifth display region 500*e*, and a random number range are in association with one another.

A combination of numeric symbols, consisting of four numeric symbols that can be displayed to the display regions from the first display region 500*a* to the fourth display region 500*d* and one numeric symbol that can be displayed to the fifth display region 500*e*, corresponds to "the combination of the predetermined number of numeric symbols that can be displayed to the predetermined number of display regions" in the present invention.

When "MINI", "MINOR", "MAJOR", or "GRAND" has been determined in the external control device 200, one random number is acquired in the gaming machine 1. Then, the numeric symbols are determined based on the value of the acquired random number and the point-value combination table corresponding to the determined rank.

For example, when "GRAND" has been determined in the external control device 200 and the value of the acquired random number is "20000", then "9", "9", "11" and "11" are identified as four numeric symbols to be displayed to the display regions from the first display region 500*a* to the fourth display region 500*d*, and "10" is determined as one numeric symbol to be displayed to the fifth display region 500*e* (see No. 7 in FIG. 1F).

Also, when "MINOR" has been determined in the external control device 200 and the value of the acquired random number is "20000", then "7", "7", "7" and "8" are identified as four numeric symbols to be displayed to the display regions from the first display region 500*a* to the fourth display region 500*d*, and "8" is determined as one numeric symbol to be displayed to the fifth display region 500*e* (see No. 17 in FIG. 1H).

As thus described, although four numeric symbols are set as the numeric symbols that can be displayed to the display regions from the first display region 500*a* to the fourth display region 500*d*, it does not mean that four numeric symbols are displayed always in the orders shown in FIGS. 1F to 1I.

In the example above, the numeric symbols are not displayed always in the order of "9", "9", "11", and "11"; for example, the numeric symbols may be displayed in the order of "9", "11", "9" and "11". Which numeric symbol of the four numeric symbols is to be displayed to which display region is determined by lottery.

In contrast, only one corresponding numeric symbol is set for the fifth display region 500*e*, and this numeric symbol is to be displayed.

It is to be noted that the numeric symbols corresponding to the numeric values from "6" to "11" are set as the numeric symbols that can be displayed to the fifth display region 500*e*, as shown in FIGS. 1F to 1I.

On the other hand, the numeric symbols corresponding to the numeric values from "3" to "11" are set as the numeric symbols that can be displayed to the display regions from the first display region 500*a* to the fourth display region 500*d*.

As thus described, the numeric symbols corresponding to the numeric values equal to or more than a predetermined value (6) are set as the numeric symbols that can be displayed to the fifth display region 500*e*.

The fifth display region 500*e* corresponds to the special display region of the present invention. Further, the display regions from the first display region 400*a* to the fourth display region 500*d* correspond to the normal display regions of the present invention.

Further, in the first embodiment, some of the combinations of four numeric symbols that can be displayed to the display regions from the first display region 500*a* to the fourth display region 500*d* include combinations, each having the numeric symbols forming a predetermined combination of numeric symbols, among the four numeric symbols forming the combination. Examples of the predetermined combination of numeric symbols may include combinations of "5, 5, 5", "7, 7, 7", "8, 8, 8", "5, 6, 7, 8" and "6, 7, 8, 9".

In the point-value combination tables, when the five numeric symbols that can be displayed to the display regions from the first display region 500*a* to the fifth display region 500*e* include the numeric symbols forming the aforementioned predetermined combinations of numeric symbols, the combination of the five numeric symbols is set so that the sum of the five numeric values corresponding to the five numeric symbols becomes equal to or more than the predetermined value. This predetermined value is the minimum numeric value among the numeric values belonging to the numeric value ranges that correspond to the rank.

For example, when "7, 7, 7" is included in the five numeric symbols that can be displayed to the first display region 500*a* to the fifth display region 500*e*, the sum of the five numeric values corresponding to the five numeric symbols always becomes 37 or more. Otherwise phrased, the combination of five numeric symbols including "7, 7, 7" is not included in the point-value combination table for MINI (see FIG. 1I).

The numeric value of 37 is the minimum numeric value among the numeric values belonging to the numeric range of "37 to 45" which corresponds to "MINOR".

Accordingly, when three numeric symbols of "7" have been displayed to the display regions from the first display region 500*a* to the fourth display region 500*d* as shown in FIG. 1D, it is possible to give the player the recognition that winning of the special payout of "MINOR" or larger has become certain.

According to the gaming system 300 relating to one embodiment of the present invention, displaying the numeric symbols to the display regions from the first display region 500*a* to the fifth display region 500*e* allows the player to recognize the total point value. Moreover, it is possible to notify the player of the determined rank.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the gaming system 300 relating to one embodiment of the present invention, presence or absence of the special payout, and the size of the special payout are determined at the same time. It is thus possible to ease the burden on the processing thereof.

With reference to FIG. 1, the overview of the first embodiment has been described above.

Hereinafter, further detailed descriptions are given.

[Explanation of Function Flow Diagram]

Figure 2:
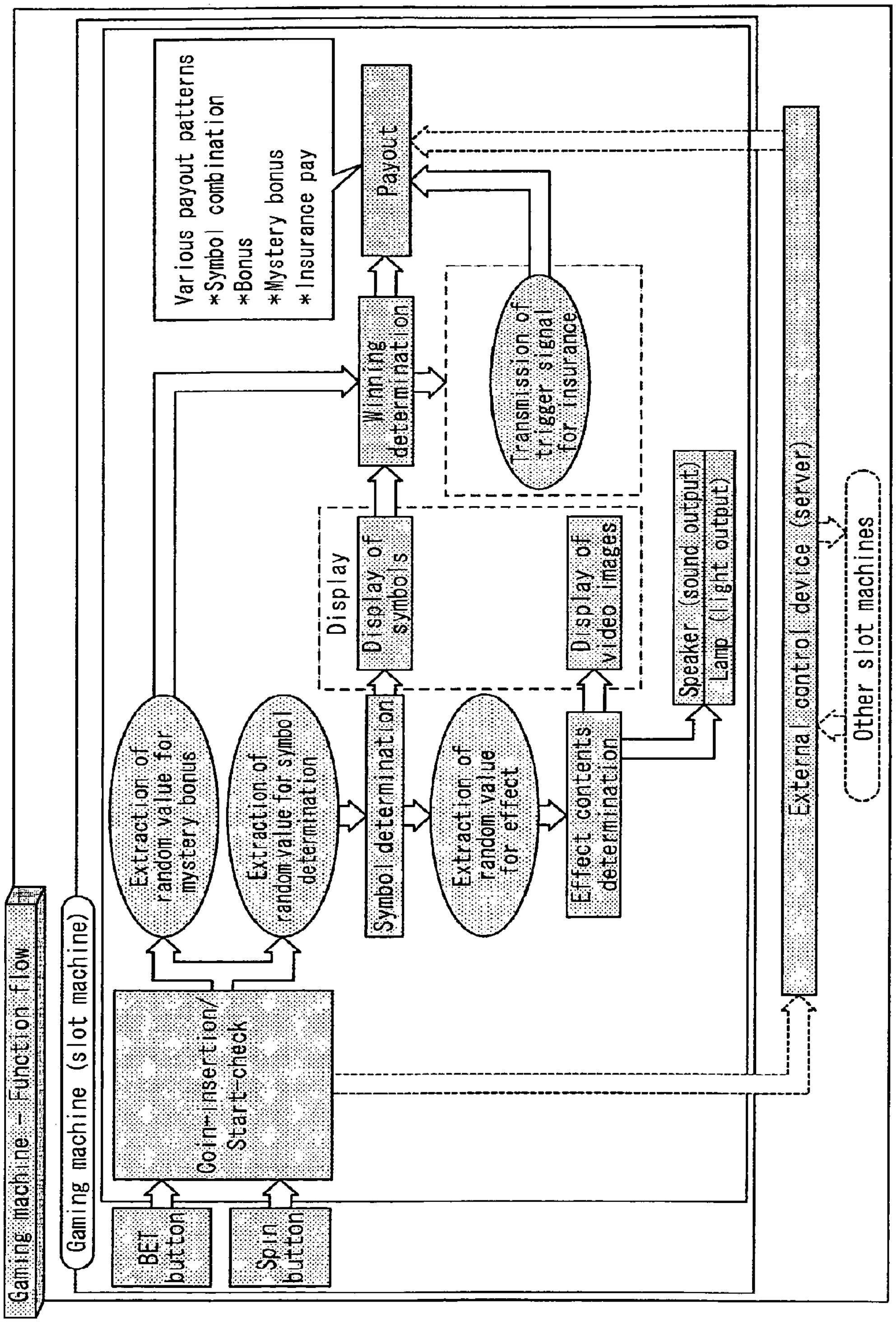
FIG. 2 is a view illustrating a function flow of the gaming machine according to the embodiments of the present invention.

With reference to FIG. 2, basic functions of the gaming machine according to the present embodiment are described.

FIG. 2 is a view illustrating a function flow of the gaming machine according to the embodiment of the present invention.

<Coin-Insertion/Start-Check>

First, the gaming machine checks whether or not a BET button has been pressed by the player, and subsequently checks whether or not a spin button has been pressed by the player.

<Symbol Determination>

Next, when the spin button has been pressed by the player, the gaming machine extracts random values for symbol determination, and determines symbols to be displayed at the time of stopping scrolling of symbol arrays for the player, for a plurality of respective video reels displayed to a display.

<Symbol Display>

Next, the gaming machine starts scrolling of the symbol array of each of the video reels and then stops scrolling so that the determined symbols are displayed for the player.

<Winning Determination>

When scrolling of the symbol array of each video reel has been stopped, the gaming machine determines whether or not a combination of symbols displayed for the player is a combination related to winning.

<Payout>

When the combination of symbols displayed for the player is a combination related to winning, the gaming machine offers benefits according to the combination to the player.

For example, when a combination of symbols related to a payout of coins has been displayed, the gaming machine pays out coins of the number corresponding to the combination of symbols to the player.

Further, when a combination of symbols related to a bonus game trigger has been displayed, the gaming machine starts a bonus game. It is to be noted that, in the present embodiment, a game (free game) in which a lottery relating to the aforementioned determination of to-be stopped symbols is held a predetermined number of times without using coins is played as a bonus game.

Further, in addition to the aforementioned benefits, the gaming machine is provided with benefits such as a mystery bonus and insurance.

The mystery bonus is a bonus in which a predetermined amount of coins are paid out for winning of a lottery that is intended for the mystery bonus. When the spin button has been pressed, the gaming machine extracts a random value for mystery bonus and determines whether or not to establish a mystery bonus by lottery.

The insurance is a function provided for a purpose of relieving the player from a situation in which a bonus game has not been played for long periods of time. In the present embodiment, the player can arbitrarily select whether or not to make the insurance effective. Making insurance effective requires a predetermined insurance-purchase amount to be paid in exchange.

In the case where the insurance has been made effective, the gaming machine starts counting the number of games. The gaming machine conducts a payout of coins of the amount that is set for the insurance, when the number of counted games has reached a previously determined number of times without a large amount of payout relating to a bonus game or the like being conducted.

<Determination of Effects>

The gaming machine produces effects by displaying images to the display, outputting the light from lamps, and outputting sounds from speakers. The gaming machine extracts a random value for effect and determines contents of the effects based on the symbols and the like determined by lottery.

[Overall Gaming System]

The basic functions of the gaming machine have been described above. Next, with reference to FIG. 3, the gaming system including the gaming machine is described.

FIG. 3 is a view illustrating the gaming system including the gaming machine according to the embodiment of the present invention.

The gaming system 300 includes the plurality of gaming machines 1, the external control device 200 that is connected to each of the gaming machines 1 through a communication line 301, and the large monitor 400.

The external control device 200 is for controlling the plurality of gaming machines 1. In the present embodiment, the external control device 200 is a so-called hall server which is installed in a game facility having the plurality of gaming machines 1. Each of the gaming machines 1 is provided with a unique identification number, and the external control device 200 identifies transmission sources of data transmitted from the respective gaming machines 1 by using the identification numbers. Also in the case where the external control device 200 transmits data to a gaming machine 1, the identification numbers are used for specifying the transmission destination.

The external control device 200 is further connected with the large monitor 400 through a communication line 302. The large monitor 400 displays appropriate effect images (see FIG. 1).

It is to be noted that the gaming system 300 may be constructed within a single game facility where various games can be conducted, such as a casino, or may be constructed among a plurality of game facilities. Further, when the gaming system 300 is constructed in a single game facility, the gaming system 300 may be constructed in each floor or section of the game facility. The communication line 301 may be a wired or wireless line, and can adopt a dedicated line, an exchange line or the like. The communication line 301 corresponds to the network of the present invention.

[Overall Configuration of Gaming Machine]

The gaming system according to the present embodiment has been described above. Next, with reference to FIG. 4, an overall configuration of the gaming machine 1 is described.

Figure 4:
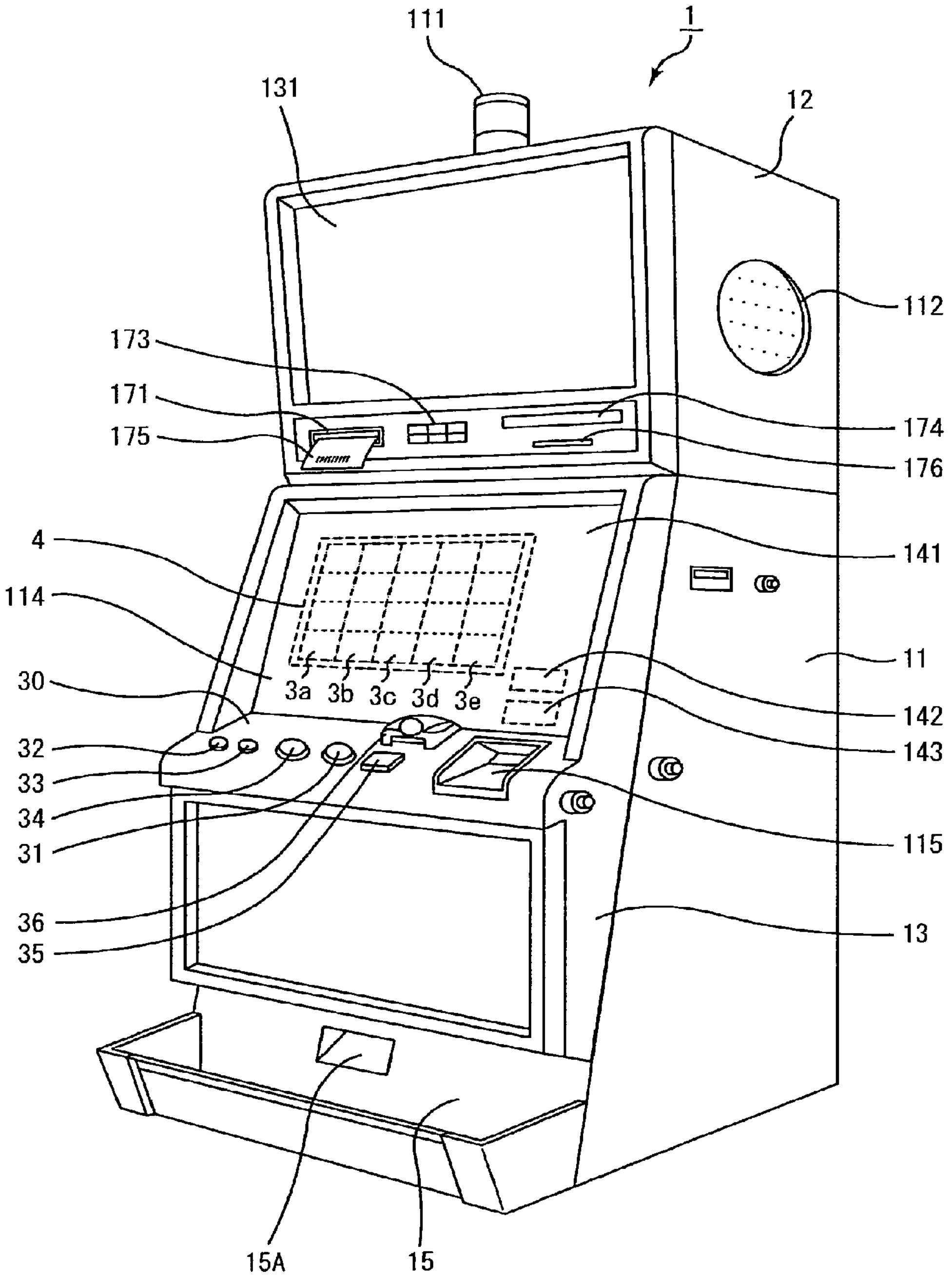
FIG. 4 is a view illustrating an overall configuration of the gaming machine according to the embodiments of the present invention.

FIG. 4 is a view illustrating the overall configuration of the gaming machine according to the embodiment of the present invention.

A coin, a bill, or electrically valuable information corresponding to these is used as a game medium in the gaming machine 1. Further, in the present embodiment, a later-described ticket with a barcode is also used. It is to be noted that the game medium is not limited to these, and for example a medal, a token, electric money or the like can be adopted.

The gaming machine 1 includes a cabinet 11, a top box 12 installed on the upper side of the cabinet 11, and a main door 13 provided at the front face of the cabinet 11.

The lower image display panel 141 is provided at the center of the main door 13. The lower image display panel 141 includes a liquid crystal panel, and forms the display. The lower image display panel 141 has a symbol display region 4. To the symbol display region 4, five video reels 3 (3*a*, 3*b*, 3*c*, 3*d*, 3*e*) are displayed.

In the present embodiment, a video reel depicts through videos the rotational and stop motions of a mechanical reel having a plurality of symbols drawn on the peripheral surface thereof. To each of the video reels 3, a symbol array comprised of a previously determined plurality (22 in the present embodiment) of symbols is assigned (see FIG. 5 which is described later).

In the symbol display region 4, the symbol arrays assigned to the respective video reels 3 are separately scrolled, and are stopped after predetermined time has elapsed. As a result, a part (four consecutive symbols in the present embodiment) of each of the symbol arrays is displayed for the player.

The symbol display region 4 has four regions, namely an upper region, an upper central region, a lower central region, and a lower region, for each video reel 3, and a single symbol is to be displayed to each region. That is, 20 (=5 columns×4 symbols) symbols are to be displayed in the symbol display region 4.

In the present embodiment, a line formed by selecting one of the aforementioned four regions for each of the video reels 3 and connecting the respective regions is referred to as a winning line.

It is to be noted that any desired shape of the winning line can be adopted, and examples of the shape of the winning line may include a straight line formed by connecting the upper central regions for the respective video reels 3, a V-shaped line, and a bent line. Also, any desired number of lines can be adopted, and the number can be for example 30 lines.

In the present embodiment, the numeric symbols are particularly displayed to the display regions from the first display region 500*a* to the fifth display region 500*e* in the lower image display panel 141. The lower image display panel 141 corresponds to the numeric-symbol display of the present invention.

It is to be noted that, although a case has been described in which the gaming machine 1 is a so-called video slot machine in the present embodiment, the gaming machine of the present invention may be configured so that the numeric symbols are stop-displayed by so-called mechanical reels.

Further, the lower image display panel 141 has a number-of-credits display region 142 and a number-of-payouts display region 143. The number-of-credits display region 142 displays the number of coins (hereinafter also referred to as "the number of credits") owned by the player and retained inside the gaming machine 1. The number-of-payouts display region 143 displays the number of coins (hereinafter also referred to as "the number of payouts") to be paid out to the player when winning is established.

The lower image display panel 141 has a built-in touch panel 114. The player can input various commands by touching the lower image display panel 141.

On the lower side of the lower image display panel 141, there are arranged various buttons set in a control panel 30, and various devices to be operated by the player.

A spin button 31 is used when starting scrolling of the symbol arrays of the respective video reels 3. A change button 32 is used when requesting a game facility staff member to exchange money. A CASHOUT button 33 is used when paying out the coins retained inside the gaming machine 1 to a coin tray 15.

A 1-BET button 34 and a maximum BET button 35 are used for determining the number of coins (hereinafter also referred to as "the number of BETs") to be used in the game from the coins retained inside the gaming machine 1. The 1-BET button 34 is used when determining one coin at a time for the aforementioned number of BETs. The maximum BET button 35 is used when setting the aforementioned number of BETs to a defined upper limit number. In the specification, the 1-BET button 34 and the maximum BET button 35 together are also called BET buttons. The BET button corresponds to the input device of the present invention.

A coin accepting slot 36 is provided to accept coins. A bill validator 115 is provided to accept bills. The bill validator 115 validates a bill, and accepts a valid bill into the cabinet 11. It is to be noted that the bill validator 115 may be configured so as to be capable of reading a later-described ticket 175 with a barcode.

An upper image display panel 131 is provided at the front face of the top box 12. The upper image display panel 131, includes a liquid crystal panel, and forms the display. The upper image display panel 131 displays images related to effects and images showing introduction of the game contents and explanation of the game rules. Further, the top box 12 is provided with a speaker 112 and a lamp 111. The gaming machine 1 produces effects by displaying images, outputting sounds, and outputting the light.

A ticket printer 171, a card slot 176, a data display 174, and a keypad 173 are provided on the lower side of the upper image display panel 131.

The ticket printer 171 prints on a ticket a barcode representing encoded data of the number of credits, date, the identification number of the gaming machine 1, and the like, and outputs the ticket as the ticket 175 with a barcode. The player can make a gaming machine read the ticket 175 with a barcode so as to play a game thereon, and can also exchange the ticket 175 with a barcode with a bill or the like at a predetermined place (e.g. a cashier in a casino) in the game facility.

The card slot 176 is for inserting a card in which predetermined data is stored. For example, the card stores data for identifying the player, and data about the history of games played by the player.

When the card is inserted into the card slot 176, a later-described card reader 172 reads data from the card or writes data into the card. It is to be noted that the card may store data corresponding to a coin, a bill or a credit.

The data display 174 includes a fluorescent display, LEDs and the like, and displays the data read by the card reader 172 or the data inputted by the player via the keypad 173, for example. The keypad 173 is for inputting a command and data related to ticket issuance or the like.

[Symbol Arrays of Video Reels]

The overall configuration of the gaming machine 1 has been described above. Next, with reference to FIG. 5, a configuration of the symbol arrays included in the video reels 3 of the gaming machine 1 is described.

FIG. 5 is a view illustrating arrangement of symbols that are drawn on the peripheral surfaces of the reels of the gaming machine according to the embodiment of the present invention.

A first video reel 3*a*, a second video reel 3*b*, a third video reel 3*c*, a fourth video reel 3*e*, and a fifth video reel 3*d* each is assigned with a symbol array consisting of 22 symbols that correspond to respective code numbers from "00" to "21".

Types of the symbols provided are "BLUE 7", "BELL", "CHERRY", "STRAWBERRY", "PLUM", "ORANGE" and "APPLE".

[Configuration of Circuit Included in Gaming Machine]

The configuration of the symbol arrays included in the video reels 3 of the gaming machine 1 has been described above. Next, with reference to FIG. 6, a configuration of a circuit included in the gaming machine 1 is described.

Figure 6:
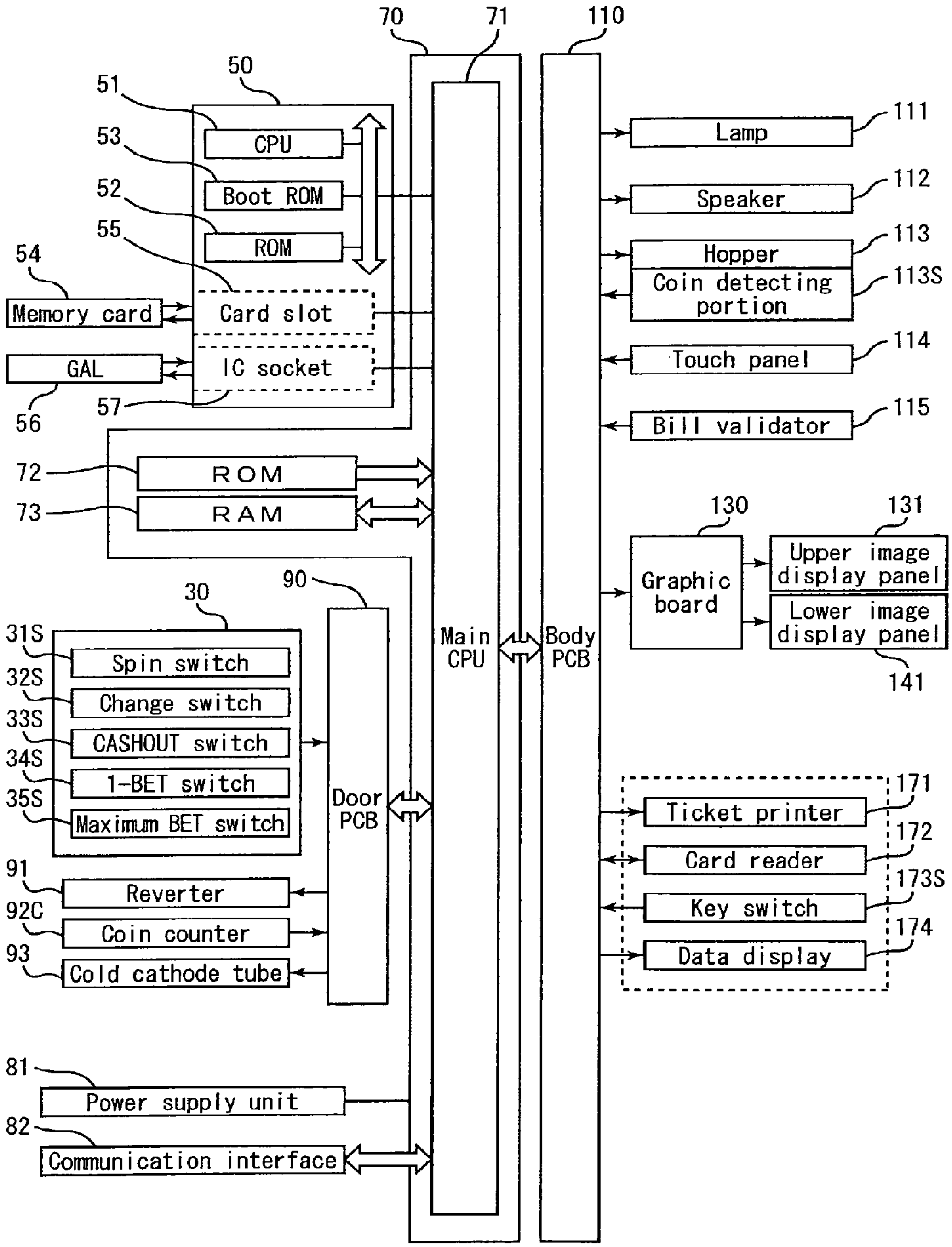
FIG. 6 is a block diagram illustrating an internal configuration of the gaming machine according to the embodiments of the present invention.

FIG. 6 is a block diagram illustrating an internal configuration of the gaming machine according to the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a gaming system program. The game program includes a program related to game progression, a lottery program, and a program for producing effects by images and sounds (e.g. see FIGS. 9 to 22 which are described later). Further, the aforementioned game program includes data (see FIG. 5) specifying the configuration of the symbol array assigned to each video reel 3.

The lottery program is a program for determining to-be stopped symbol of each video reel 3 by lottery. The to-be stopped symbol is data for determining four symbols to be displayed to the symbol display region 4 out of the 22 symbols forming each symbol array. The gaming machine 1 of the present embodiment determines as the to-be stopped symbol the symbol to be displayed in a predetermined region (e.g. the upper region) out of the four regions provided for each of the video reels 3 of the symbol display region 4.

The aforementioned lottery program includes symbol determination data. The symbol determination data is data that specifies random values so that each of the 22 symbols (code numbers from "00" to "21") forming the symbol array is determined at an equal probability (i.e. 1/22), for each video reel 3.

The probabilities of the respective 22 symbols being determined are basically equal. However, the numbers of the respective types of symbols included in the 22 symbols vary, and thus the probabilities of the respective types of symbols being determined vary (i.e. different weights on the probabilities are generated). For example, with reference to FIG. 5, the symbol array of the first video reel 3*a* includes one symbol of "BELL", and includes seven symbols of "ORANGE". Hence, the former is determined at the probability of "1/22", whereas the latter is determined at the probability of "7/22".

It is to be noted that, although the data specifies that the equal numbers of symbols be provided to form the symbol arrays of the respective video reels 3 in the present embodiment, different numbers of symbols may form the respective video reels 3. For example, the symbol array of the first video reel 3*a* may consist of 22 symbols whereas the symbol array of the second video reel 3*b* may consist of 30 symbols. Such a configuration increases the degree of freedom in setting the probabilities of the respective types of symbols being determined for each video reel 3.

The game program further includes point-value-combination-table data showing the point-value combination tables (see FIGS. 1F to 1I), numeric-symbol-table data showing the numeric-symbol table (see FIG. 21), and the like.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (tamper check program) for authenticating the game program and the gaming system program. The pre-authentication program is a program for authenticating the aforementioned authentication program. The authentication program and the pre-authentication program are written along a procedure (authentication procedure) for proving that the program to be the subject has not been tampered.

The motherboard 70 is provided with a main CPU 71, a ROM 72, a RAM 73, and a communication interface 82. The motherboard 70 corresponds to the controller of the present invention.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the gaming system program stored in the memory card 54 is started.

The RAM 73 stores data and programs which are used in operation of the main CPU 71. For example, when the processing of loading the aforementioned game program, gaming system program or authentication program is conducted, the RAM 73 can store the program.

For example, the RAM 73 stores the point-value-combination-table data (see FIGS. 1F to 1I). The RAM 73 corresponds to the memory of the present invention.

The RAM 73 is provided with working areas used for operations in execution of these programs. Examples of the areas include: an area that stores a counter for managing the number of games, the number of BETs, the number of payouts, the number of credits and the like; and an area that stores symbols (code numbers) determined by lottery.

The communication interface 82 is for communicating with the external control device 200 such as a server, through the communication line 301. Further, the motherboard 70 is connected with a later-described door PCB (Printed Circuit Board) 90 and a body PCB 110 by respective USBs. The motherboard 70 is also connected with a power supply unit 81.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71.

The door PCB 70 is connected with a control panel 30, a reverter 91, a coin counter 92C and a cold cathode tube 93.

The control panel 30 is provided with a spin switch 31S, a change switch 32S, a CASHOUT switch 33S, a 1-BET switch 34S and a maximum BET switch 35S which correspond to the aforementioned respective buttons. Each of the switches outputs a signal to the main CPU 71 upon detection of press of the button corresponding thereto by the player.

The coin counter 92C validates a coin inserted into the coin accepting slot 36 based on its material, shape and the like, and outputs a signal to the main CPU 71 upon detection of a valid coin. Invalid coins are discharged from a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speaker 112, the hopper 113, a coin detecting portion 113S, the touch panel 114, the bill validator 115, a graphic board 130, the ticket printer 171, the card reader 172, a key switch 173S and the data display 174.

The lamp 111 lights up based on a control signal outputted from the main CPU 71. The speaker 112 outputs sounds such as BGM, based on a control signal outputted from the main CPU 71.

The hopper 113 operates based on a control signal outputted from the main CPU 71, and pays out coins of the specified number of payouts from the coin payout exit 15A to the coin tray 15. The coin detecting portion 113S outputs a signal to the main CPU 71 upon detection of coins paid out by the hopper 113.

The touch panel 114 detects a place on the lower image display panel touched by the player's finger or the like, and outputs to the main CPU 71 a signal corresponding to the detected place. Upon acceptance of a valid bill, the bill validator 115 outputs to the main CPU 71 a signal corresponding to the face amount of the bill.

The graphic board 130 controls display of images conducted by the respective upper image display panel 131 and lower image display panel 141, based on a control signal outputted from the main CPU 71. The symbol display region 4 of the lower image display panel 141 displays the five video reels 3 by which the scrolling and stop motions of the symbol arrays included in the respective video reels 3 are displayed.

Further, the respective first display region 500*a*, second display region 500*b*, third display region 500*c*, fourth display region 500*d*, and fifth display region 500*e* in the lower image display panel 141 display the scrolling and stop motions of numeric-symbol arrays.

The graphic board 130 is provided with a VDP generating image data, a video RAM temporarily storing the image data generated by the VDP, and the like. The number-of-credits display portion 142 of the lower image display panel 141 displays the number of credits stored in the RAM 73. The number of payouts display portion 143 of the lower image display panel 141 displays the number of payouts of coins.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

Based on a control signal outputted from the main CPU 71, the ticket printer 171 prints on a ticket a barcode representing encoded data of the number of credits stored in the RAM 73, date, the identification number of the gaming machine 1, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data display 174 displays data read by the card reader 172 and data inputted by the player through the keypad 173, based on a control signal outputted from the main CPU 71.

[Configuration of Circuit Included in External Control Device]

The circuit configuration of the gaming machine 1 has been described above. Next, with reference to FIG. 7, a configuration of a circuit included in the external control device 200 is described.

Figure 7:
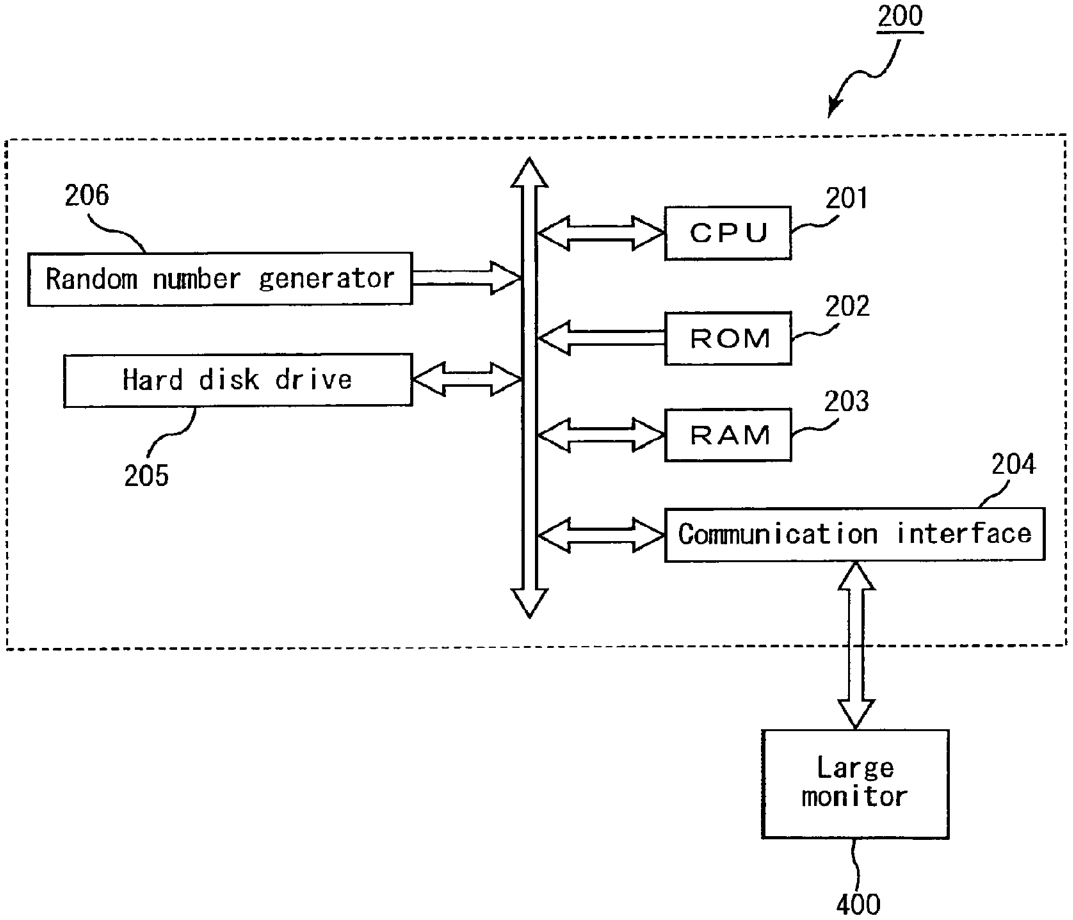
FIG. 7 is a block diagram illustrating an internal configuration of an external control device according to the embodiments of the present invention.

FIG. 7 is a block diagram illustrating an internal configuration of the external control device forming the gaming system according to the embodiment of the present invention.

The external control device 200 includes a CPU 201, a ROM 202, a RAM 203, a communication interface 204, a hard disk drive 205, and a random number generator 206. The random number generator 206 generates a random number at a predetermined timing. The communication interface 204 is connected with the communication interface 82 of each gaming machine 1 through the communication line 301. Further, the communication interface 204 is connected with the large monitor 400 through the communication line 302.

The ROM 202 stores: a system program for controlling operations of a processor; permanent data; and the like. The CPU 201 corresponds to the processor of the present invention.

The RAM 203 temporarily stores data received from the respective gaming machines 1. The RAM 203 is provided with a cumulative-value storage area. The cumulative-value storage area stores cumulative-value data showing the cumulative value.

The hard disk drive 205 stores the jackpot-determination-table data showing the jackpot determination table (see FIG. 1).

[Configuration of Symbol Combination Table]

The circuit configuration of the external control device 200 has been described above. Next, with reference to FIG. 8, a symbol combination table is described.

FIG. 8 is a view illustrating a symbol combination table of the gaming machine according to the embodiment of the present invention.

The symbol combination table specifies combinations of drawn symbols relating to winning, and the number of payouts. On the gaming machine 1, the scrolling of symbol arrays of the respective video reels 3 is stopped, and winning is established when the combination of symbols displayed along the winning line matches one of the combinations of symbols specified by the symbol combination table. According to the winning combination, a benefit such as payout of coins or start of a bonus game is offered to the player. It is to be noted that winning is not established (i.e. the game is lost) when the combination of symbols displayed along the winning line does not match any of the combinations of symbols specified by the symbol combination table.

Basically, winning is established when all symbols displayed along the winning line by the respective video reels 3 are of one type out of "APPLE", "BLUE 7", "BELL", "CHERRY", "STRAWBERRY", "PLUM" and "ORANGE". However, with respect to the respective types of symbols of "CHERRY" and "ORANGE", winning is also established when one or three symbols of either type are displayed along the winning line by the video reels 3.

For example, when all the symbols displayed along the winning line by all the video reels 3 are "BLUE 7", the winning combination is "BLUE", and "10" is determined as the number of payouts. Based on the determined number of payouts, payout of coins is conducted. The payout of coins is conducted by actually discharging coins from the coin payout exit 15A or adding the determined number of payouts to the number of credits, or issuing a ticket with a barcode.

"APPLE" is the bonus game trigger. When all the symbols displayed along the winning line by all the video reels 3 are "APPLE", the winning combination is "bonus game", and bonus games start from the next game.

[Contents of Program]

The symbol combination table has been described above. Next, with reference to FIGS. 9 to 22, the program to be executed by the gaming machine 1 is described.

<Main Control Processing>

Figure 9:
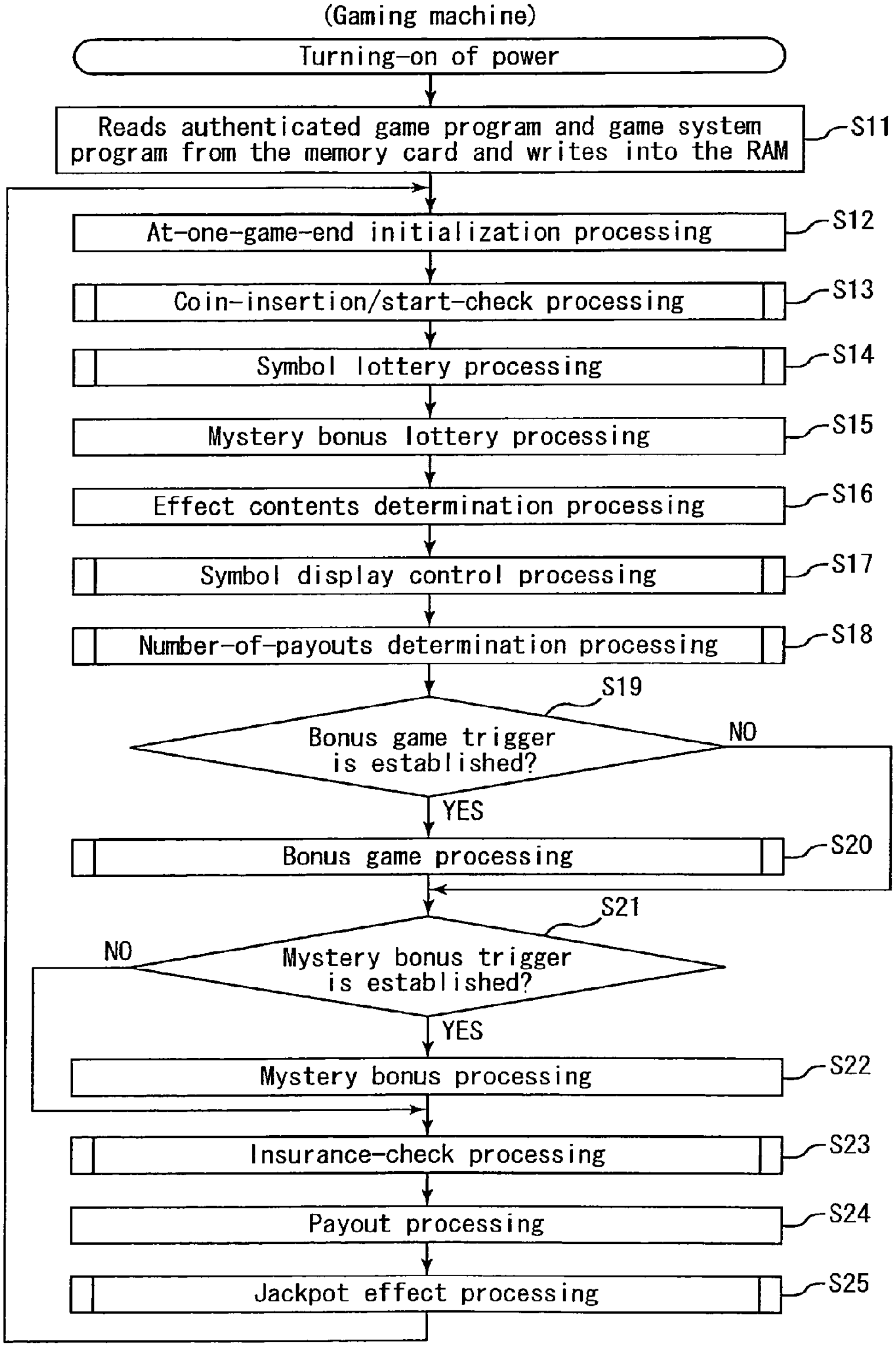
FIG. 9 is a view illustrating a flowchart of main control processing for the gaming machine according to the embodiments of the present invention.

First, with reference to FIG. 9, main control processing is described.

FIG. 9 is a view illustrating a flowchart of the main control processing for the gaming machine according to the embodiment of the present invention.

First, when the power is supplied to the gaming machine 1, the main CPU 71 reads the authenticated game program and gaming system program from the memory card 54 through the gaming board 50, and writes the programs into the RAM 73 (step S11).

Next, the main CPU 71 conducts at-one-game-end initialization processing (step S12). For example, data that becomes unnecessary after each game in the working areas of the RAM 73, such as the number of BETs and the symbols determined by lottery, is cleared.

The main CPU 71 conducts coin-insertion/start-check processing which is described later with reference to FIG. 10 (step S13). In the processing, input from the BET switch and the spin switch is checked.

The main CPU 71 then conducts symbol lottery processing which is described later with reference to FIG. 12 (step S14). In the processing, to-be stopped symbols are determined based on the random values for symbol determination.

Next, the main CPU 71 conducts mystery bonus lottery processing (step S15). In the processing, lottery determining whether or not to establish a mystery bonus trigger is held. For example, the main CPU 71 extracts a random value for mystery bonus from the numbers in a range of "0 to 99", and establishes the mystery bonus trigger when the extracted random value is "0".

The main CPU 71 conducts effect contents determination processing (step S16). The main CPU 31 extracts a random value for effect, and determines any of the effect contents from the preset plurality of effect contents by lottery.

The main CPU 71 then conducts symbol display control processing which is described later with reference to FIG. 13 (step S17). In the processing, scrolling of the symbol array of each video reel 3 is started, and the to-be stopped symbol determined in the symbol lottery processing of step S14 is stopped at a predetermined position (e.g. the upper region in the symbol display region 4). That is, four symbols including the to-be stopped symbol are displayed in the symbol display region 4. For example, when the to-be stopped symbol is the symbol associated with the code number of "10" and it is to be displayed to the upper region, the symbols associated with the respective code numbers of "11", "12" and "13" are to be displayed to the respective upper central region, lower central region and lower region in the symbol display region 4.

Next, the main CPU 71 conducts number-of-payouts determination processing which is described later with reference to FIG. 14 (step S18). In the processing, the number of payouts is determined based on the combination of symbols displayed along a winning line L, and is stored into a number-of-payouts counter provided in the RAM 73.

The main CPU 71 then determines whether or not the bonus game trigger has been established (step S19). When the main CPU 71 determines that the bonus game trigger has been established, the main CPU 71 conducts bonus game processing which is described later with reference to FIG. 16 (step S20).

After the processing of step S20 or when determining in step S19 that the bonus game trigger has not been established, the main CPU 71 determines whether or not the mystery bonus trigger is established (step S21). When determining that the mystery bonus trigger has been established, the main CPU 71 conducts the mystery bonus processing (step S22). In the processing, the number of payouts (e.g. 300) being set for the mystery bonus is stored into the number-of-payouts counter provided in the RAM 73.

After the processing of step S22 or when determining in step S21 that the mystery bonus trigger has not been established, the main CPU 71 conducts insurance-check processing which is described later with reference to FIG. 15 (step S23). In the processing, whether or not to conduct payout by the insurance is checked.

The main CPU 71 conducts payout processing (step S24). The main CPU 71 adds the value stored in the number-of-payouts counter to a number-of-credits counter provided in the RAM 73. It is to be noted that operations of the hopper 113 may be controlled based on input from the CASHOUT switch 33S, and coins of the number corresponding to the value stored in the number-of-payouts counter may be discharged from the coin payout exit 15A. Further, operations of the ticket printer 171 may be controlled and a ticket with a barcode may be issued on which a value stored in the number-of-payouts counter is recorded.

Next, the main CPU 71 executes jackpot effect processing (step S25). In the processing, the main CPU 71 conducts various processing related to the jackpot, such as display of the numeric symbols. The jackpot effect processing is described in detail later with reference to FIGS. 18 to 23.

After the processing has been conducted, the processing is shifted to step S12.

<Coin-Insertion/Start-Check Processing>

Figure 10:
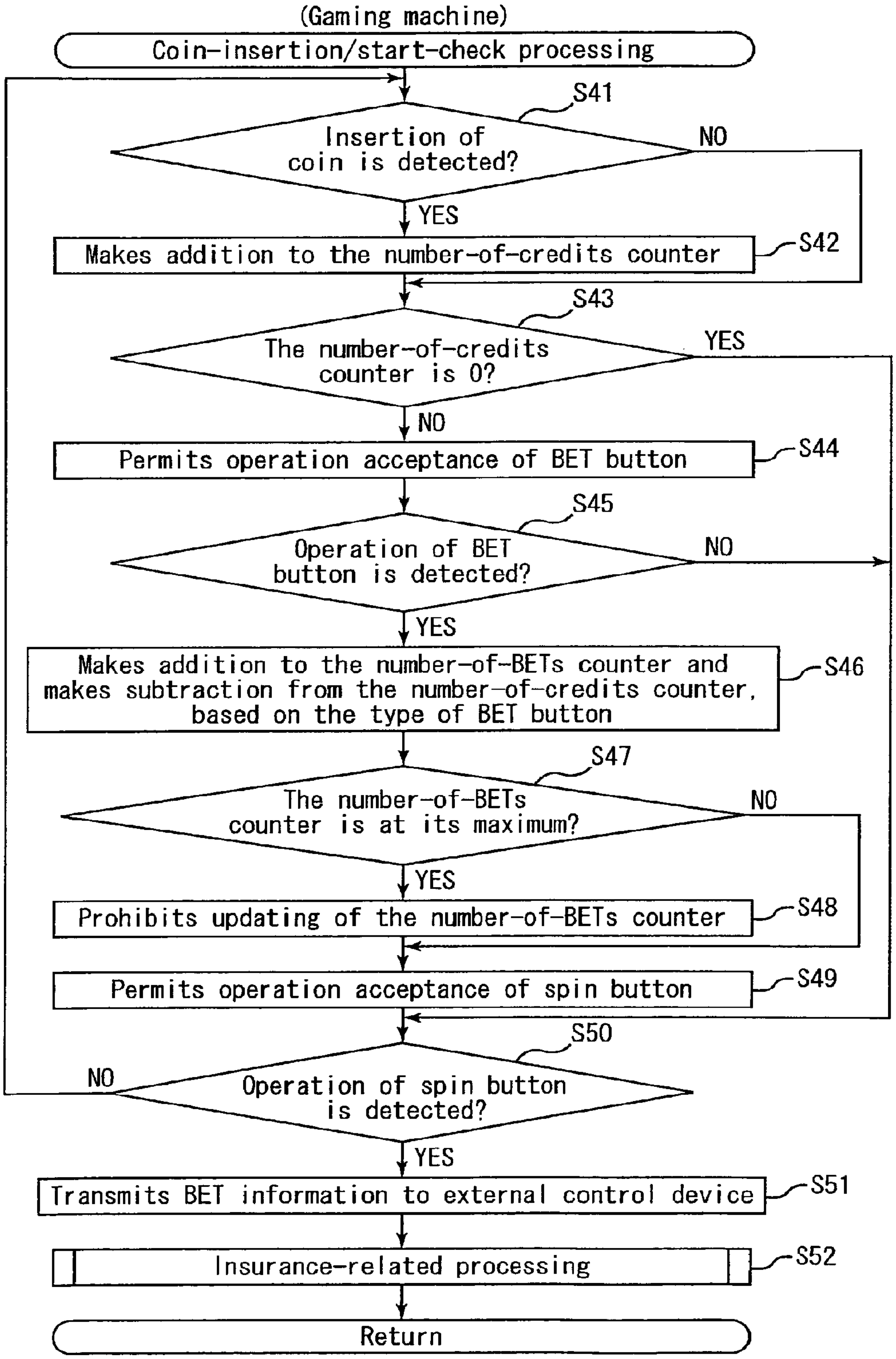
FIG. 10 is a view illustrating a flowchart of coin-insertion/start-check processing for the gaming machine according to the embodiments of the present invention.

Next, with reference to FIG. 10, coin-insertion/start-check processing is described.

FIG. 10 is a view illustrating a flowchart of the coin-insertion/start-check processing for the gaming machine according to the embodiment of the present invention.

First, the main CPU 71 determines whether or not insertion of a coin has been detected by the coin counter 92C (step S41). When determining that the insertion of a coin has been detected by the coin counter 92C, the main CPU 71 makes an addition to the number-of-credits counter (step S42). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the number-of-credits counter.

After step S42 or when determining in step S41 that the insertion of a coin has not been detected, the main CPU 71 determines whether or not the number-of-credits counter is zero (step S43). When the main CPU 71 determines that the number-of-credits counter is not zero, the main CPU 71 permits operation acceptance of the BET buttons (step S44).

Next, the main CPU 71 determines whether or not operation of any of the BET buttons has been detected (step S45). When the main CPU 71 determines that the BET switch has detected press of the BET button by the player, the main CPU 71 makes an addition to a number-of-BETs counter provided in the RAM 73 and makes a subtraction from the number-of-credits counter, based on the type of the BET button (step S46).

The main CPU 71 then determines whether or not the number-of-BETs counter is at its maximum (step S47). When the main CPU 71 determines that the number-of-BETs counter is at its maximum, the main CPU 71 prohibits updating of the number-of-BETs counter (step S48). After step S48 or when determining in step S47 that the number-of-BETs counter is not at its maximum, the main CPU 71 permits operation acceptance of the spin button (step S49).

After step S49 or when determining in step S45 that the operation of any of the BET buttons has not been detected, or when determining in step S43 that the number-of-credits counter is zero, the main CPU 71 determines whether or not operation of the spin button has been detected (step S50). When the main CPU 71 determines that the operation of the spin button has not been detected, the processing is shifted to step S41.

When the main CPU 71 determines that the operation of the spin button has been detected, the main CPU 71 transmits BET information to the external control device 200 (step S51). The BET information is information showing the number of betted coins. The BET information includes information showing the identification number of the gaming machine 1.

Next, the main CPU 71 conducts insurance-related processing which is described later with reference to FIG. 11 (step S52). In the processing, counting of the number of games is conducted which triggers a payout by the insurance. After the processing has been conducted, the coin-insertion/start-check processing is completed.

<Insurance-Related Processing>

Figure 11:
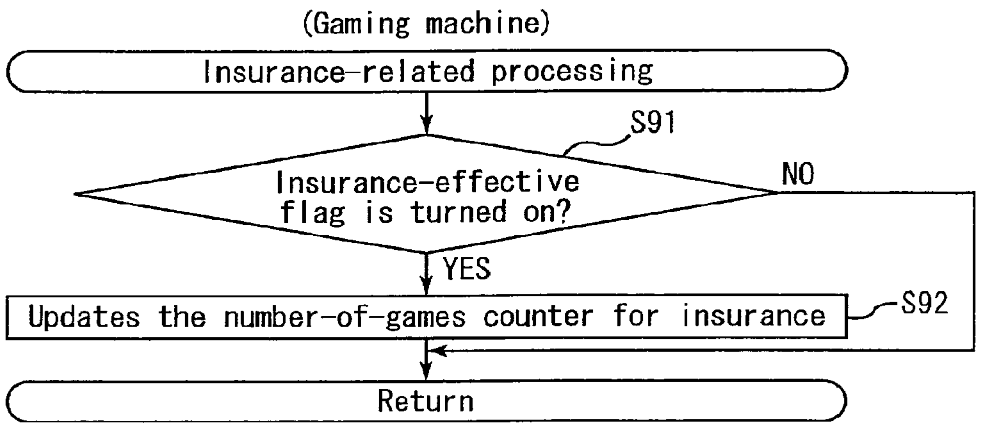
FIG. 11 is a view illustrating a flowchart of insurance-related processing for the gaming machine according to the embodiments of the present invention.

Next, with reference to FIG. 11, the insurance-related processing is described.

FIG. 11 is a view illustrating a flowchart of the insurance-related processing for the gaming machine according to the embodiment of the present invention.

First, the main CPU 71 determines whether or not an insurance-effective flag is turned on (step S91). The insurance-effective flag is turned on when a command to make the insurance effective is inputted by the player in the insurance selection processing which is described later with reference to FIG. 17.

When the main CPU 71 determines that the insurance-effective flag is not turned on, the main CPU 71 completes the insurance-related processing. On the other hand, when the main CPU 71 determines that the insurance-effective flag is turned on, the main CPU 71 updates a number-of-games counter for insurance provided in the RAM 73 (step S92). The number-of-games counter for insurance is a counter for managing the number of games up to the time of the payout by the insurance. In the processing of step S92, the main CPU 71 adds one to the number-of-games counter for insurance. After the processing has been conducted, the insurance-related processing is completed.

<Symbol Lottery Processing>

Figure 12:
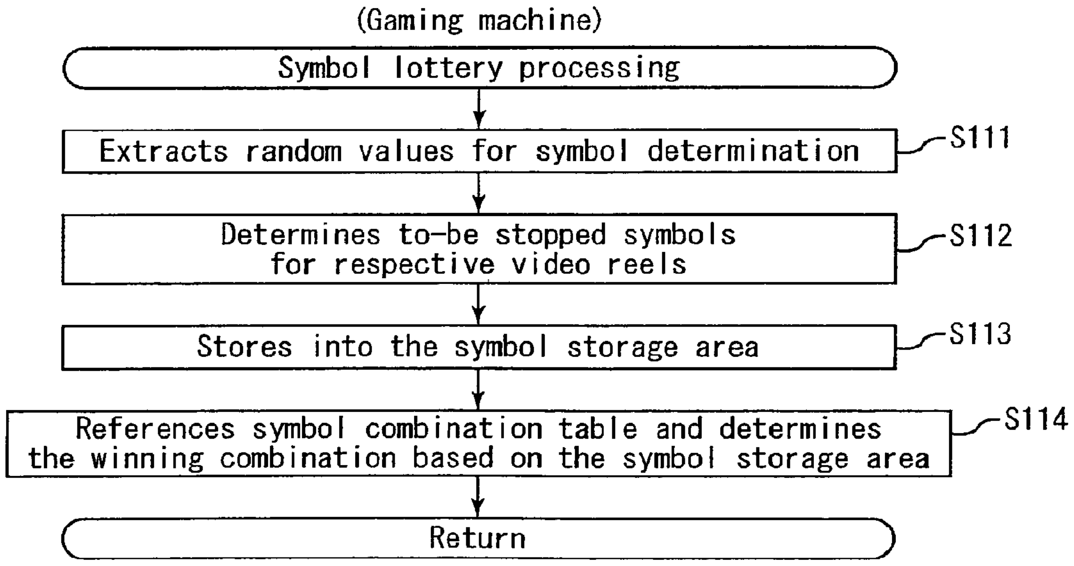
FIG. 12 is a view illustrating a flowchart of symbol lottery processing for the gaming machine according to the embodiments of the present invention.

Next, with reference to FIG. 12, the symbol lottery processing is described.

FIG. 12 is a view illustrating a flowchart of the symbol lottery processing for the gaming machine according to the embodiment of the present invention.

First, the main CPU 71 extracts random values for symbol determination (step S111). The main CPU 71 then determines to-be stopped symbols for the respective video reels 3 by lottery (step S112). The main CPU 71 holds a lottery for each video reel 3, and determines any one of the 22 symbols (code numbers from “00” to “21”) as a to-be stopped symbol. At this time, each of the 22 symbols (code numbers from “00” to “21”) is determined at an equal probability (i.e. 1/22).

The main CPU 71 then stores the determined to-be stopped symbols for the respective video reels 3 into a symbol storage area provided in the RAM 73 (step S113). Next, the main CPU references the symbol combination table (FIG. 8) and determines a winning combination based on the symbol storage area (step S114). The main CPU 71 determines whether or not the combination of symbols to be displayed along the winning line by the respective video reels 3 matches any of the combinations of symbols specified by the symbol combination table, and determines the winning combination. After the processing has been conducted, the symbol lottery processing is completed.

<Symbol Display Control Processing>

Figure 13:
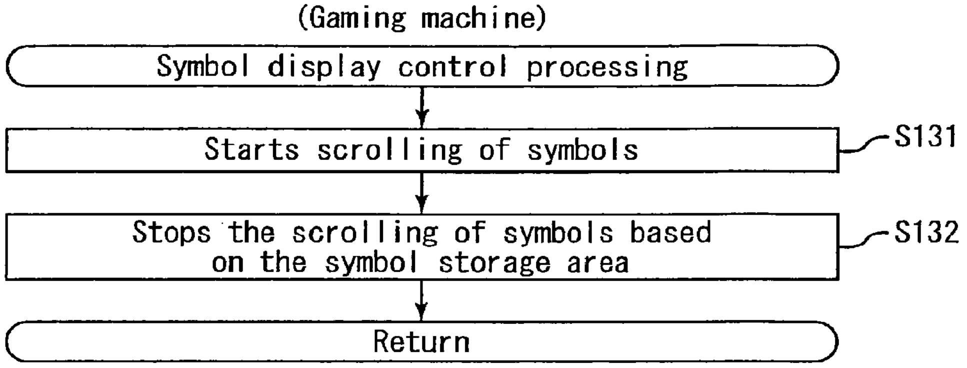
FIG. 13 is a view illustrating a flowchart of symbol display control processing for the gaming machine according to the embodiments of the present invention.

Next, with reference to FIG. 13, the symbol display control processing is described.

FIG. 13 is a view illustrating a flowchart of the symbol display control processing for the gaming machine according to the embodiment of the present invention.

First, the main CPU 71 starts scrolling of the symbol arrays of the respective video reels 3 that are displayed to the symbol display region 4 of the lower image display panel 141 (step S131). The main CPU 71 then stops the scrolling of the symbol arrays of the respective video reels 3, based on the aforementioned symbol storage area (step S132). After the processing has been conducted, the symbol display control processing is completed.

<Number-of-Payouts Determination Processing>

Figure 14:
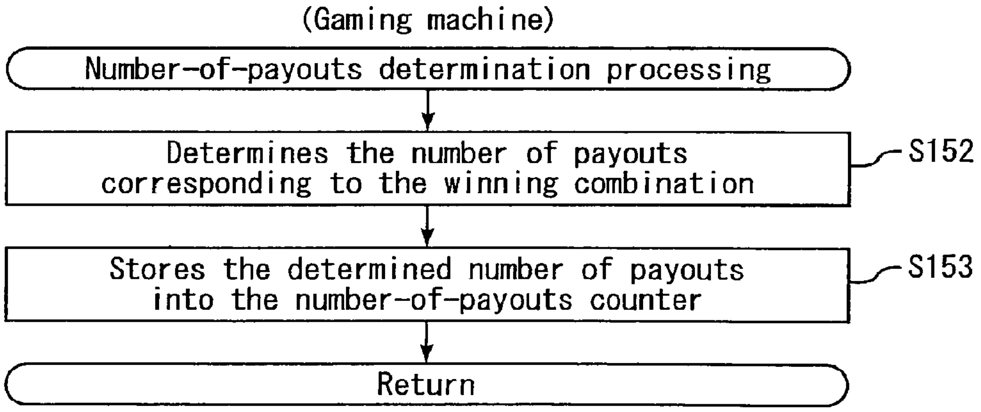
FIG. 14 is a view illustrating a flowchart of number-of-payouts determination processing for the gaming machine according to the embodiments of the present invention.

Next, with reference to FIG. 14, the number-of-payouts determination processing is described.

FIG. 14 is a view illustrating a flowchart of the number-of-payouts determination processing for the gaming machine according to the embodiment of the present invention.

First, the main CPU 71 determines the number of payouts corresponding to the winning combination (step S152). For example, when the winning combination is “BELL”, the main CPU 71 determines “8” as the number of payouts (see FIG. 8). It is to be noted that the main CPU 71 determines “0” as the number of payouts in the case where the game is lost. Next, the main CPU 71 stores the determined number of payouts into the number-of-payouts counter (step S153). After the processing has been conducted, the number-of-payouts determination processing is completed.

<Insurance-Check Processing>

Figure 15:
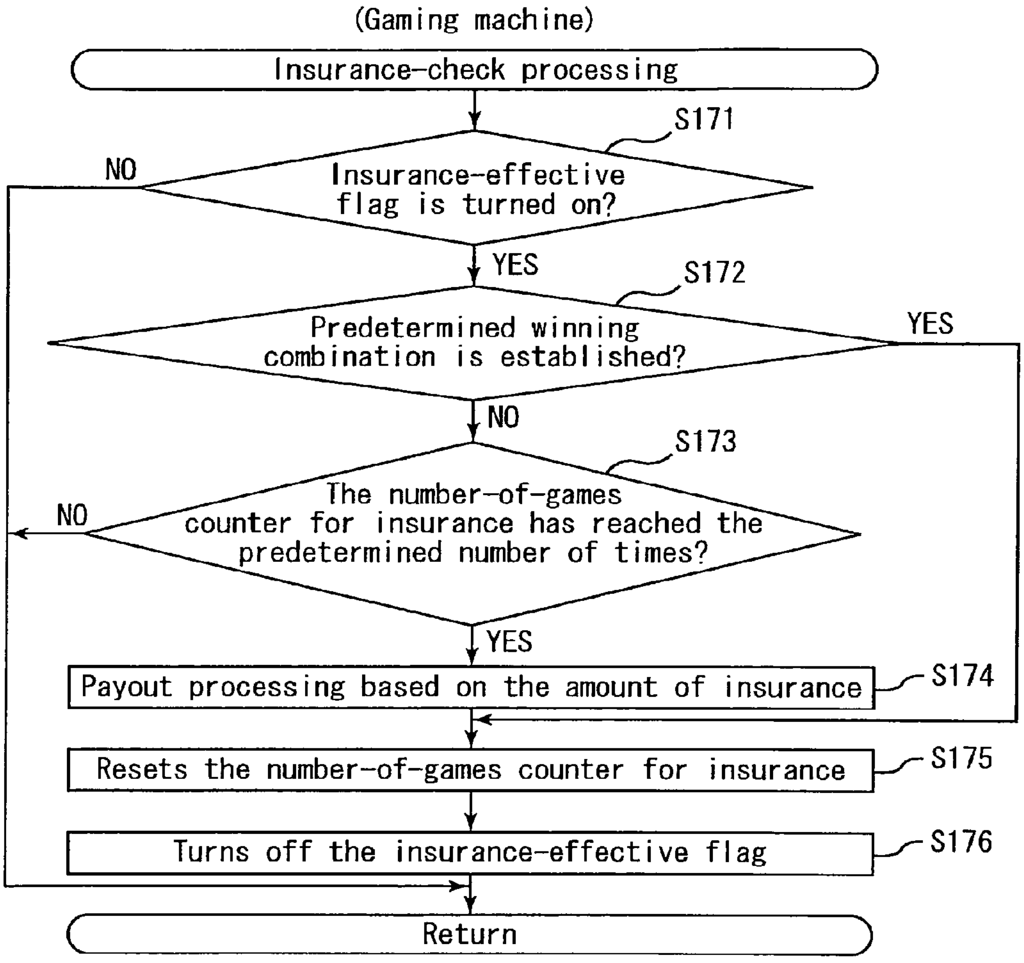
FIG. 15 is a view illustrating a flowchart of insurance-check processing for the gaming machine according to the embodiments of the present invention.

Next, with reference to FIG. 15, the insurance-check processing is described.

FIG. 15 is a view illustrating a flowchart of the insurance-check processing for the gaming machine according to the embodiment of the present invention.

First, the main CPU 71 determines whether or not the insurance-effective flag is turned on (step S171). When the main CPU 71 determines that the insurance-effective flag is not turned on, the main CPU 71 completes the insurance-check processing.

When the main CPU 71 determines that the insurance-effective flag is turned on, the main CPU 71 determines whether or not a predetermined winning combination has been established (step S172). In the present embodiment, "bonus game trigger" and "mystery bonus" are subjects of the predetermined winning combination.

When the main CPU 71 determines that the predetermined winning combination has not been established, the main CPU 71 determines whether or not the number-of-games counter for insurance has reached a predetermined number of times (e.g. 300) (step S173). When the main CPU 71 determines that the number-of-games counter for insurance has not reached the predetermined number of times, the main CPU 71 completes the insurance-check processing.

When the main CPU 71 determines that the number-of-games counter for insurance has reached the predetermined number of times, the main CPU 71 conducts payout processing based on the amount of insurance (step S174). The main CPU 31 adds an amount (e.g. 200) previously set as the amount of insurance to the number-of-credits counter.

After step S174 or when determining in step S172 that the predetermined winning combination has been established, the main CPU 71 resets the number-of-games counter for insurance (step S175). Next, the main CPU 71 turns the insurance-effective flag off (step S176). After the processing has been conducted, the insurance-check processing is completed.

<Bonus Game Processing>

Figure 16:
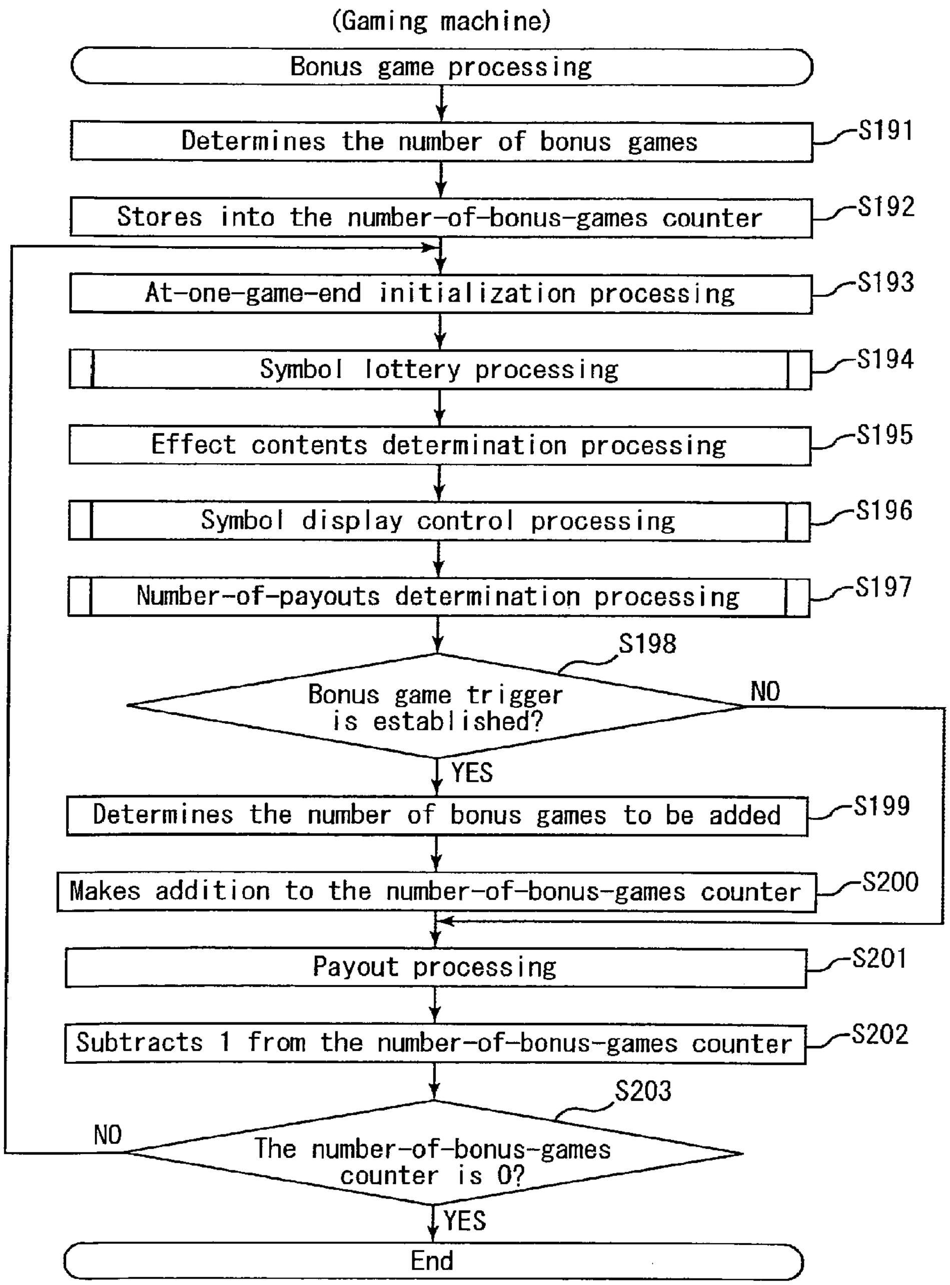
FIG. 16 is a view illustrating a flowchart of bonus game processing for the gaming machine according to the embodiments of the present invention.

Next, with reference to FIG. 16, the bonus game processing is described.

FIG. 16 is a view illustrating a flowchart of the bonus game processing for the gaming machine according to the embodiment of the present invention.

The main CPU 71 first determines the number of bonus games (step S191). The main CPU 71 extracts a random value for number-of-bonus-games determination, and determines anyone of the various numbers of bonus games such as "50", "70" and "100" by lottery.

Next, the main CPU 71 stores the determined number of bonus games into a number-of-bonus-games counter provided in the RAM 73 (step S192).

The main CPU 71 then conducts at-one-game-end initialization processing in the same way as the processing of step S12 described with reference to FIG. 9 (step S193). The main CPU 71 then conducts the symbol lottery processing described with reference to FIG. 12 (step S194). Then, the main CPU 71 conducts the effect contents determination processing in the same way as the processing of step S16 described with reference to FIG. 9 (step S195). Next, the main CPU 71 conducts the symbol display control processing described with reference to FIG. 13 (step S196). The main CPU 71 then conducts the number-of-payouts determination processing described with reference to FIG. 14 (step S197).

Next, the main CPU 71 determines whether or not the bonus game trigger has been established (step S198). When the main CPU 71 determines that the bonus game trigger has been established, the main CPU 71 determines the number of bonus games to be added (step S199). In the same way as the aforementioned processing of step S191, the main CPU 71 determines the number of bonus games. The main CPU 71 then adds the determined number of bonus games to the number-of-bonus-games counter (step S200).

After the processing of step S200 or when determining in step S198 that the bonus game trigger has not been established, the main CPU 71 conducts the payout processing (step S201). In the payout processing, the main CPU 71 adds the value of the number-of-payouts counter stored in the aforementioned number-of-payouts determination processing of step S197 to a number-of-payouts counter for bonus. The number-of-payouts counter for bonus is for managing a total of the numbers of payouts determined during the bonus games.

When the bonus game processing has been completed, the main CPU 71 adds the value stored in the number-of-payouts counter for bonus to the number-of-credits counter provided in the RAM 73, in the payout processing of step S24 described with reference to FIG. 9. That is, the total of the numbers of payouts determined during the bonus games is collectively paid out. Here, it is to be noted that coins may be discharged from the coin payout exit 15A, or a ticket with a barcode may be issued.

Next, the main CPU 71 subtracts one from the number-of-bonus-games counter (step S202). Next, the main CPU 71 determines whether or not the number-of-bonus-games counter is zero (step S203). When the main CPU 71 determines that the number-of-bonus-games counter is not zero, the main CPU 71 shifts the processing to step S193. On the other hand, when the main CPU 71 determines that the number-of-bonus-games counter is zero, the main CPU 71 completes the bonus game processing. When the bonus game processing has been completed, the processing is shifted to the processing of step S21 described with reference to FIG. 9.

<Insurance Selection Processing>

Figure 17:
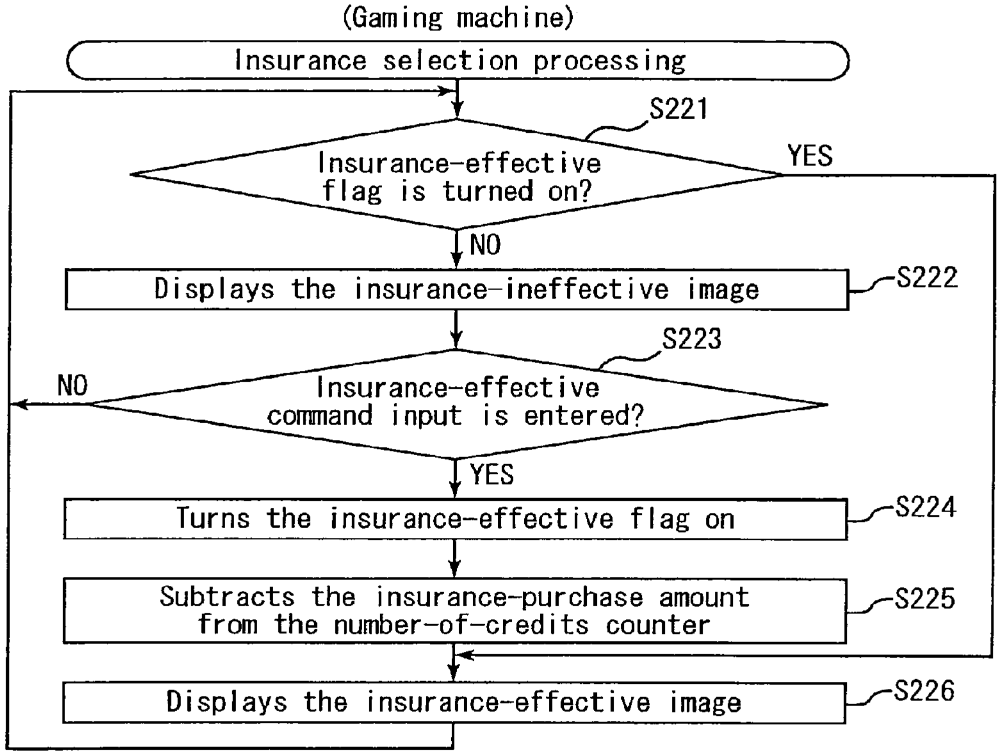
FIG. 17 is a view illustrating a flowchart of insurance selection processing for the gaming machine according to the embodiments of the present invention.

Next, with reference to FIG. 17, the insurance selection processing is described.

FIG. 17 is a view illustrating a flowchart of the insurance selection processing for the gaming machine according to the embodiment of the present invention.

First, the main CPU 71 determines whether or not the insurance-effective flag is turned on (step S221). When the main CPU 71 determines that the insurance-effective flag is not turned on, the main CPU 71 displays an insurance-ineffective image (step S222). The main CPU 71 transmits a command to display the insurance-ineffective image to the graphic board 130. Based on the command, the graphic board 130 generates the insurance-ineffective image and displays the image to the lower image display panel 141.

As the insurance-ineffective image, for example, an image showing "INSURANCE BET $1.00 TOUCH TO BET" is displayed. This image is an image for prompting the player to select whether or not to make the insurance effective, and notifying the player of the amount required for making the insurance effective. The player can input a command to make the insurance effective by touching a predetermined place on the touch panel 114.

Subsequently, the main CPU 71 determines whether or not an insurance-effective command input has been entered (step S223). When the main CPU 71 determines that the insurance-effective command input has not been entered, the main CPU 71 shifts the processing to step S221 with the insurance-effective flag turned off. On the other hand, when the main CPU 71 determines that the insurance-effective command input has been entered, the main CPU 71 turns the insurance-effective flag on (step S224).

Next, the main CPU 71 subtracts the insurance-purchase amount from the number-of-credits counter (step S225). In the present embodiment, an amount corresponding to, for example, one dollar is subtracted from the number-of-credits counter. After step S225 or when determining in step S221 that the insurance-effective flag is turned on, the main CPU 71 displays the insurance-effective image (step S226).

As the insurance-effective image, for example, an image showing "INSURANCE CONTINUED WIN 200 CREDIT" is displayed. This image is an image informing the player that the insurance is effective, and that the value of "200" is to be added to the number-of-credits counter when the insurance condition is satisfied. After the processing has been conducted, the processing is shifted to step S221.

<Jackpot Effect Processing>

Now, with reference to FIGS. 18 to 23, the jackpot effect processing conducted in step S25 in FIG. 9 is described.

Figure 18:
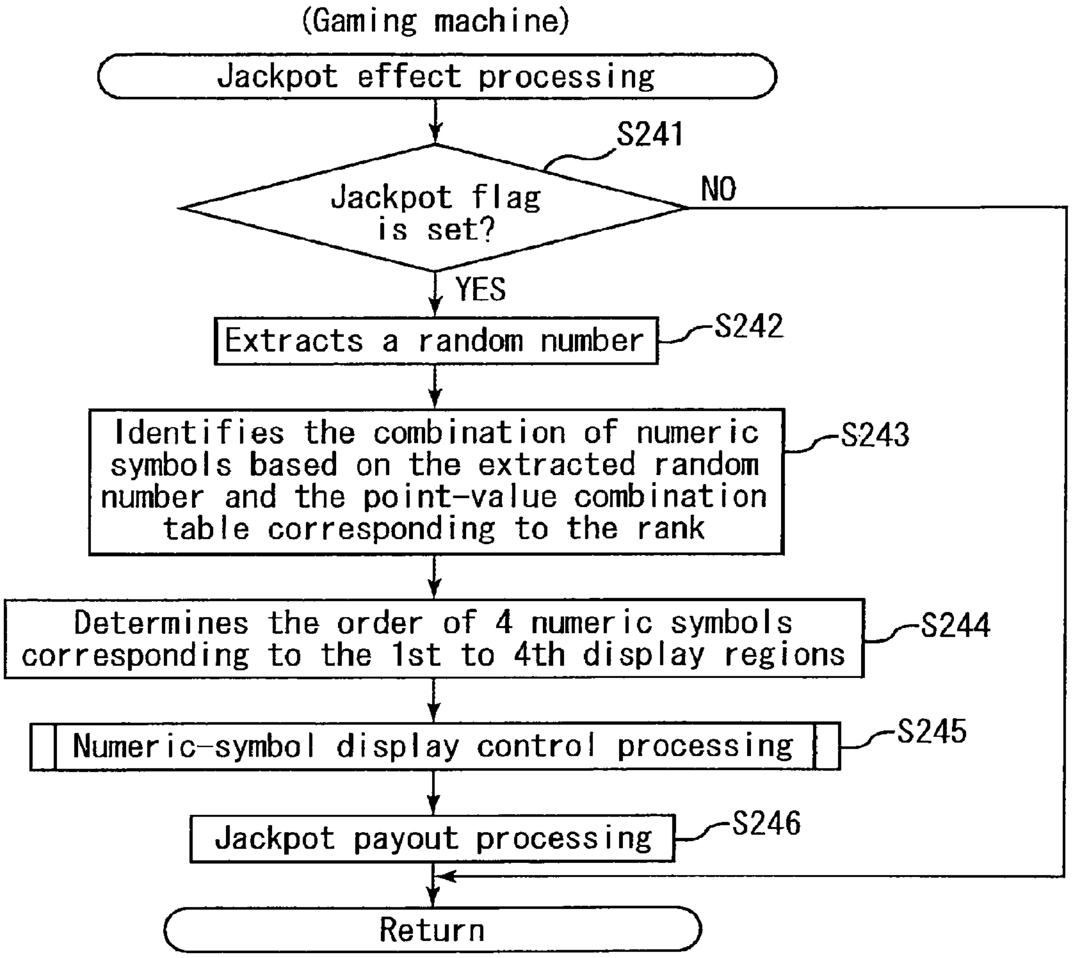
FIG. 18 is a view illustrating a flowchart of jackpot effect processing conducted in the gaming machine according to the embodiments of the present invention.

FIG. 18 is a view illustrating a flowchart of the jackpot effect processing conducted in the gaming machine according to the embodiment of the present invention.

First, the main CPU 71 determines whether or not a jackpot flag is set (step S241). The jackpot flag is a flag that is set when any of the ranks of "GRAND", "MAJOR", "MINOR", and "MINI" has been determined in the external control device 200 (see steps S304 to S307 in FIG. 24, and steps S251 to S253 in FIG. 19).

Figure 19:
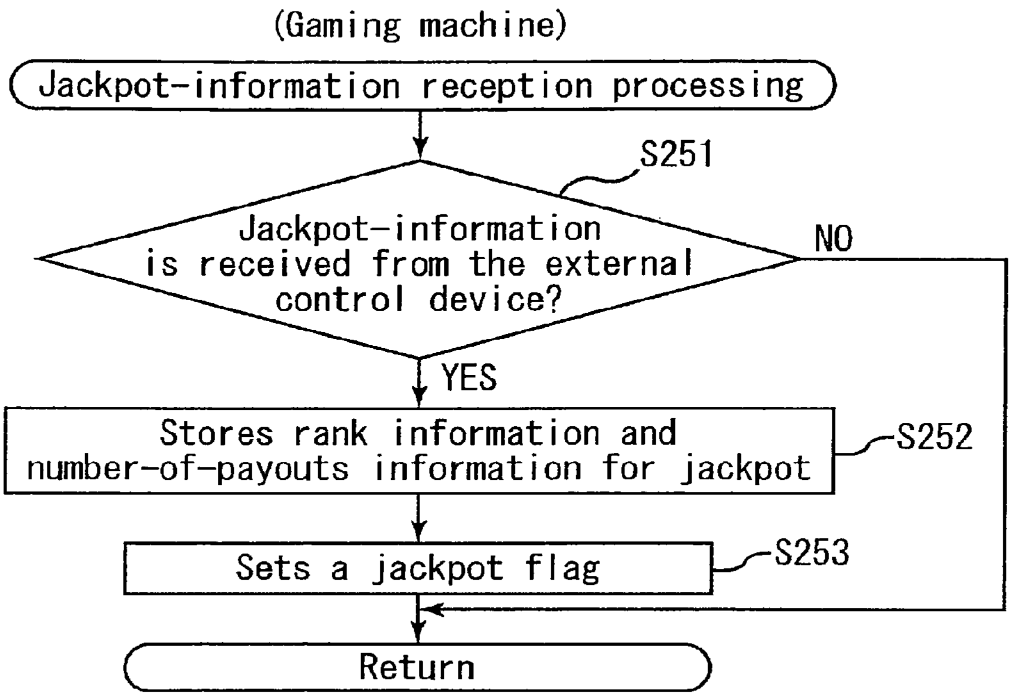
FIG. 19 is a view illustrating a flowchart of jackpot-information reception processing conducted in the gaming machine according to the embodiments of the present invention.

Here, with reference to FIG. 19, the jackpot flag is described.

FIG. 19 is a view illustrating a flowchart of jackpot-information reception processing conducted in the gaming machine according to the embodiment of the present invention.

First, the main CPU 71 determines whether or not it has received jackpot information from the external control device 200, at a predetermined timing (step S251). The jackpot information includes rank information, and number-of-payouts information for jackpot (see step S307 in FIG. 24).

The rank information is information showing the rank determined from among "GRAND", "MAJOR", "MINOR", and "MINI".

The number-of-payouts information for jackpot is information showing the number of coins to be paid out in the gaming machine when any of the ranks has been determined.

When the main CPU 71 determines that it has not received the jackpot information, the main CPU 71 completes the present subroutine.

On the other hand, when the main CPU 71 determines that it has received the jackpot information, the main CPU 71 stores the rank information and the number of payouts information for jackpot, into the RAM 73 (step S252).

The main CPU 71 then sets the jackpot flag, and completes the present subroutine.

The jackpot flag has been described with reference to FIG. 19.

Now, descriptions for FIG. 18 are given again.

When the main CPU 71 determines in step S241 that the jackpot flag is not set, the main CPU 71 completes the present subroutine.

On the other hand, when the main CPU 71 determines that the jackpot flag is set, the main CPU 71 extracts a random number (step S242).

Next, the main CPU 71 identifies four numeric symbols to be displayed to the display regions from the first display region 500*a* to the fourth display region 500*d* and one numeric symbol to be displayed to the fifth display region 500*e*, based on the point-value combination table (see FIGS. 1F to 1I) corresponding to the rank shown by the rank information stored in the RAM 73 and the random number extracted in step S242 (step S243).

The main CPU 71 determines the order of four numeric symbols to be displayed to the display regions from the first display region 500*a* to the fourth display region 500*d*, out of the numeric symbols identified in step S243 (step S244). In the processing, the main CPU 71 reorders identification numbers associated with the respective four numeric symbols.

To give an example of the case where "5", "6", "7", and "8" have been identified as the four numeric symbols to be displayed to display regions from the first display region 500*a* to the fourth display region 500*d*, the following description can be given. In this case, the numeric symbols of "5", "6", "7", and "8" are respectively associated with the identification numbers of "1", "2", "3", and "4". The main CPU 71 reorders the identification numbers corresponding to the respective numeric symbols of "5", "6", "7", and "8" by generating random numbers. As a result, for example, the numeric symbols of "5", "6", "7", and "8" are respectively associated with the identification numbers of "2", "3", "1", "4".

Figure 20A:
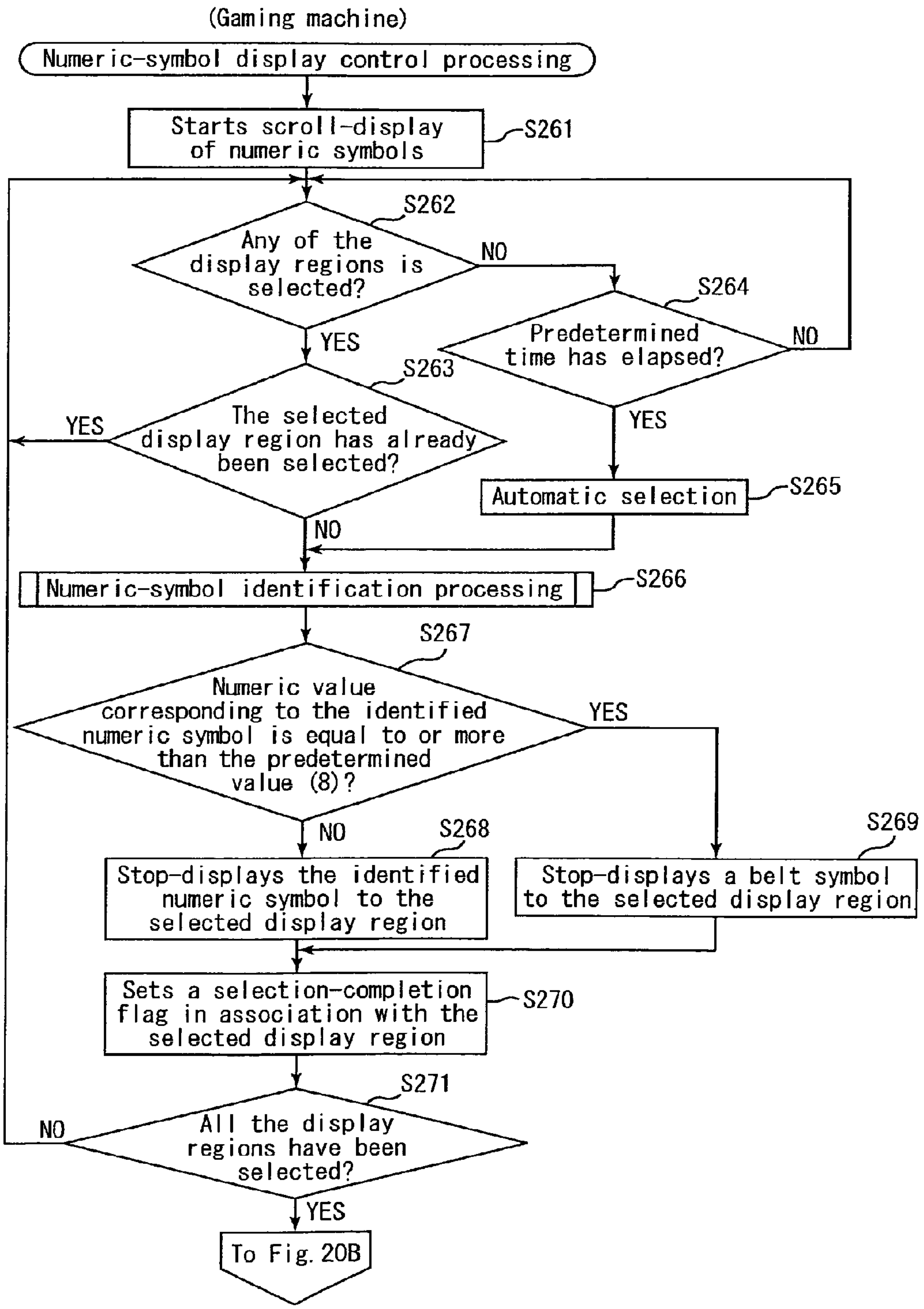
FIG. 20 is a view illustrating a flowchart of numeric-symbol display control processing conducted in the gaming machine according to the embodiments of the present invention.
Figure 20B:
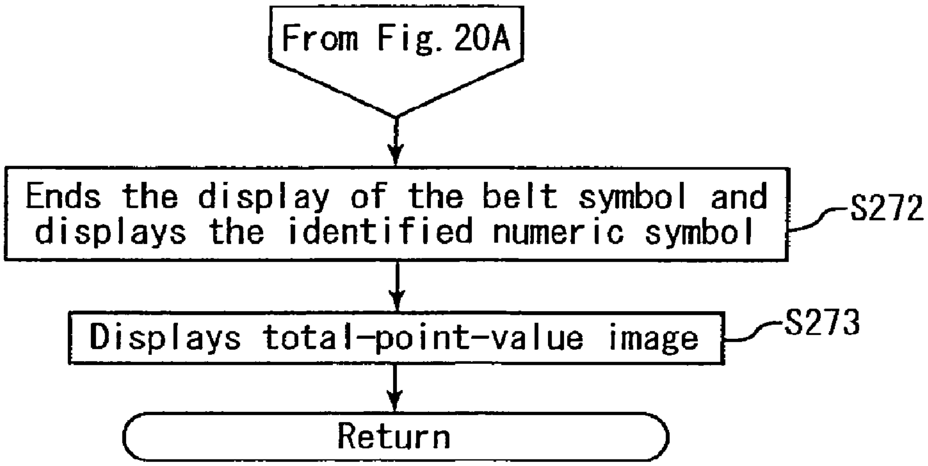

The main CPU 71 then executes numeric-symbol display control processing (step S245). The numeric-symbol display control processing is described in detail later by using FIG. 20 (FIG. 20A and FIG. 20B).

The main CPU 71 executes jackpot payout processing (step S246). In the processing, the main CPU 71 conducts the processing of adding the number corresponding to the number shown by the number-of-payouts information for jackpot stored in the RAM 73 to the number-of-credits counter.

Thereafter, the main CPU 71 completes the present subroutine.

Subsequently, with reference to FIG. 20 (FIG. 20A and FIG. 20B), the numeric-symbol display control processing conducted in step S245 in FIG. 18 is described.

FIG. 20A and FIG. 20B are views illustrating a flowchart of the numeric-symbol display control processing conducted in the gaming machine according to the embodiment of the present invention.

First, the main CPU 71 starts scroll-display of the numeric symbols to the respective first display region 500*a*, second display region 500*b*, third display region 500*c*, fourth display region 500*d*, and fifth display region 500*e* (step S261).

Next, the main CPU 71 determines whether or not any of the display regions of the first display region 500*a*, second display region 500*b*, third display region 500*c*, fourth display region 500*d*, and fifth display region 500*e* has been selected (step S262). In the processing, the main CPU 71 determines whether or not it has received from the touch panel 114 a signal transmitted when the player has touched a place on the touch panel 114 which corresponds to each of the first display region 500*a*, second display region 500*b*, third display region 500*c*, fourth display region 500*d*, and fifth display region 500*e*.

When the main CPU 71 determines that any of the display regions of the first display region 500*a*, second display region 500*b*, third display region 500*c*, fourth display region 500*d*, and fifth display region 500*e* has been selected, the main CPU 71 determines whether or not the selected display region has already been selected (step S263). In the processing, the main CPU 71 determines whether or not a selection completion flag (see step S270) has been set in association with the selected display region.

When the main CPU 71 determines that the selected display region has already been selected, the main CPU 71 returns the processing to step S262.

When the main CPU 71 determines in step S262 that any of the display regions of the first display region 500*a*, second display region 500*b*, third display region 500*c*, fourth display region 500*d*, and fifth display region 500*e* has not been selected, the main CPU 71 determines whether or not predetermined time has elapsed (step S264).

When the main CPU 71 determines that predetermined time has not elapsed, the main CPU 71 returns the processing to step S262.

On the other hand, when the main CPU 71 determines that predetermined time has elapsed, the main CPU 71 selects one display region out of the display regions not yet selected, by generating a random number (step S265).

When determining in step S263 that the selected display region has not been selected yet, or after executing the processing of step S265, the main CPU 71 executes the numeric-symbol identification processing (step S266).

Figure 22:
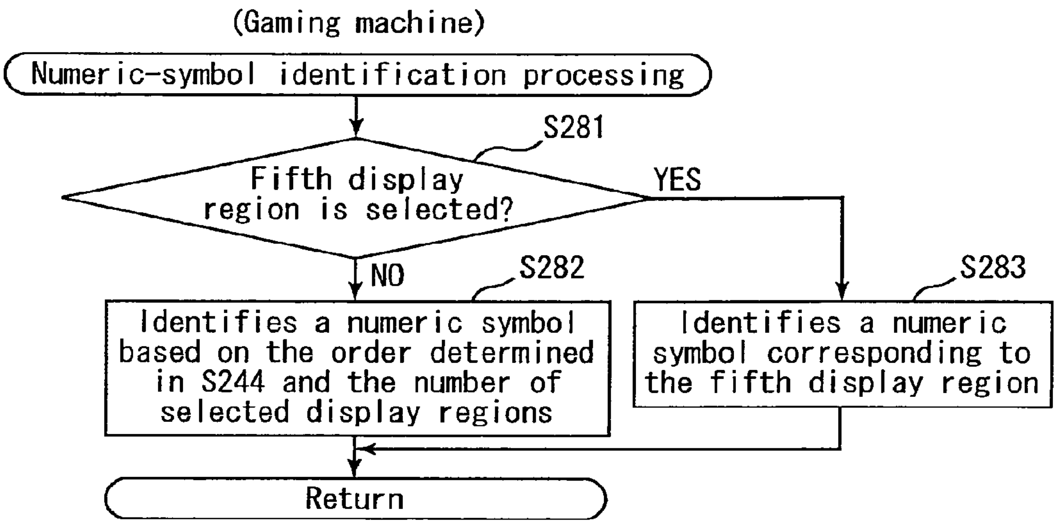
FIG. 22 is a view illustrating a flowchart of numeric-symbol identification processing conducted in the gaming machine according to the embodiments of the present invention.

Here, with reference to FIG. 21 and FIG. 22, the numeric-symbol identification processing is described.

FIG. 21 is a view illustrating the numeric-symbol table.

In the numeric-symbol table, each of the numeric symbols (or belt symbol) forming the numeric-symbol array for each of the first display region 500*a*, second display region 500*b*, third display region 500*c*, fourth display region 500*d*, and fifth display region 500*e* is associated with a code No.

It is to be noted that "belt" is associated with code No. 08, code No. 09, code No. 10, and code No. 11. Thus, when "8", "9", "10", or "11" has been identified as the numeric symbol, the belt symbol, not the numeric symbol, is to be stop-displayed (see FIG. 23). Then, after the belt symbol has been stop-displayed, the numeric symbol is displayed.

Also, as described above, a numeric symbol corresponding to the numeric value of 6 or larger can be displayed to the fifth display region 500*e*. Therefore, no numeric symbol (nor belt symbol) is associated with code Nos. 03 to 05, in the fifth display region 500*e*.

FIG. 22 is a view illustrating a flowchart of the numeric-symbol identification processing conducted in the gaming machine according to the embodiment of the present invention.

First, the main CPU 71 determines whether or not the display region selected in step S262 in FIG. 20A is the fifth display region 500*e* (step S281). In the processing, the main CPU 71 determines whether or not the signal received in step S262 is a signal transmitted from the touch panel 114 corresponding to the fifth display region 500*e*.

When the main CPU 71 determines in step S262 that the selected display region is not the fifth display region 500*e*, the main CPU 71 identifies the numeric symbol, based on the order determined in step S244 in FIG. 18 and the number of already selected display regions (step S282).

On the other hand, when the main CPU 71 determines in step S262 that the selected display region is the fifth display region 500*e*, the main CPU 71 identifies one numeric symbol to be displayed to the fifth display region 500*e* out of the numeric symbols identified in step S243 in FIG. 18 (step S283). In the processing, the main CPU 71 determines the code No. corresponding to this numeric symbol.

After executing the processing of step S282 or step S283, the main CPU 71 completes the present subroutine.

With reference to FIGS. 21 and 22, the numeric-symbol identification processing conducted in step S266 in FIG. 20A has been described above.

Hereinafter, descriptions for FIG. 20A are given again.

After executing the processing of step S266, the main CPU 71 identifies whether or not the numeric value corresponding to the numeric symbol identified in step S282 or step S283 is equal to or more than the predetermined value (8) (step S267).

When the main CPU 71 determines that the numeric value corresponding to the numeric symbol identified in step S282 or step S283 is less than the predetermined value (8), the main CPU 71 stop-displays this numeric symbol to the display region selected in step S262 (step S268).

On the other hand, when the main CPU 71 determines that the numeric value corresponding to the numeric symbol identified in step S282 or step S283 is equal to or more than the predetermined value (8), the main CPU 71 stop-displays the belt symbol to the display region selected in step S262 (step S269).

After executing the processing of step S268 or step S269, the main CPU 71 sets a selection-completion flag in association with the display region selected in step S262 (step S270).

Next, the main CPU 71 determines whether or not all the display regions from the first display region 500*a* to the fifth display region 500*e* have been selected (step S271). In the processing, the main CPU 71 determines whether or not the selection-completion flags are set in association with all the display regions from the first display region 500*a* to the fifth display region 500*e*.

When the main CPU 71 determines that there is a display region not yet selected, the main CPU 71 shifts the processing to step S262.

On the other hand, when the main CPU 71 determines that all the display regions from the first display region 500*a* to the fifth display region 500*e* have been selected, the main CPU 71 ends the display of the belt symbol, and displays the numeric symbol identified in step S282 or step S283 to the display region to which the belt symbol has been displayed (step S272). In the processing, when a plurality of belt symbols are displayed, the main CPU 71 sequentially ends the display of the belt symbols from the one displayed to the left-side display region, and displays the numeric symbols. This situation is shown in FIG. 23 (FIG. 23A and FIG. 23B).

Figure 23A:
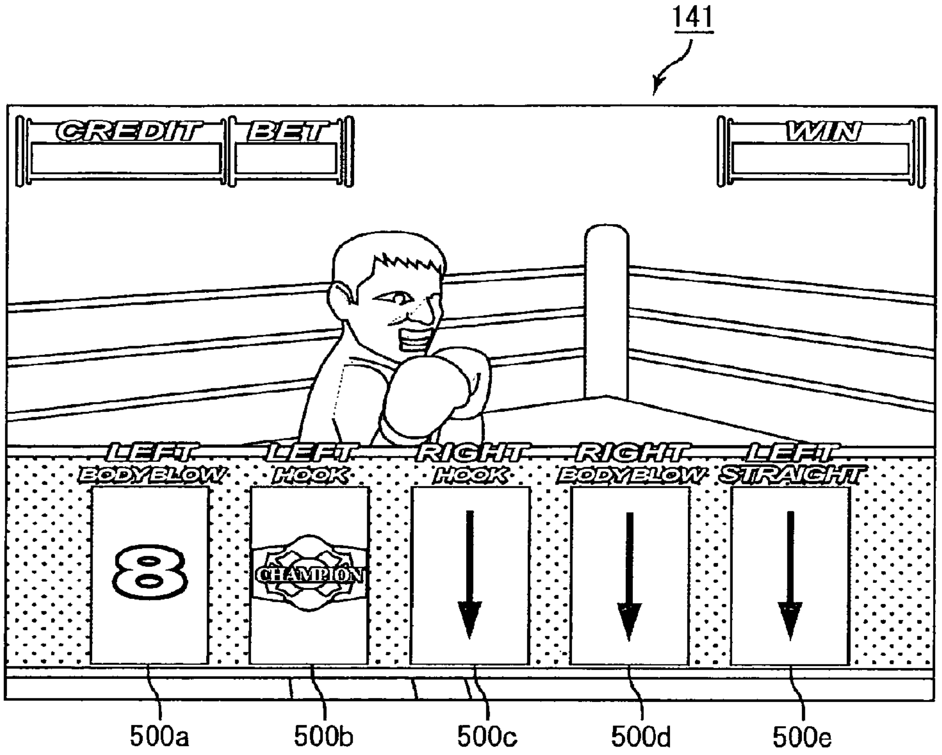
FIG. 23A is a view illustrating an exemplary image displayed to the lower image display panel that is provided in the gaming machine forming the gaming system according to the embodiments of the present invention.
Figure 23B:
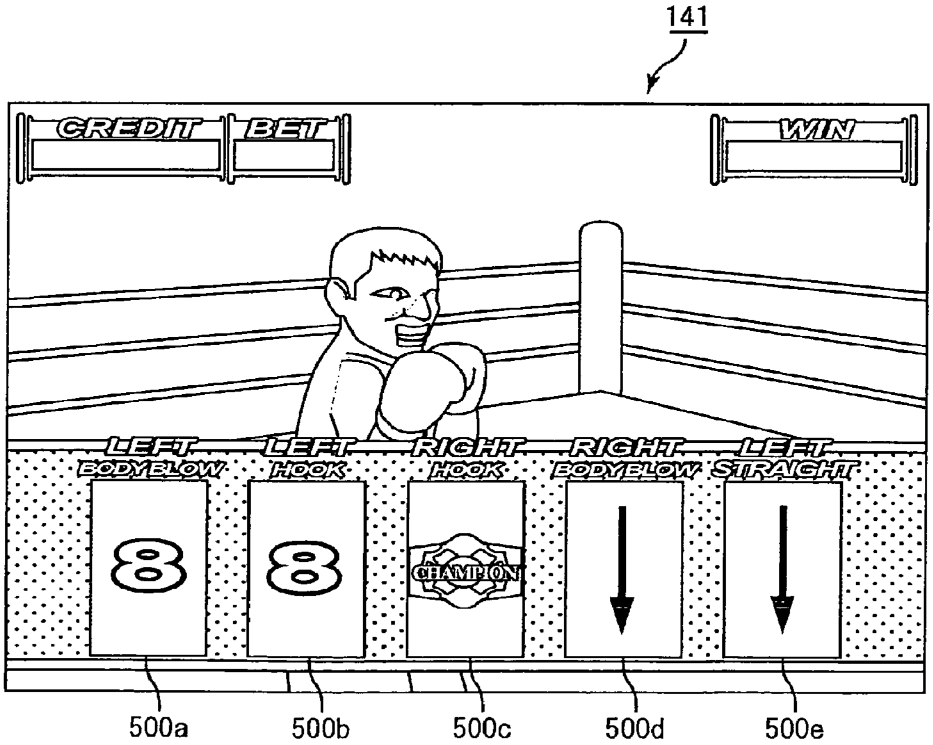
FIG. 23B is a view illustrating an exemplary image displayed to the lower image display panel that is provided in the gaming machine forming the gaming system according to the embodiments of the present invention.

FIG. 23A and FIG. 23B are views illustrating an exemplary image displayed to the lower image display panel that is provided in the gaming machine forming the gaming system according to the embodiment of the present invention.

FIG. 23A shows the state in which the belt symbol is displayed to the second display region 500*b*.

Thus, when the numeric value corresponding to the identified numeric symbol is equal to or more than the predetermined value (8), the particular numeric value is not immediately informed to the player, but only a notification of identification of the numeric symbol corresponding to the numeric value of the predetermined value (8) or, more is given to the player; hence, it is possible to increase a sense of expectation of the player for the special payout.

FIG. 23B shows the state in which the display of the belt symbol displayed to the second display region 500*b* has been ended thereafter, and then the numeric symbol of "8" is displayed to the second display region 500*b*. In this way, in the present embodiment, the numeric symbol is displayed after predetermined time (e.g. 5 seconds) has elapsed since the stop-display of the belt symbol.

FIG. 23B also shows the state in which "8", "8", and "belt" are displayed to the display regions from the first display region 500*a* to the third display region 500*c* as a result of the stop-display of the belt symbol to the third display region 500*c*.

As described above, "8, 8, 8" is the predetermined combination of numeric symbols. When "8, 8, 8" is included in the five numeric symbols that can be displayed to the display regions from the first display region 500*a* to the fifth display region 500*e*, the sum of the five numeric values corresponding to these five numeric symbols always becomes 37 or more.

When the numeric symbol of "8" is displayed after the display of the belt symbol to the third display region 500*c* has been ended, "8, 8, 8" is displayed to the display regions from the first display region 500*a* to the third display region 500*c*.

This means that winning of the special payout of "MINOR" or larger has been certain. It is thus possible to give the player hope for display of "8".

On the other hand, when the numeric symbol corresponding to the numeric value (e.g. 11) larger than 8 is displayed after the display of the belt symbol to the third display region 500*c* has been ended, there is a possibility that notification of winning of the special payout ("MAJOR") larger than "MINOR" is given as a result of subsequent display of the numeric symbols corresponding to the large numeric values (e.g. 11) to the fourth display region 500*d* and the fifth display region 500*e*. Accordingly, it is also possible to give hope for display of the numeric symbols corresponding to the numeric values (e.g. 11) larger than 8 after the display of the belt symbol, to the player who has seen an image as shown in FIG. 23B.

Descriptions for FIG. 20B are given again.

After executing the processing of step S272, the main CPU 71 displays the total-point-value image (step S273). In the processing, the main CPU 71 displays to the lower image display panel 141 an image showing the sum of the five numeric values displayed to the display regions from the first display region 500*a* to the fifth display region 500*e*.

Thereafter, the main CPU 71 completes the present subroutine.

With reference to FIGS. 18 to 23, the jackpot effect processing (see step S25 in FIG. 9) has been described above.

Subsequently, with reference to FIG. 24, BET-information reception processing conducted in the external control device 200 is described.

Figure 24:
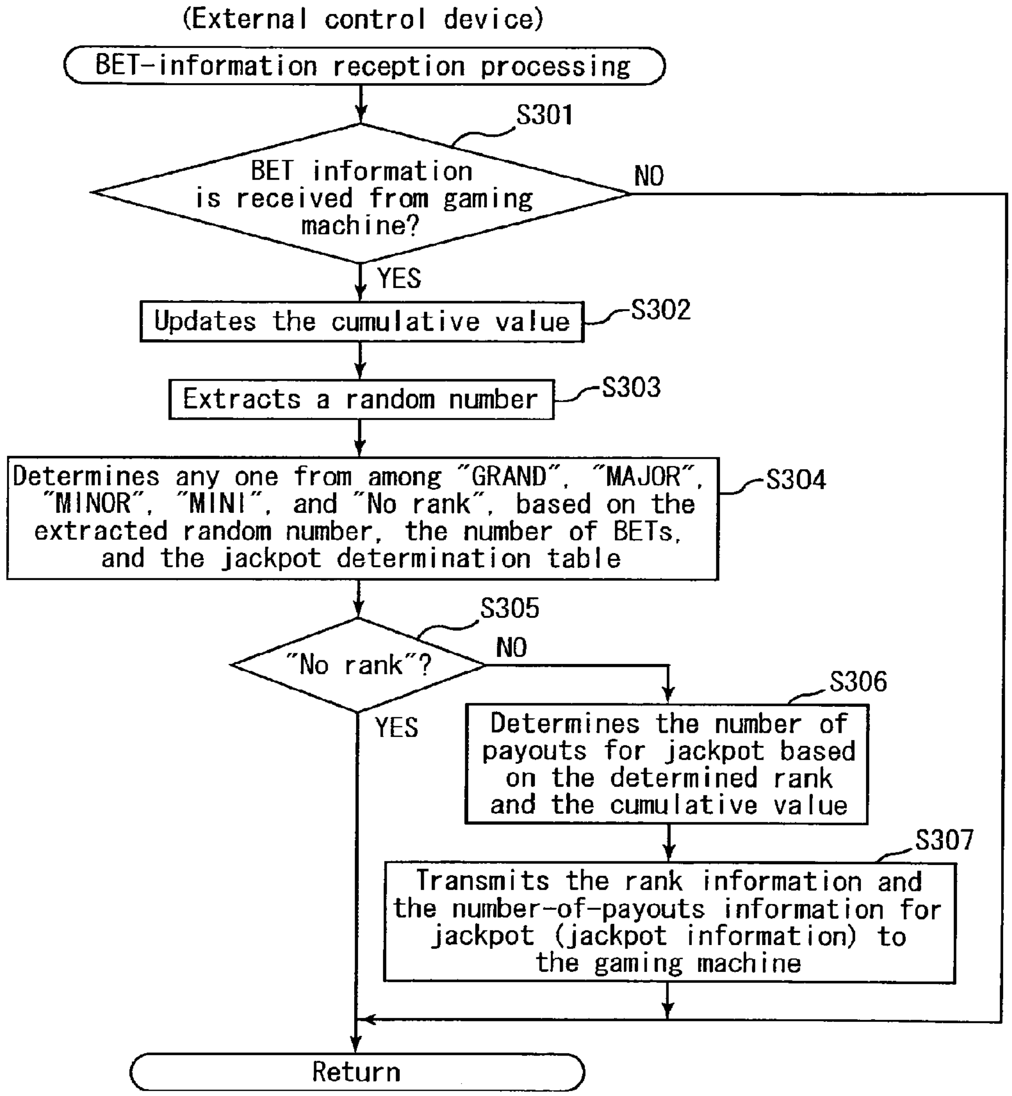
FIG. 24 is a view illustrating a flowchart of BET-information reception processing conducted in the external control device according to a first embodiment.

FIG. 24 is a view illustrating a flowchart of the BET-information reception processing conducted in the external control device according to the embodiment of the present invention.

First, the CPU 201 determines whether or not it has received BET information from the gaming machine 1, at a predetermined timing (step S301). The BET information is information showing the number of coins betted in the gaming machine 1 (see step S51 in FIG. 10).

When the CPU 201 determines that it has not received the BET information, the CPU 201 completes the present subroutine.

On the other hand, when the CPU 201 determines that it has received the BET information, the CPU 201 updates the cumulative-value data showing the cumulative value, in the cumulative-value storage area in the RAM 203 (step S302). In the processing, the CPU 201 adds a value corresponding to a part (10% in the present embodiment) of the number of BETs shown by the BET information that has been received in step S301 to the cumulative value shown by the cumulative-value data stored in the cumulative-value storage area in the RAM 203.

Next, the CPU 201 extracts a random number (step S303).

Based on the random number extracted in step S303, the number of BETs shown by the BET information received in step S301, and the jackpot determination table (see FIG. 1A), the CPU 201 determines "GRAND", "MAJOR", "MINOR", "MINI", or "No rank" (step S304).

The CPU 201 then determines whether or not "No rank" has been determined (step S305).

When the CPU 201 determines that "No rank" has been determined, the CPU 201 completes the present subroutine.

On the other hand, when the CPU 201 determines that "GRAND", "MAJOR", "MINOR", or "MINI" has been determined, the CPU 201 determines the number of payouts for jackpot, based on the determined rank and a cumulative value P shown by the cumulative-value data stored in the cumulative-value storage area in the RAM 203.

In the processing, when "GRAND" has been determined, the CPU 201 determines N, which satisfies $N \leqq 5000+P/10<N+1$, as the number of payouts for jackpot.

Further, when "MAJOR" has been determined, the CPU 201 determines N, which satisfies $N \leqq 500+P/100<N+1$, as the number of payouts for jackpot.

When "MINOR" has been determined, the CPU 201 determines N, which satisfies $N \leqq 50+P/1000<N+1$, as the number of payouts for jackpot.

When "MINI" has been determined, the CPU 201 determines N, which satisfies $N \leqq 10+P/10000<N+1$, as the number of payouts for jackpot.

It is to be noted that the number of payouts for jackpot may be a value not based on the cumulative value, or may be a predetermined value set for each rank, in the present invention.

The CPU 201 then transmits the jackpot information to the gaming machine 1 of the transmission source of the BET information received in step S301 (step S307).

The jackpot information includes the rank information and the number-of-payouts information for jackpot.

The rank information is information showing the rank determined in step S304.

The number-of-payouts information for jackpot is information showing the number of payouts for jackpot determined in step S306. After executing the processing of step S307, the CPU 201 completes the present subroutine.

Second Embodiment

Hereinafter, components that are same as the components of the gaming system 300 according to the first embodiment are given the same signs in description.

Further, descriptions are omitted about the parts to which the descriptions in the first embodiment are applicable in a second embodiment.

In the first embodiment, a case has been described in which the rank is determined in the external control device 200. In contrast, in the second embodiment, the total point value is determined in the external control device 200.

Figure 25:
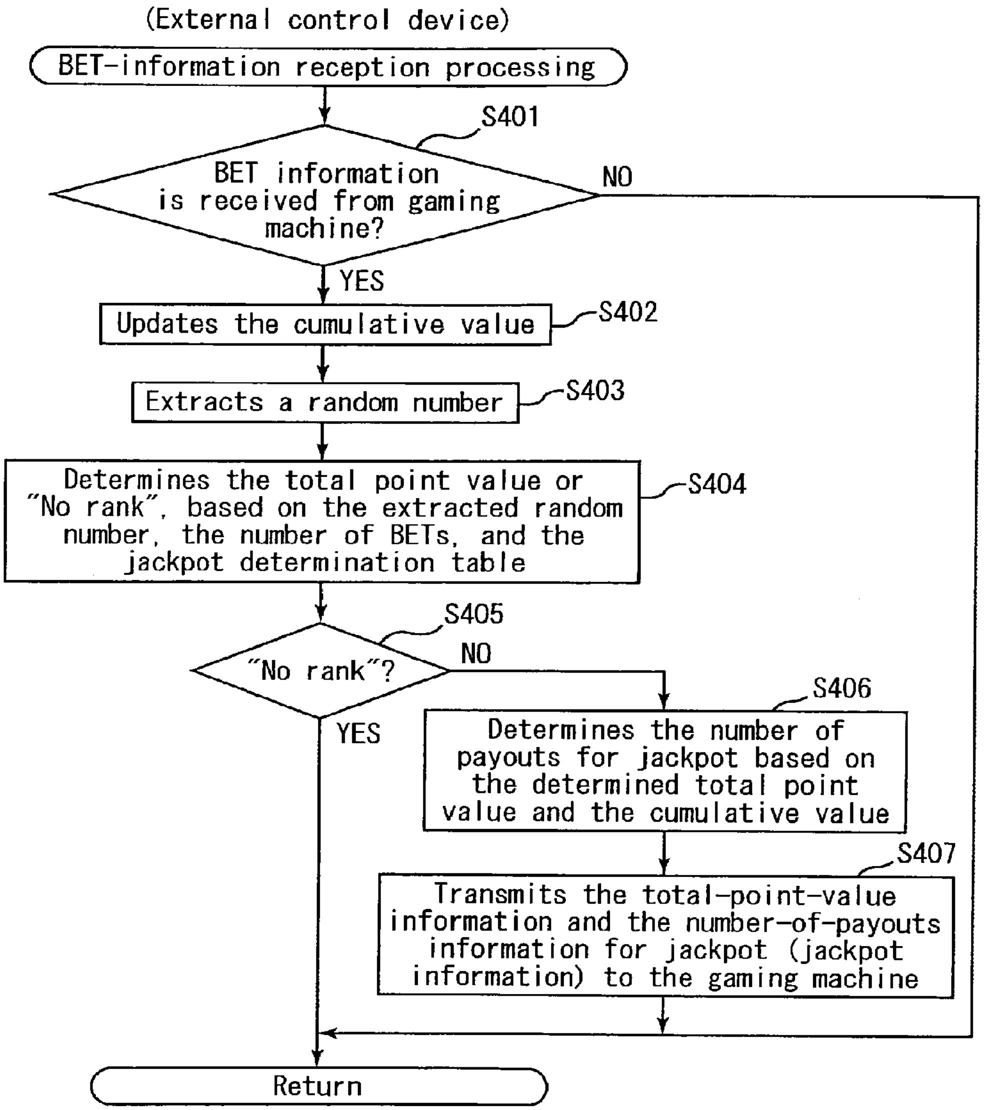
FIG. 25 is a view illustrating a flowchart of BET-information reception processing conducted in the external control device according to a second embodiment.

FIG. 25 is a view illustrating a flowchart of the BET-information reception processing conducted in the external control device according to the second embodiment.

FIG. 26 is a view illustrating the jackpot determination table relating to the second embodiment.

FIG. 27 is a view illustrating an exemplary point-value combination table according to the second embodiment.

Since the processing conducted in steps S401 to S407 in FIG. 25 is substantially the same as the processing conducted in steps S301 to S307 in FIG. 24, only the different points between these processing steps are described.

First, descriptions have been given in which the CPU 201 determines "GRAND", "MAJOR", "MINOR", "MINI", or "No rank", based on the random number extracted in step S303, the number of BETs shown by the BET information received in step S301, and the jackpot determination table (see FIG. 1A), in step S304 in FIG. 24.

In contrast, in step S404 in FIG. 25, the CPU 201 determines the total point value or "No rank", based on the random number extracted in step S403, the number of BETs shown by the BET information received in step S401, and the jackpot determination table (see FIG. 26).

The processing of step S304 in the first embodiment and the processing of step S404 in the second embodiment correspond to "the processing of (B) determining either no offer of the special payout to the gaming machine of the transmission source of the BET information, or the size of the special payout to be offered to the gaming machine of the transmission source of the BET information, upon reception of the BET information in the processing (A)" of the present invention.

Here, with reference to FIG. 26, the jackpot determination table according to the second embodiment is described.

In the jackpot determination table according to the second embodiment, the respective total point values are associated with random number ranges. For the random number ranges, different ranges are set in accordance with the number of betted coins (the number of BETs).

For example, when the value of the random number is "200" and the number of BETs is "1", "No rank" is determined as the total point value.

When the value of the random number is "200" and the number of BETS is "2", "30" is determined as the total point value.

When the value of the random number is "200" and the number of BETs is "100", "54" is determined as the total point value.

Further, descriptions have been given in which the CPU 201 determines the number of payouts for jackpot, based on the rank determined in step S304 and the cumulative value P in step S306 in FIG. 24.

In contrast, in step S406 in FIG. 25, the CPU 201 determines the number of payouts for jackpot, based on the total point value determined in step S404 and the cumulative value P.

In the processing, when a 50 or more and 55 or less numeric value has been determined as the total point value, the CPU 201 determines N, which satisfies $N \leqq 5000+P/10<N+1$, as the number of payouts for jackpot.

Further, when a 46 or more and 49 or less numeric value has been determined as the total point value, the CPU 201 determines N, which satisfies $N \leqq 500+P/100<N+1$, as the number of payouts for jackpot.

When a 37 or more and 45 or less numeric value has been determined as the total point value, the CPU 201 determines N, which satisfies $N \leqq 50+P/1000<N+1$, as the number of payouts for jackpot.

When a 30 or more and 36 or less numeric value has been determined as the total point value, the CPU 201 determines N, which satisfies $N \leqq 10+P/10000<N+1$, as the number of payouts for jackpot.

Also, descriptions have been given in which the CPU 201 transmits the rank information to the gaming machine 1 in step S307 in FIG. 24.

In contrast, in step S407 in FIG. 25, the CPU 201 transmits the total-point-value information showing the total point value determined in step S404 to the gaming machine 1.

Thereafter, in the gaming machine 1, five numeric symbols to be displayed to the display regions from the first display region 500*a* to the fifth display region 500*e* are identified based on the total point value and the point-value combination table. Since the processing conducted in the gaming machine 1 is substantially the same as that in the first embodiment, descriptions are omitted here.

FIG. 27 shows the point-value combination table for MAJOR as an exemplary point-value combination table according to the second embodiment.

In the point-value combination table according to the second embodiment, the total point value, four numeric symbols to be displayed to the display regions from the first display region 500*a* to the fourth display region 500*d*, one numeric symbol to be displayed to the fifth display region 500*e*, and the random number range are in association with one another.

For example, when "46" has been determined as the total point value in the external control device 200 and the value of the acquired random number is "20000", then "7", "7", "10", and "11" are identified as four numeric symbols to be displayed to the display regions from the first display region 500*a* to the fourth display region 500*d*, and "11" is identified as one numeric symbol to be displayed to the fifth display region 500*e* (see No. 5).

Also, when "49" has been determined as the total point value in the external control device 200 and the value of the acquired random number is "20000", then "6", "11", "11", and "11" are identified as four numeric symbols to be displayed to the display regions from the first display region 500*a* to the fourth display region 500*d*, and "10" is identified as one numeric symbol to be displayed to the fifth display region 500*e* (see No. 25).

The present embodiments (the first embodiment and the second embodiment) have been described above.

According to the gaming system 300 relating to the present embodiments, sequentially displaying the numeric symbols to the display regions from the first display region 500*a* to the fifth display region 500*e* allows the player to recognize the total point value. Moreover, since the rank corresponds to the total point value, it is possible to notify the player of the rank.

Accordingly, in the process of sequentially displaying the numeric symbols, it is possible to make the player have a sense of expectation about what the sum of the numeric values will be. Also, each display of a numeric symbol can make the player alternate between hope and despair. Through such rise and fall of emotions, it is possible to make the player absorbed in the game.

Further, according to the gaming system 300 relating to the present embodiments, presence or absence of the special payout, and the size of the special payout are determined at the same time. It is thus possible to ease the burden on the processing thereof.

Furthermore, according to the gaming system 300 relating to the present embodiments, five numeric symbols to be displayed to the display regions from the first display region 500*a* to the fifth display region 500*e* are identified in the gaming machine 1. Accordingly, the processing of identifying five numeric symbols becomes unnecessary in the external control device 200, and thus throughput in the external control device 200 can be reduced.

According to the gaming system 300 relating to the present embodiments, when five numeric symbols have been identified, the order of these numeric symbols is determined. Based on the determined order, the five numeric symbols are displayed.

Hence, pieces of data corresponding to a plurality of alignment orders with regard to a combination of the five numeric symbols are not required to be stored in the memory as pieces of point-value combination data. Accordingly, the amount of data can be reduced in an amount corresponding to these pieces of data.

According to the gaming system 300 relating to the present embodiments, the order of one numeric symbol to be displayed to the fifth display region 500*e* is not determined. That is, the one numeric symbol to be displayed to the fifth display region 500*e* is the numeric symbol that is previously determined in association with the fifth display region 500*e*.

The numeric value corresponding to the numeric symbol that is set in association with the fifth display region 500*e* is a relatively large numeric value being 6 or more, and the numeric symbol corresponding to this relatively large numeric value is displayed to the fifth display region 500*e*.

On the other hand, according to the gaming system 300 relating to the present embodiments, the player can select the order in which the five numeric symbols are displayed. Thus, it is possible to let the player enjoy the timing of when to display the numeric symbols to the fifth display region 500*e*. It is also possible to let the player fully enjoy the process in which the numeric symbols are sequentially displayed.

It is to be noted that a relation between the numeric value corresponding to the numeric symbol displayed to the special display region and the numeric values corresponding to the numeric symbols displayed to the normal display regions is not particularly limited. For example, it may be configured so that the numeric value corresponding to the numeric symbol displayed to the special display region becomes a value equal to or more than the largest value among the M numeric values corresponding to the M numeric symbols displayed to the normal display regions.

According to the gaming system 300 relating to the present embodiments, when the numeric symbols forming the predetermined combination of numeric symbols are included in the five numeric symbols, the combination of the five numeric symbols is set so that the sum of the five numeric values corresponding to these five numeric symbols becomes equal to or more than the predetermined value.

Accordingly, display of the numeric symbols forming the predetermined combination of numeric symbols can make the player recognize that the special payout of the predetermined rank or larger has been determined. It is therefore possible to make the player have interest and concern in the predetermined combination of numeric symbols. Also, it becomes possible to let the player fully enjoy the process in which the numeric symbols are sequentially displayed, and to make the player immersed in the game.

According to the gaming system 300 relating to the present embodiments, a larger amount of betted coins can lead to a higher probability that the special payout is determined to be offered or a higher probability that a larger special payout is determined. Hence, it is possible to encourage the player to bet more coins and also possible to increase the profit of the game parlor.

Further, according to the gaming system 300 relating to the present embodiments, since the player having betted a larger number of coins can receive a profit of a larger special payout at a higher probability, it is possible to offer the special payout, while maintaining the fairness.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, other configurations requested for performing each step should become apparent from the above descriptions.

What is claimed as new and desired to be secured by Letters Patent of the United States is:

1. A gaming system comprising:

a plurality of gaming machines each including an input device, a numeric-symbol display capable of displaying a numeric symbol to each of a predetermined number of display regions, and a controller;

a control device including a processor; and a network configured to enable communication between said plurality of gaming machines and said control device, wherein said processor is configured to determine a total point value corresponding to one of a plurality of ranks of a jackpot, each of said gaming machines is configured to:

determine, from the total point value determined by the processor, a specific combination of numeric symbols to be displayed to each of the predetermined number of display regions of the numeric-symbol display, display to the predetermined number of display regions of the numeric-symbol display, the specific combination of numeric symbols which have a sum of corresponding numeric values equal to the total point value, and after said specific combination of numeric symbols is displayed, to pay out game media in an amount determined based on the one of the plurality of ranks of the jackpot, corresponding to the total point value determined by the processor, wherein if a value of a numeric symbol of the specific combination of symbols to be displayed is greater than a predetermined value, the numeric symbol is substituted with a predetermined symbol and the specific combination of symbols, including the substituted predetermined symbol, is displayed to the predetermined number display regions;

after display of the substituted predetermined symbol, the substituted predetermined symbol is replaced with the numeric symbol having a value greater than the predetermined value.

2. The gaming system of claim 1, wherein the specific combination of numeric symbols is one of combinations of numeric symbols whose sum corresponds to the total point value, each of said gaming machines is configured to determine the specific combination of numeric symbols out of the combinations of numeric symbols.

3. The gaming system of claim 1, wherein each symbol of the specific combination of numeric symbols successively displayed to each of the predetermined number of display regions is stop displayable by operation of a game player.

4. A control method of a gaming system, including a plurality of gaming machines each including an input device, a numeric-symbol display capable of displaying a numeric symbol to each of a predetermined number of display regions, and a controller;

a control device including a processor; and a network configured to enable communication between said plurality of gaming machines and said control device, said control method comprising determining, by the processor, a total point value corresponding to one of a plurality of ranks of a jackpot;

determining, from the total point value determined by the processor, a specific combination of numeric symbols to be displayed to each of the predetermined number of display regions of the numeric-symbol displays of each gaming machine, displaying, by the controller, to the predetermined number of display regions of the numeric-symbol displays of each gaming machine, the specific combination of numeric symbols which have a sum of corresponding numeric values equal to the total point value, and paying out, by the controller and after the specific combination of numeric symbols are displayed, game media in an amount determined based on the one of the plurality of ranks of the jackpot, corresponding to the total point value determined in said determining step, wherein if a value of a numeric symbol of the specific combination of symbols to be displayed is greater than a predetermined value, the numeric symbol is substituted with a predetermined symbol and the specific combination of symbols, including the substituted predetermined symbol, is displayed to the predetermined number display regions;

after display of the substituted predetermined symbol, the substituted predetermined symbol is replaced with the numeric symbol having a value greater than the predetermined value.

5. The control method of claim 4, wherein the specific combination of numeric symbols is one of combinations of numeric symbols whose sum corresponds to the total point value, each of said gaming machines is configured to determine the specific combination of numeric symbols out of the combinations of numeric symbols.

6. The control method of claim 4, wherein each symbol of the specific combination of numeric symbols successively displayed to each of the predetermined number of display regions is stop displayable by operation of a game player.

7. A gaming system comprising:

a plurality of gaming machines each including an input device a numeric-symbol display capable of displaying a numeric symbol to each of a predetermined number of display regions, and a controller;

a control device including a processor; and a network configured to enable communication between said plurality of gaming machines and said control device, wherein said processor is configured to determine, for any of the gaming machines, by lottery whether or not one of a plurality of ranks of a jackpot is won; and each of said gaming machines is configured to:

determine, from the rank determined by the processor, a specific combination of numeric symbols to be displayed to each of the predetermined number of display regions of the numeric-symbol display, display to the predetermined number of display regions of the numeric-symbol display, the specific combination of numeric symbols which have a sum of corresponding numeric values equal to the determined rank; and after said specific combination of numeric symbols is displayed, to pay out game media in an amount determined based on the determined rank, wherein if a value of a numeric symbol of the specific combination of symbols to be displayed is greater than a predetermined value, the numeric symbol is substituted with a predetermined symbol and the specific combination of symbols, including the substituted predetermined symbol, is displayed to the predetermined number display regions;

after display of the substituted predetermined symbol, the substituted predetermined symbol is replaced with the numeric symbol having a value greater than the predetermined value.

8. The gaming system according to claim 7, wherein the controller is configured to determine a total point value based on the rank such that the higher the rank of the jackpot determined by the processor to have been won, the higher the total point value.

9. The gaming system of claim 7, wherein the specific combination of numeric symbols is one of combinations of numeric symbols whose sum corresponds to a total point value corresponding to the rank, each of said gaming machines is configured to determine the specific combination of numeric symbols out of the combinations of numeric symbols.

10. The gaming system of claim 7, wherein each symbol of the specific combination of numeric symbols successively displayed to each of the predetermined number of display regions is stop displayable by operation of a game player.

11. A control method of a gaming system, including a plurality of gaming machines each including an input device, a numeric-symbol display capable of displaying a numeric symbol to each of a predetermined number of display regions, and a controller;

a control device including a processor; and a network configured to enable communication between said plurality of gaming machines and said control device, said control method comprising:

determining, by the processor and for any of the gaming machines, by lottery whether or not one of a plurality of ranks of a jackpot is won; and determining, from the rank determined by the processor, a specific combination of numeric symbols to be displayed to each of the predetermined number of display regions of the numeric-symbol displays of each gaming machine, displaying, by the controller, to the predetermined number of display regions in said numeric-symbol display, the specific combination of numeric symbols which have a sum of corresponding numeric values equal to the determined rank; and paying out, by the controller and after the plurality of numeric symbols are displayed, game media in an amount determined based on the determined rank, wherein if a value of a numeric symbol of the specific combination of symbols to be displayed is greater than a predetermined value, the numeric symbol is substituted with a predetermined symbol and the specific combination of symbols, including the substituted predetermined symbol, is displayed to the predetermined number display regions;

after display of the substituted predetermined symbol, the substituted predetermined symbol is replaced with the numeric symbol having a value greater than the predetermined value.

12. The control method according to claim 11, further comprising:

when the jackpot of one of the plurality of ranks is determined by the processor to have been won, determining the a total point value based on the rank such that the higher the rank of the jackpot determined by the processor to have been won, the higher the total point value.

13. The control method of claim 11, wherein the specific combination of numeric symbols is one of combinations of numeric symbols whose sum corresponds to a total point value corresponding to the rank, each of said gaming machines is configured to determine the specific combination of numeric symbols out of the combinations of numeric symbols.

14. The control method of claim 11, wherein each symbol of the specific combination of numeric symbols successively displayed to each of the predetermined number of display regions is stop displayable by operation of a game player.

* * * * *